US012659978B1

(12) United States Patent
Dash et al.

(10) Patent No.: US 12,659,978 B1
(45) Date of Patent: Jun. 16, 2026

(54) PRIORITIZED SCHEDULING AND BROADCAST OF PWS MESSAGES OVER IAB BACKHAUL

(71) Applicant: Radisys Corporation, Hillsboro, OR (US)

(72) Inventors: Nalinikanta Dash, Puri (IN); Bhawani Sankar Satpathy, Dhenkanal (IN); Rajendra Prasad Kodaypak, Hillsboro, OR (US)

(73) Assignee: Radisys Corporation, Hillsboro, OR (US)

( * ) Notice: Subject to any disclaimer, the term of this patent is extended or adjusted under 35 U.S.C. 154(b) by 293 days.

(21) Appl. No.: 18/481,879

(22) Filed: Oct. 5, 2023

(51) Int. Cl.
H04W 72/30 (2023.01)
H04W 72/563 (2023.01)
H04W 84/04 (2009.01)

(52) U.S. Cl.
CPC ......... H04W 72/30 (2023.01); H04W 72/563 (2023.01); H04W 84/047 (2013.01)

(58) Field of Classification Search
CPC .. H04W 72/30; H04W 72/563; H04W 84/047
See application file for complete search history.

(56) References Cited

U.S. PATENT DOCUMENTS

| | | | | |
|---|---|---|---|---|
| 2021/0058826 A1* | 2/2021 | Mao | .................. | H04W 28/0933 |
| 2023/0328492 A1* | 10/2023 | Guan | .................... | H04W 48/12 |
| | | | | 455/434 |
| 2024/0236650 A1* | 7/2024 | Rout | ....................... | H04W 8/22 |
| 2024/0259879 A1* | 8/2024 | Ranganath | ............... | G06N 5/01 |

* cited by examiner

*Primary Examiner* — Ajay Cattungal
(74) *Attorney, Agent, or Firm* — Stoel Rives LLP

(57) ABSTRACT

A near-RT RIC controls, via an E2 link between it and an IAB-donor-CU, a backhaul RLC channel for warning message delivery by receiving, from a PWS-gateway, a first REST API trigger for PWS service delivery; requesting, from a SMO, a second REST API trigger for configuring the backhaul RLC channel; and generating a RIC control request to the IAB-donor-CU to cause it to trigger a UE context modification for control of the backhaul RLC channel. An IAB-donor-CU provides for triggering a UE context modification for establishing the backhaul RLC channel with an IAB-node; receiving a write replace warning request from an AMF; and triggering the write replace warning request to the IAB-node by BAP routing over the backhaul RLC channel. An IAB-node or an IAB-donor schedule use of the wireless backhaul RLC channel and a wireless access channel based on a hard, soft, or not available resource configuration.

21 Claims, 52 Drawing Sheets

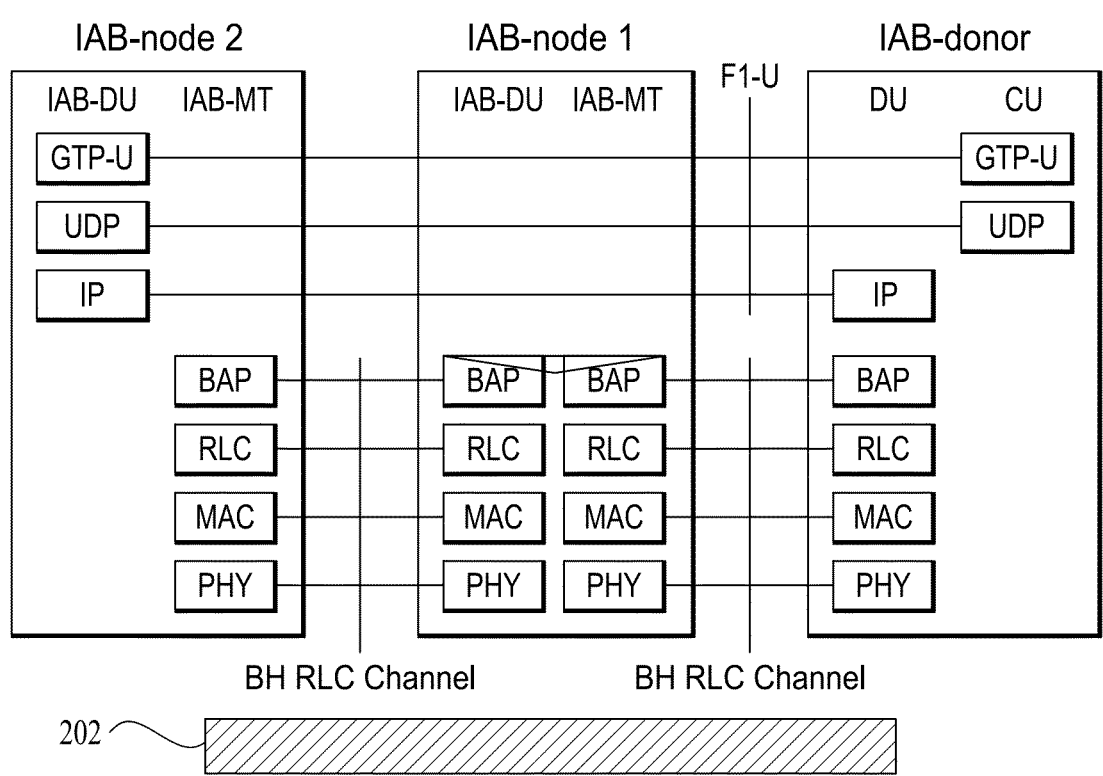
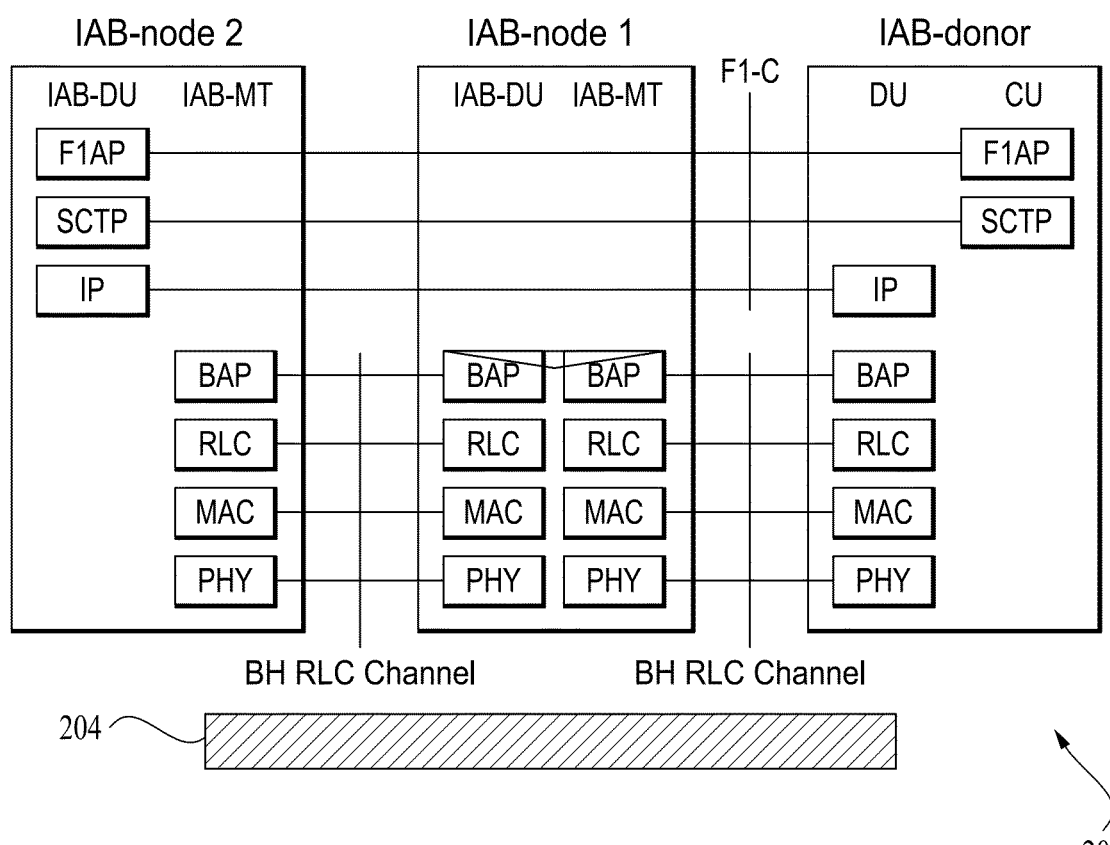
FIG. 2A

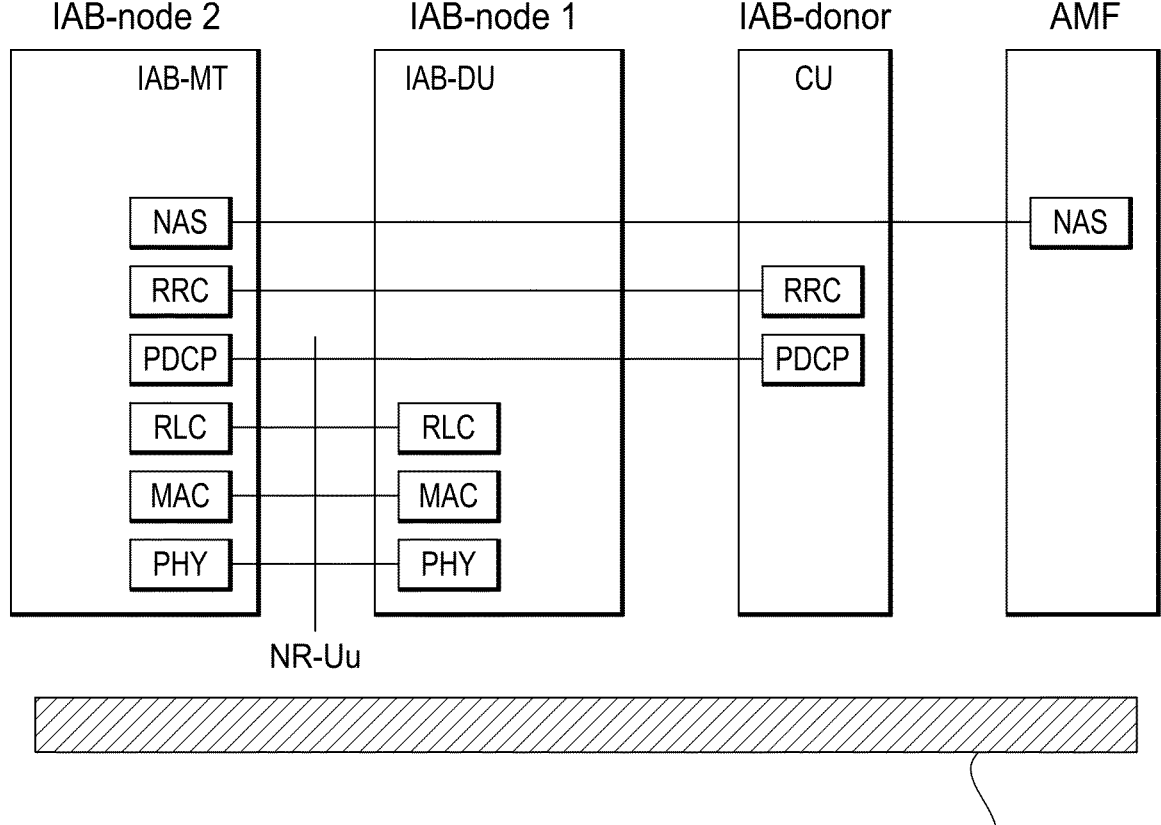
FIG. 2B

TRIGGER A RIC SUBSCRIPTION PROCEDURE TOWARDS AN IAB-DONOR-CU TO SHARE IAB-NODE INFORMATION OF THE IAB-NODE, THE IAB-NODE INFORMATION INCLUDING AN IAB-NODE IP ADDRESS  602

IN RESPONSE TO THE IAB-DONOR-CU RECEIVE AN IAB-MT REGISTRATION AND ESTABLISHING AN F1 SETUP FROM THE IAB-NODE, RECEIVING FROM THE IAB-DONOR-CU A RIC INDICATION INCLUDING THE IAB-NODE INFORMATION SO AS TO OBTAIN THE IAB-NODE IP ADDRESS FOR THE IAB-NODE  604

PERFORM AN SCTP HANDSHAKE WITH THE IAB-NODE IDENTIFIED BY THE IAB-NODE IP ADDRESS TO ESTABLISH AN SCTP CONNECTION 606

RECEIVE AN E2AP SETUP WITH THE IAB-NODE VIA THE SCTP CONNECTION 608

FIG. 6

TRIGGER AN IAB-MT REGISTRATION AND ESTABLISHING AN F1 SETUP WITH AN IAB-DONOR-CU TO SHARE IAB-NODE INFORMATION OF THE IAB-NODE, THE IAB-NODE INFORMATION INCLUDING AN IAB-NODE IP ADDRESS 702

PERFORM WITH THE NEAR-RT RIC AN SCTP HANDSHAKE BASED ON THE IAB-NODE IDENTIFIED BY THE IAB-NODE IP ADDRESS TO ESTABLISH AN SCTP CONNECTION 704

TRIGGER AN E2AP SETUP WITH THE IAB-NODE VIA THE SCTP CONNECTION 706

FIG. 7

800

RECEIVE A RIC SUBSCRIPTION REQUEST TOWARDS THE IAB-DONOR-CU TO SHARE INFORMATION OF THE IAB-NODE, THE INFORMATION INCLUDING AN NR-CGI, AN IAB-NODE BAP ADDRESS, AND AN IAB-NODE IP ADDRESS <u>802</u>

RECEIVE AN IAB-MT REGISTRATION AND ESTABLISHING AN F1 SETUP FROM THE IAB-NODE <u>804</u>

TRIGGER A RIC INDICATION INCLUDING THE INFORMATION SO AS TO PROVIDE THE RIC WITH THE IAB-NODE IP ADDRESS FOR THE IAB-NODE, CAUSE THE RIC TO TRIGGER AN SCTP HANDSHAKE WITH THE IAB-NODE IDENTIFIED BY THE IAB-NODE IP ADDRESS TO ESTABLISH AN SCTP CONNECTION, AND CAUSE THE RIC TO TRIGGER AN E2AP SETUP WITH THE IAB-NODE VIA THE SCTP CONNECTION <u>806</u>

FIG. 8

1100

| IE/Group Name | Presence | IE type and reference |
|---|---|---|
| Message Type | M | |
| RIC Request ID | M | This value will be generated by RIC |
| RAN Function ID | M | Indicates the RAN Function ID number, to be unique within a given E2 Node |
| RIC Subscription Details | M | |
| >RIC Event Trigger Definition | M | E2SM-RC Event Trigger Definition Format 1: Message Event |
| >Sequence of Actions | 1 .. <maxofRICactionID> | Maximum value of maxofRICactionID can be 16 |
| >>RIC Action ID | M | Indicates the Action ID number, to be unique within the given RIC Request ID |
| >>RIC Action Type | M | Defines the type of action to be executed. Type of action should be set to Report. |
| >>RIC Action Definition | O | RIC Action definition will be used for reporting PRRC Message and NR CGI towards RIC by E2 node when desired condition met. |

| IE / Group Name | Presence | Range | IE Type and reference | Semantics description |
|---|---|---|---|---|
| Sequence of Messages for Event Trigger | | 1..<maxnoofMessages> | | Maximum value of maxnoofMessages in range of 65535 |
| >Event Trigger Condition ID | M | Value can be in range of 65535 | | |
| > Message Type | M | | | |
| >>RRC | | | | |
| >>>RRC Message ID | | | | |
| 1202<br>>>>>>NR RRC Class | | | ENUMERATED (BCCHBCH, BCCH-DL-SCH, DLCCCH, DL-DCCH, PCCH, UL-CCCH, UL-CCCH1, UL-DCCH, ...) | Value will be encoded as DL-DCCH for RRC Reconfiguration Message. |
| 1204<br>>>>>>RRC Message ID | | | | Number starts from 0 from the first entry of a given RRC message class defined in TS 38.331. For RRC Reconfiguration value will be encoded as 21. |
| 1206<br>>Associated UE Event | O | | Indicates specific UE event for event triggering associated to each message event. | Value will be encoded as 3 indicating IAB-MT Registration and F1 Setup Successful with IAB-DU. |

| IE/Group Name | Presence | Range | IE type and reference | Semantics description |
|---|---|---|---|---|
| RIC Style Type | M | | Defines the identifier of a given RIC Style. Value will be encoded as 1 | |
| Action Definition Format | | | | |
| >E2SM-RC Action Definition Format 1 | M | | | Used by REPORT service |

| IE/Group Name | Presence | Range | IE type and reference | Semantics description |
|---|---|---|---|---|
| Parameters to be Reported List | | 1 | Maximum values of maxnoofParametersToReport can be 65535 | |
| >RAN Parameter ID | M | | INTEGER (1..232...) | Uniquely identifies a specific RAN parameter of a given RIC Control style. Value will be encoded as a L e RRC Message. |
| >RAN Parameter Definition | O | | | RAN Parameter Definition for RRC Message will be encoded as OCTET STRING |
| Parameters to be Reported List | | 2 | Maximum value of maxnoofParametersToReport can be 65535 | |
| >RAN Parameter ID | M | | INTEGER (1..232...) | Uniquely identifies a specific RAN parameter of a given RIC Control style. Value will be encoded as a NR Cell Global ID |
| >RAN Parameter Definition | O | | | RAN Parameter Definition for NR Cell Global ID will be encoded as OCTET STRING |

| IE/Group Name | Presence | Range | IE type and reference |
|---|---|---|---|
| Message Type | M | | |
| RIC Request ID | M | | As provided by RIC in Subscription Request |
| RAN Function ID | M | | As provided by RIC in Subscription Request |
| RIC Actions Admitted List | | 1.. <maxofRICactionID> | MaxofRICactionID is 16 |
| >RIC Action ID | M | | As provided by RIC in Subscription Request |

| IE/Group Name | Presence | IE type and reference |
|---|---|---|
| Message Type | M | |
| RIC Request ID | M | As provided by RIC in Subscription Request |
| RAN Function ID | M | As provided by RIC in Subscription Request |
| RIC Action ID | M | As provided by RIC in Subscription Request |
| RIC Indication SN | O | This indicates the Indication Sequence Number (SN) Value can be in range of 0 to 65535 |
| RIC Indication Type | M | RIC Indication Type will be set to Report |
| RIC Indication Header | M | E2SM-RC Indication Header Format 1 |
| RIC Indication Message | M | E2SM-RC Indication Message Format 1 |

| IE/Group Name | Presence | Range | IE type and reference | Semantics description |
|---|---|---|---|---|
| Event Trigger Condition ID | O | | Value can be in range of 65535. | Same value as encoded in RIC Subscription Request will be encoded by IAB-donor-CU. |

FIG. 17

| IE/Group Name | Presence | Range | IE Type and reference | Semantics description |
|---|---|---|---|---|
| Sequence of RAN Parameters | | 1 | | Maximum number of RAN Parameters supported by Indication Message Format 1 is 65535 |
| >RAN Parameter ID | M | | RAN Parameter ID value will be encoded as 3 for RRC Message (RRC Reconfiguration) | |
| >RAN Parameter Value | M | | RAN Parameter Value will be of Type Element and will be encoded in Octet String | |
| Sequence of RAN Parameters | | 2 | | |
| >RAN Parameter ID | M | | RAN Parameter ID value will be encoded as 6 for Cell Global ID (NR CGI) | |
| >RAN Parameter Value | M | | RAN Parameter Value will be of Type Element and will be encoded in Octet String | |

RECEIVE, FROM A PWS-GATEWAY, A FIRST REST API TRIGGER FOR PWS SERVICE DELIVERY 2302

REQUEST, FROM A SMO, A SECOND REST API TRIGGER FOR CONFIGURING THE BACKHAUL RLC CHANNEL 2304

GENERATE A RIC CONTROL REQUEST TO THE IAB-DONOR-CU TO CAUSE IT TO TRIGGER A UE CONTEXT MODIFICATION FOR CONTROL OF THE BACKHAUL RLC CHANNEL WITH ONE OR MORE IAB-NODES 2306

_2400

IN RESPONSE TO A RIC CONTROL REQUEST FROM A NEAR-RT RIC, TRIGGER A UE CONTEXT MODIFICATION FOR ESTABLISHING THE BACKHAUL RLC CHANNEL WITH AN IAB-NODE 2402

RECEIVE A WRITE REPLACE WARNING REQUEST FROM AN AMF 2404

TRIGGER THE WRITE REPLACE WARNING REQUEST TO THE IAB-NODE BY BAP ROUTING OVER THE BACKHAUL RLC CHANNEL 2406

Figure 25:
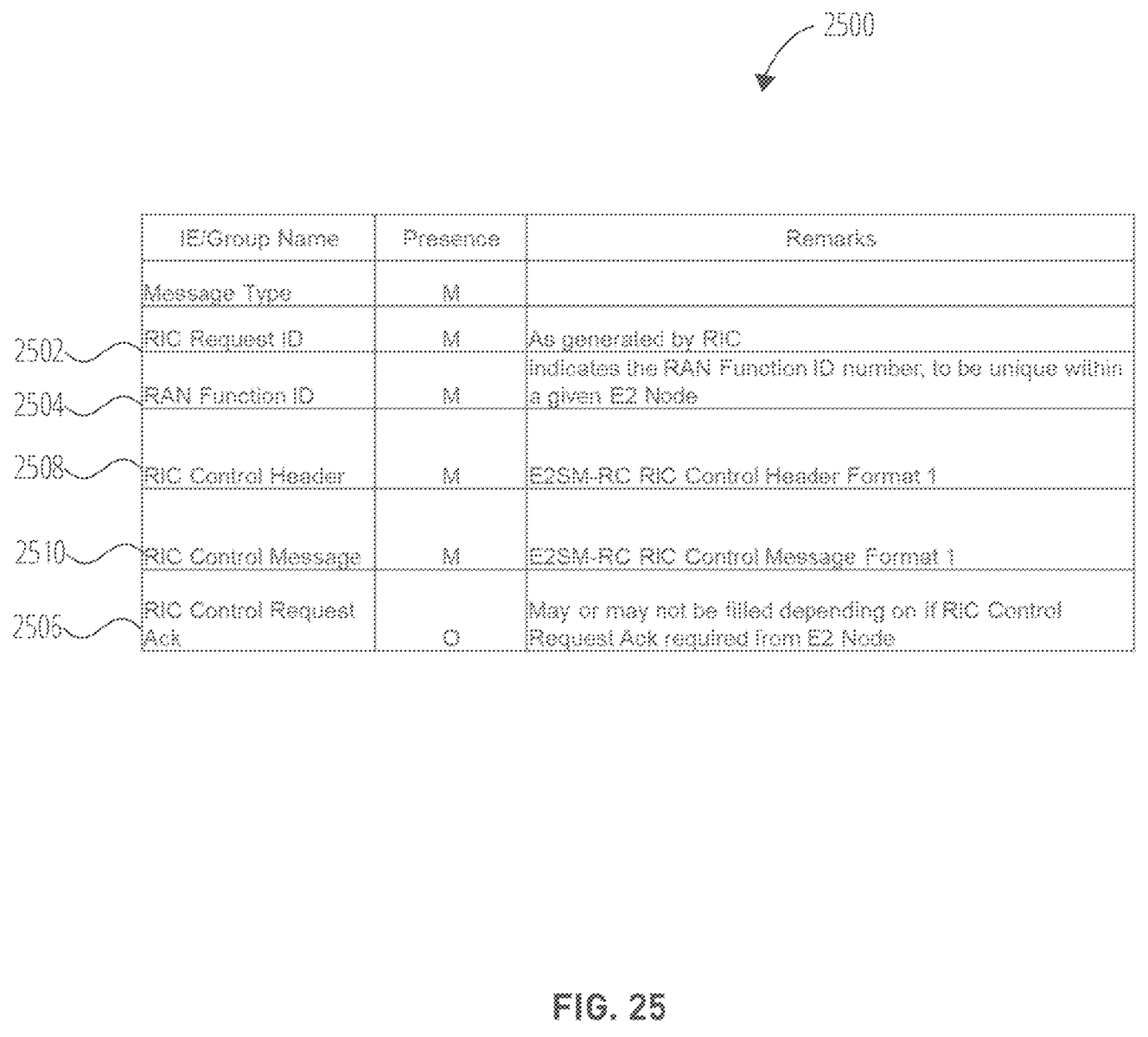

2500

| IE/Group Name | Presence | Remarks |
|---|---|---|
| Message Type | M | |
| RIC Request ID | M | As generated by RIC. |
| RAN Function ID | M | Indicates the RAN Function ID number, to be unique within a given E2 Node |
| RIC Control Header | M | E2SM-RC RIC Control Header Format 1 |
| RIC Control Message | M | E2SM-RC RIC Control Message Format 1 |
| RIC Control Request Ack | O | May or may not be filled depending on if RIC Control Request Ack required from E2 Node |

| IE/Group Name | Presence | Remarks |
|---|---|---|
| UE ID | M | IAB-MT BAP Address/ list of IAB-MT BAP Addresses. In case BH RLC channel needs to be established towards a particular IAB-MT else any random value will be filled. |
| RIC Style Type | M | RIC Style Type will be set to 1. |
| Control Action ID | M | Value will be filled as 8 for BH RLC channel Establishment/Release/Modification. |

| IE/Group Name | Presence | Remarks |
|---|---|---|
| List of RAN parameters | | List of RAN parameters with parameter ID and Parameter value type is defined in next slide |
| >RAN Parameter ID | M | |
| >RAN Parameter Value Type | M | |

| RAN Parameter ID | RAN Parameter | RAN Parameter Value Type | Key Flag | RAN Parameter Definition | Semantics Descriptions |
|---|---|---|---|---|---|
| 1 | BH RLC Channel to be Setup List | List | | | |
| 2 | >BH RLC Channel to be Setup Item IEs | Structure | | | |
| 3 | >>BH RLC CH ID | Element | TRUE | This IE uniquely identifies a BH RLC channel in the link between IAB-MT of the IAB-node and IAB-DU of the parent IAB-node or IAB-donor-DU. This IE has a size of 16 bit. | |
| 4 | >>CHOICE BH QoS information | Structure | | | |
| 5 | >>>BH RLC CH QoS | Structure | | | |
| 6 | >>>>BH RLC CH QoS | Element | FALSE | This IE defines the QoS to be applied to a BH RLC channel. This includes required parameters for GBR, Non-GBR and Delay critical GBR BH RLC channel as defined in TS 38.473 section 9.3.1.45 | Shall be used for SA case |
| 7 | >>>E-UTRAN BH RLC CH QoS | Structure | | | |
| 8 | >>>>E-UTRAN BH RLC CH QoS | Element | FALSE | This IE defines the QoS to be applied to a BH RLC channel for EN-DC case as defined TS 38.473 section 9.3.1.19 | Shall be used for EN-DC case |

| RAN Parameter ID | RAN Parameter | RAN Parameter Value Type | Key Flag | RAN Parameter Definition | Semantics Descriptions |
|---|---|---|---|---|---|
| 9 (2818) | >>>Control Plane Traffic Type | Structure | | | |
| 10 (2820) | >>>>Control Plane Traffic Type | Element | FALSE | This IE indicates the control plane traffic type carried over a BH RLC channel. This IE can have a value in range of 1-3. Control plane traffic types with different priorities are identified by the different codepoints in this IE, where 1 has the highest priority. | |
| 11 (2822) | >>RLC Mode | Element | FALSE | The RLC Mode IE indicates the RLC Mode used for BH RLC channel. Following modes are supported RLC-AM, RLC-UM-Bidirectional, RLC-UM-Undirectional-UL, RLC-UM-Undirectional-DL. | |
| 12 (2824) | >>BAP Control PDU Channel | Element | FALSE | This IE indicates if BAP control PDU will be carried over this BH RLC channel | |
| 13 (2826) | >>Traffic Mapping Information | Element | FALSE | This IE includes the information used by the gNB-DU to perform traffic mapping. Two types of traffic mapping defined. IP to layer 2 Traffic Mapping Info and BAP layer BH RLC channel Mapping Info. Details about the mapping are defined in TS 38.473 section 9.3.1.95 | |

| RAN Parameter ID | RAN Parameter | RAN Parameter Value Type | Key Flag | RAN Parameter Definition | Semantics Descriptions |
|---|---|---|---|---|---|
| 14 | BH RLC Channel to be Modified List | List | | | |
| 15 | >>BH RLC Channel to be Modified Items IEs | Structure | | | |
| 16 | >>BH RLC CH ID | Element | TRUE | This IE uniquely identifies a BH RLC channel in the link between IAB-MT of the IAB-node and IAB-DU of the parent IAB-node or IAB-donor-DU. This IE has a size of 16 bit. | |
| 17 | >>CHOICE BH QoS information | Structure | | | |
| 18 | >>>BH RLC CH QoS | Structure | | | |
| 19 | >>>>BH RLC CH QoS | Element | FALSE | This IE defines the QoS to be applied to a BH RLC channel. This includes required parameters for GBR, Non-GBR and Delay critical GBR BH RLC channels as defined in TS 38.473 section 9.3.1.45 | Shall be used for SA case |
| 20 | >>>E-UTRAN BH RLC CH QoS | Structure | | | |

| RAN Parameter ID | RAN Parameter | RAN Parameter Value Type | Key Flag | RAN Parameter Definition | Semantics Descriptions |
|---|---|---|---|---|---|
| 2842 — 21 | >>>>E-UTRAN BH RLC CH QoS | Element | FALSE | This IE defines the QoS to be applied to a BH RLC channel for EN-DC case as defined TS 38.473 section 9.3.1.19 | Shall be used for EN-DC case |
| 2844 — 22 | >>>Control Plane Traffic Type | Structure | FALSE | | |
| 2846 — 23 | >>>>Control Plane Traffic Type | Element | FALSE | This IE indicates the control plane traffic type carried over a BH RLC channel. This IE can have a value in range of 1-3. Control plane traffic types with different priorities are identified by the different codepoints in this IE, where 1 has the highest priority. | |
| 2848 — 24 | >>RLC Mode | Element | FALSE | The RLC Mode IE indicates the RLC Mode used for BH RLC channel. Following modes are supported RLC-AM, RLC-UM-Bidirectional, RLC-UM-Unidirectional-UL, RLC-UM-Unidirectional-DL. | |
| 2850 — 25 | >>BAP Control PDU Channel | Element | FALSE | This IE indicates if BAP control PDU will be carried over this BH RLC channel. | |

| RAN Parameter ID | RAN Parameter | RAN Parameter Value Type | Key Flag | RAN Parameter Definition | Semantics Descriptions |
|---|---|---|---|---|---|
| 26 | >>TrafficMapping Information | Element | FALSE | This IE includes the information used by the gNB-DU to perform traffic mapping. There are 2 types of traffic mapping defined. IP to layer2 Traffic Mapping Info and BAP layer BH RLC channel Mapping Info. Detailed about the mapping is defined in TS 38.473 section 9.3.1.95 | |
| 27 | BH RLC Channel to be Released List | List | | | |
| 28 | >BH RLC Channel to be Released Item IEs | Structure | | | |
| 29 | >>BH RLC CH ID | Element | TRUE | This IE uniquely identifies a BH RLC channel in the link between IAB-MT of the IAB-node and IAB-DU of the parent IAB-node or IAB-donor-DU. This IE has a size of 16-bit. | |
| 30 | Scheduling over HSNA Slot configured as NOTAVAILABLE | Element | TRUE | Indicates whether this BH RLC channel could be scheduled in a NOTAVAILABLE slot in Downlink and Uplink when HSNA Resource Configuration is enabled. This IE could have a value of Downlink only, Uplink Only and Both. | |

| IE/Group Name | Presence | Remarks |
|---|---|---|
| Message Type | M | |
| RIC Request ID | M | As provided by RIC in RIC Control Request |
| RAN Function ID | M | As provided by RIC in RIC Control Request |

| IE/Group Name | Presence | Range | IE type and reference |
|---|---|---|---|
| BH RLC Channel to be Setup List | | | |
| BH RLC Channel to be Setup Item IEs | | 1 .. <maxnoofBHRLCChannels> | |
| >>BH RLC CH ID | M | | Uniquely identifies a BH RLC channel in the link between IAB-MT of the IAB-node and IAB-DU of the parent IAB-node or IAB-donor-DU. |
| >>CHOICE BH QoS Information | M | | |
| >>>Control Plane Traffic Type | M | | This IE indicates the control plane traffic type carried over a BH RLC channel. |
| >>>>Control Plane Traffic Type | M | | |
| >>RLC Mode | M | | The RLC Mode IE indicates the RLC Mode used for a BH RLC channel. |
| >>Traffic Mapping Information | O | | This IE includes the information used by the gNB-DU to perform traffic mapping |
| >>Allow Scheduling over HSNA Slot configured as NOTAVAILABLE | O | ENUMERATED (True, ...) | |

| IE / Group Name | Presence | Range | IE type and reference | Semantics description |
|---|---|---|---|---|
| CHOICE Traffic Mapping Information Type | M | | | |
| >IP to layer2 Traffic Mapping Info | | | | |
| >>IP to layer-2 Traffic Mapping Info To Add | O | | IP-to-layer-2 traffic mapping information List | This IE indicates the mapping information for forwarding of IP traffic to layer-2 to be added. |
| >>>IP-to-layer-2 mapping information Item | | 1.. <maxnoof Mapping Entries> | | |
| >>>>Mapping Information Index | M | | Bit String of size 26 bit | |
| >>>>IP header information | M | | | |
| >>>>>Destination IAB TNL Address | M | | | This IE indicates the destination IPv4 address, or IPv6 address or IPv6 prefix of a DL packet. |

| IE / Group Name | Presence | Range | IE type and reference | Semantics description |
|---|---|---|---|---|
| >>>>>DS information list | | 0.. \<maxno ofDSInfo> | | |
| >>>>>>DSCP | M | | BIT STRING (SIZE(6)) | This IE indicates the DS information of DL traffic. |
| >>>>>IPv6 Flow Label | O | | BIT STRING (SIZE(20)) | This IE indicates the IPv6 Flow Label of DL traffic. |
| >>>>BH Information | M | | | |
| >>>>>BH Routing ID | O | | | This IE is not needed for the BAP control PDU. For UL F1-U traffic, the BAP address included in this IE also indicates the IAB-donor-DU via which the DL traffic is transmitted. |
| >>>>>Egress BH RLC CH List | | 0..1 | | |
| >>>>>Egress BH RLC CH List Item | | 1.. \<maxnoof EgressLinks> | | |
| >>>>>>Next-Hop BAP Address | M | | | This IE identifies the next-hop node on the backhaul path to receive the packet. The value of this IE should be unique in the whole list. |

| IE / Group Name | Presence | Range | IE type and reference | Semantics description |
|---|---|---|---|---|
| >>>>>>EgressBH RLC CH ID | M | | BH RLC Channel ID being established for PWS message. | This IE identifies the BH RLC channel in the link between the IAB node/IAB-donor-DU and the node identified by the Next-Hop BAP Address IE. |
| >>>>>Non-F1-Terminating IAB-donor Topology Indicator | O | | ENUMERATED (true, ....) | If present, indicates that the Next-Hop BAP Address and Egress BH RLC CH ID contained in this IE pertain to the non-F1-terminating IAB-donor topology of the boundary IAB-node. |
| >BAP layer BH RLC channel Mapping Info | | | | |
| >>BAP layer BH RLC channel Mapping Info To Add | O | | BAP layer BH RLC channel mapping Information List | This IE indicates the mapping information for forwarding of traffic on BAP layer to be added. |
| >>>BAP layer BH RLC channel mapping info Item | | 1.. <maxnoof Mapping Entries> | | |
| >>>>Mapping Information Index | M | | Bit String of size 26 bit | |

| IE / Group Name | Presence | Range | IE type and reference | Semantics description |
|---|---|---|---|---|
| >>>>Prior-Hop BAP Address | O | | BAP address of an IAB-node or of an IAB-donor-DU, and it is part of the BAP Routing ID of size 10 bit. | |
| >>>>Ingress BH RLC CH ID | O | | BH RLC Channel ID being established for PWS message. | |
| >>>>Next-Hop BAP Address | O | | BAP address of an IAB-node or of an IAB-donor-DU, and it is part of the BAP Routing ID of size 10 bit. | |
| >>>>Egress BH RLC CH ID | O | | BH RLC Channel ID being established for PWS message. | |
| >>>>Ingress Non-F1-terminating IAB-donor Topology Indicator | O | | ENUMERATED (true, ....) | If present, indicates that the ingress topology for this entry is the non-F1-terminating IAB-donor topology of the boundary IAB-node. |
| >>>>Egress Non-F1-terminating IAB-donor Topology Indicator | O | | ENUMERATED (true, ....) | If present, indicates that the egress topology for this entry is the non-F1-terminating IAB-donor topology of the boundary IAB-node. |

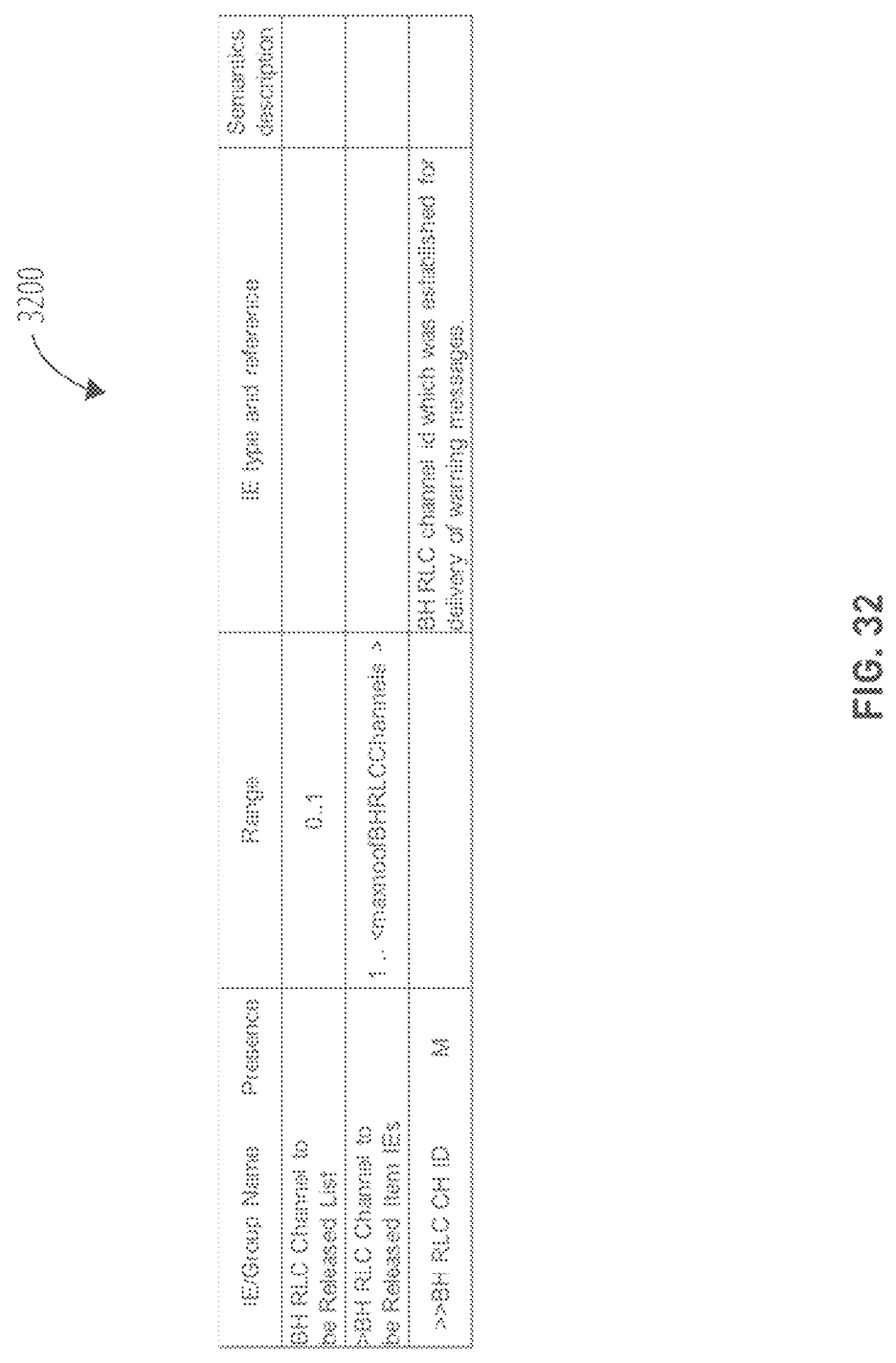

| IE/Group Name | Presence | Range | IE type and reference | Semantics description |
|---|---|---|---|---|
| BH RLC Channel to be Released List | | 0..1 | | |
| >BH RLC Channel to be Released Item IEs | | 1 .. <maxnoofBHRLCChannels > | | |
| >>BH RLC CH ID | M | | BH RLC channel id which was established for delivery of warning messages | |

FIG. 32

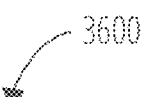

DETERMINE WHETHER A DESIRED RESOURCE FOR ALLOCATION TO THE PWS MESSAGE DATA IS CONFIGURED WITH A HARD, SOFT, OR NOT AVAILABLE RESOURCE CONFIGURATION  3602

DETERMINE WHETHER THERE ARE ANY OTHER PWS MESSAGES TO BE BROADCAST TO PRIORITIZE USE OF THE DESIRED RESOURCE BETWEEN A CHILD IAB-MT AND AN ACCESS UE 3604

SCHEDULE THE PWS MESSAGE DATA DURING THE DESIRED RESOURCE BASED ON THE HARD, SOFT, OR NOT AVAILABLE RESOURCE CONFIGURATION 3606

FIG. 36

PRIORITIZED SCHEDULING AND BROADCAST OF PWS MESSAGES OVER IAB BACKHAUL

TECHNICAL FIELD

This disclosure generally relates to integrated access and backhaul (IAB) and, more particularly, use of IAB in Open Radio Access Network (O-RAN) systems having a centralized near-real time RAN intelligent controller (near-RT RIC).

BACKGROUND INFORMATION

Wireless mobile communication technology uses various standards and protocols to transmit data between a base station and a wireless mobile device. Wireless communication system standards and protocols may include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi®.

In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

An O-RAN is a disaggregated approach to deploying mobile fronthaul and midhaul networks built on cloud native principles. O-RAN is an evolution of the Next Generation RAN (NG-RAN) architecture, first introduced in 3GPP release 15 (5G version 1) technical specification 38.401. The O-RAN Alliance formed to undertake the advancement of NG-RAN philosophies, expanding on the scope of what was originally outlined by the 3GPP. An O-RAN includes an O-RAN radio unit (O-RU), an O-RAN distributed unit (O-DU), and an O-RAN central unit (O-CU).

The following standards provide additional details for wireless mobile communication technology. 3GPP TS 38.321: "NR; Medium Access Control (MAC) protocol specification;" 3GPP TS 38.212: "NR; Multiplexing and channel coding;" 3GPP TS 38.213: "NR; Physical layer procedures for control;" 3GPP TS 38.331: "NR; Radio Resource Control (RRC); Protocol specification;" 3GPP TS 38.300: "NR; NR and NG-RAN Overall description; Stage-2;" O-RAN.WG3.E2AP; ORAN.WG3.E2SM-RC; and O-RAN.WG3.E2SM.

SUMMARY OF THE DISCLOSURE

The RIC is an O-RAN Alliance defined centralized network function that can be deployed as a cloud native platform. There are two types of RIC: non-real time (non-RT) and near-real time (near-RT), defined based on the response time they take to effect changes in RAN.

In general, E2 is the interface between a near-RT RIC and O-RAN E2 nodes (CUs and DUs). This interface employs the following protocol: E2 application protocol (E2AP). E2AP supports the functions of the E2 interface by defined signaling procedures. E2AP establishes the logical connection between two E2AP end-points (near-RT RIC and O-RAN CU/DU) and provides services to implement an E2 service model (E2SM). O-RAN Alliance WG3 standardized the following E2SMs, which are implemented as xApps in near-RT RICs: E2SM cell configuration and control (CCC), E2SM key performance measurement (KPM), E2SM network interfaces (NI), E2SM RAN control (RC). CCC aims at exposing configuration and control related processes on a cell-level basis. A use case supported in E2SM-CCC is slice SLA assurance, whose configuration parameters are carried in corresponding information elements with JSON encoding. KPM defines the RAN function handling reporting of the cell-level performance measurements for the 5G networks as well as for the EPC networks, and their possible adaptation of UE-level or QoS flow-level measurements. NI is used to provide RIC service exposure of the network interface logical function of the E2 node. RC defines the capabilities exposed over E2 interface to enable efficient control of RAN, including radio bear control, radio access control, connected mode mobility, etc.

IAB is standardized in 3GPP release 16 and aims to reuse for backhaul purposes the existing 5G radio air interface. IAB deployment delivers cost-effective alternative to optical cell site backhaul by leveraging the spectral efficiencies of NR and higher spectrum bands available in 5G. For expanded coverage in locations constrained with right of way access issues to deploy advanced antenna systems, the standards-defined IAB alleviates the 5G deployment issues. The IAB solution is deployed to solve the radio connectivity issues in remote and difficult terrain conditions where other backhaul deployment options are either not feasible or cost effective. Accordingly, IAB enables wireless relaying in NG-RAN. Since an IAB-donor processes digital baseband data for making time-sensitive decisions based on cross-layer and cross-functional interactions, service providers seeking to deploy IAB within an O-RAN ecosystem could benefit from a centralized near-RT RIC function as it enables intelligent monitoring and optimization of RAN resources based on data driven intelligence. The near-RT RIC interacts with IAB-donor-DU and CU via the E2 interface. RICs are generally deployed in a centralized manner, e.g., in public or private servers, and they are connected to E2 nodes (such as CU and DU) using a physical (e.g., fiber) link, which is not accessible between an IAB-node and a near-RT RIC.

With the two-antenna system configuration specified for an IAB-node and IAB donor, IAB donors terminate the backhaul traffic from distributed nodes and serve the end users in a disaggregated O-RAN network. The IAB donor comprising of CU and DU and the distributed IAB-nodes constitute a gNB/NG-RAN that terminates its isolated backhaul into a 5G core. Service providers could deploy IAB using the same frequencies employed for UE access. The IAB-Mobile Termination (MT) antenna could use independent or shared antenna systems for access. Shared systems can be more efficient than decoupled solutions. Deploying IAB solutions in such constrained environments will allow service providers to leverage high-speed 5G access connectivity and deliver public warning system (PWS) alerting services in cases of emergency situations. Building 5G networks that can deliver reliable connectivity with public safety enhances customer satisfaction and drives adoption. Advanced standards defined features such as IAB implemented with intelligent access-core communication and controlled delivery methods using dynamic RIC interactions enable the IAB network resources to be utilized effectively with data driven intelligence. Vendors stay ahead of their competition by delivering 5G networking software solutions that enhance a service provider's commitments and differentiation with public safety communications and customer experience, while minimizing subscriber churn.

This disclosure describes techniques for establishing E2 links between an IAB-node and a near-RT RIC, PWS message delivery over an established backhaul (BH) radio link control (RLC) channel, and scheduler enhancements for coordinating the BH RLC channel. Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

FIGS. 2A and 2B (collectively, FIG. 2) are a set of three block diagrams showing protocol stacks for IAB in accordance with one embodiment.

FIG. 6 is a flow chart of a process for establishing an E2 link between a near-RT RIC and an IAB-node, according to one embodiment.

FIG. 7 is a flow chart of a method for establishing an E2 link between a near-RT RIC and an IAB-node, according to another embodiment.

FIG. 8 is a flow chart of a process for establishing an E2 link between a near-RT RIC and an IAB-node, according to another embodiment.

FIG. 11 is a table of information elements of a RIC subscription request in accordance with one embodiment.

FIG. 12 is a table of information elements of a RIC event trigger definition in accordance with one embodiment.

FIG. 13 is a table of information elements of a RIC action definition in accordance with one embodiment.

FIG. 14 is a table of information elements of an E2SM-RC action definition format 1 in accordance with one embodiment.

FIG. 15 is a table of information elements of a RIC subscription response in accordance with one embodiment.

FIG. 16 is a table of information elements of a RIC indication in accordance with one embodiment.

FIG. 17 is a table of information elements of an E2SM-RC indication header format 1 in accordance with one embodiment.

FIG. 18 is a table of information elements of an E2SM-RC indication message format 1 in accordance with one embodiment.

Figure 20A:
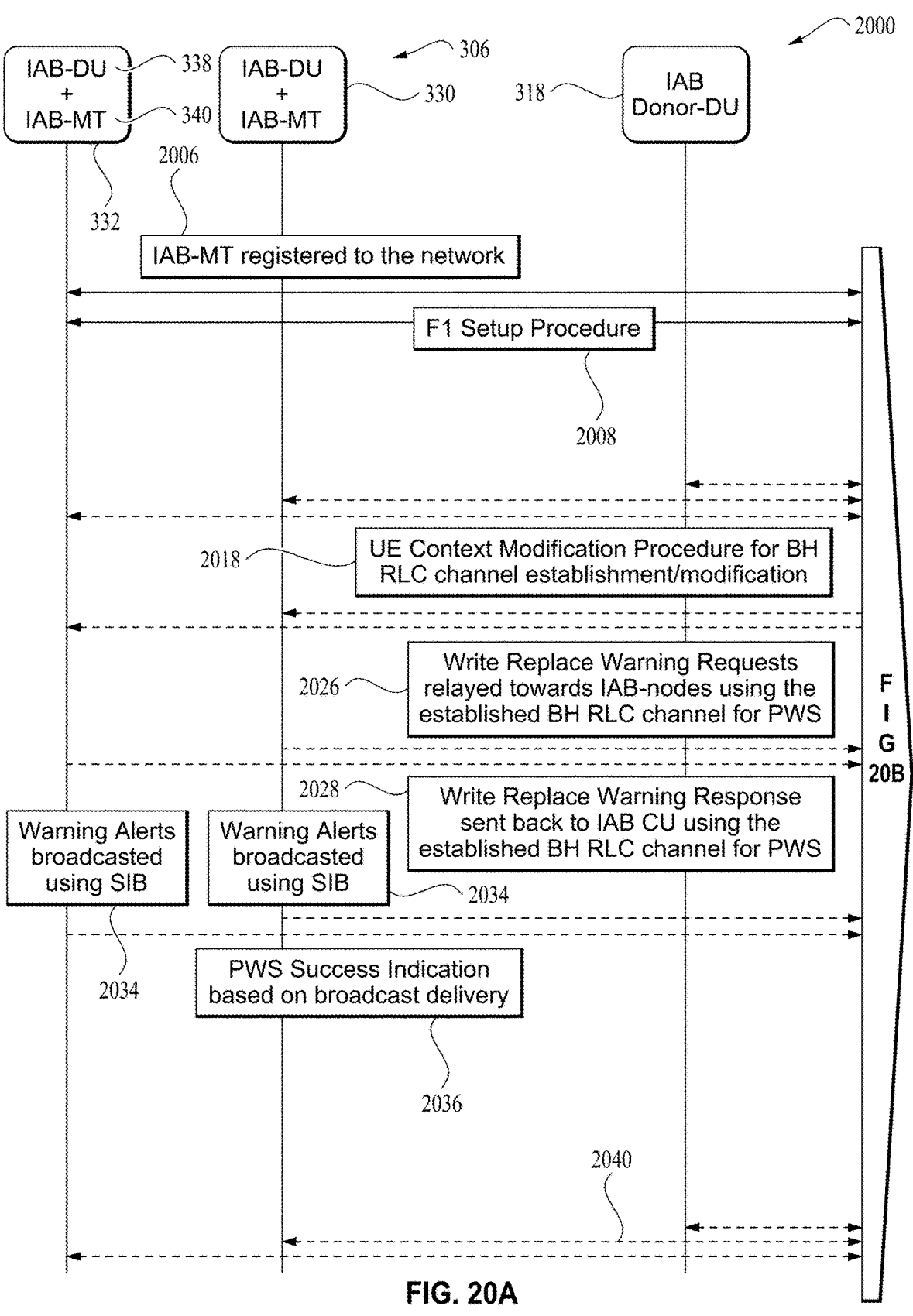
Figure 20B:
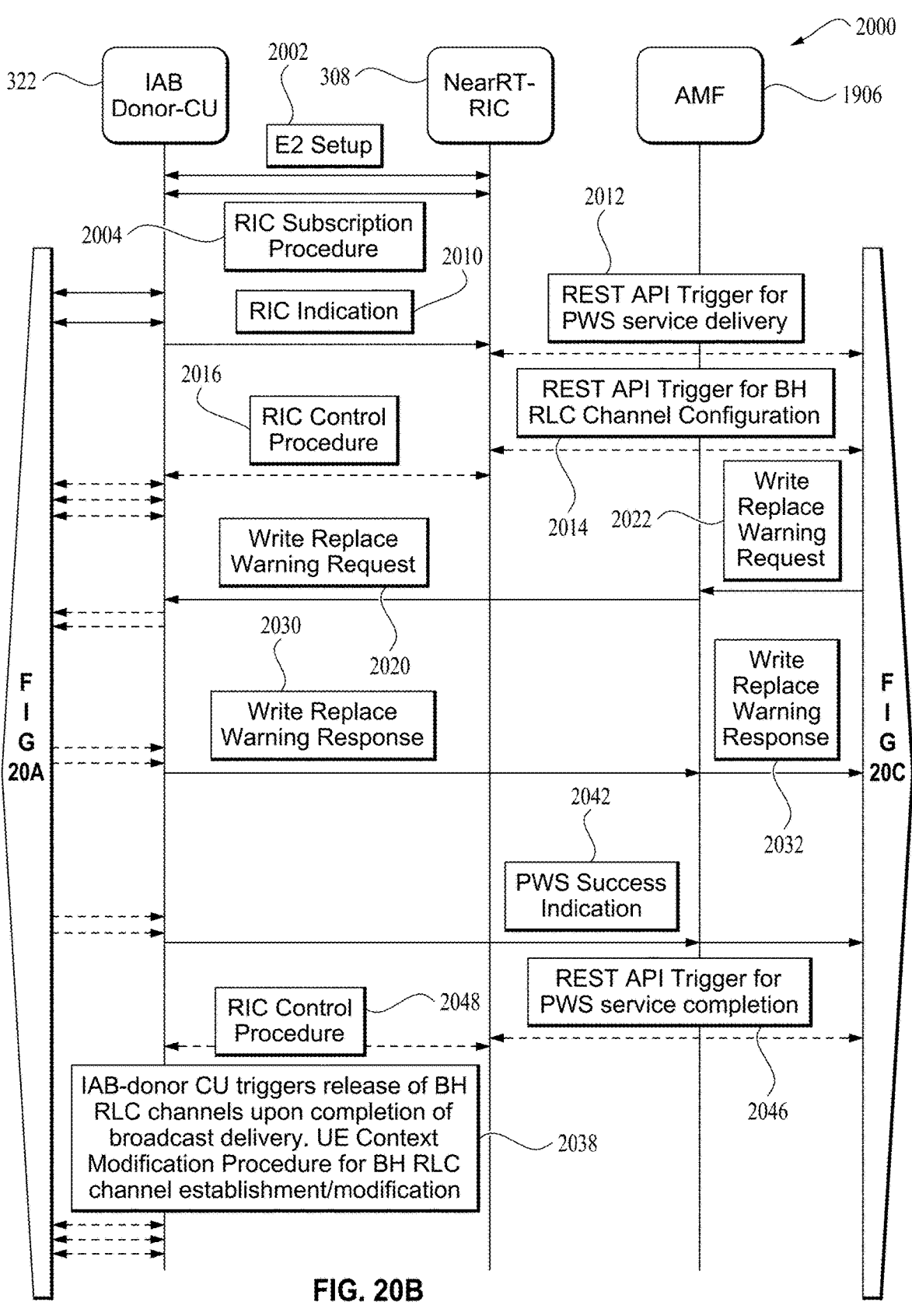
Figure 20C:
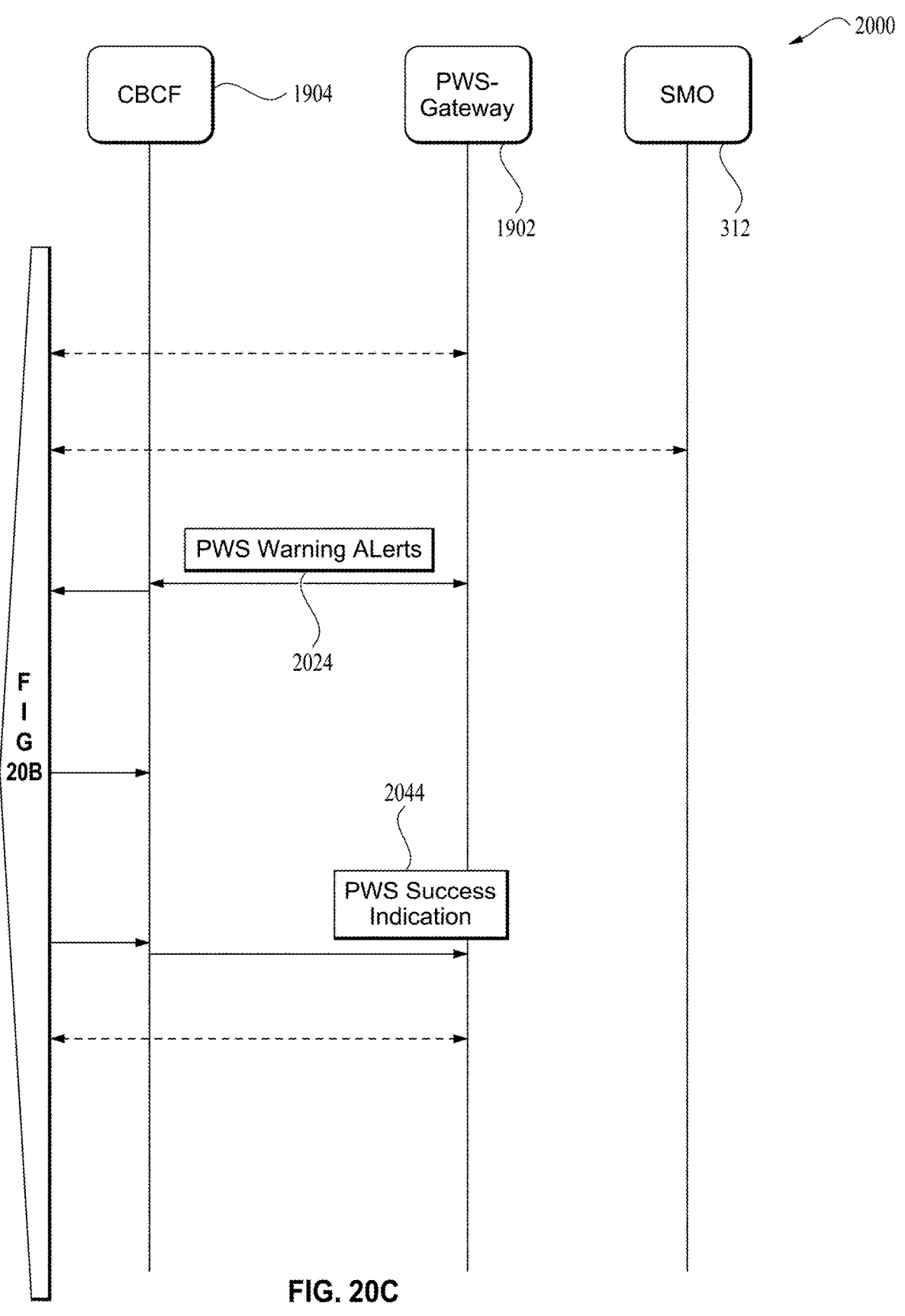

FIGS. 20A, 20B, and 20C (collectively, FIG. 20) are a message sequence diagram for a process of PWS message delivery over IAB backhaul with success indication in accordance with one embodiment.

Figure 21A:
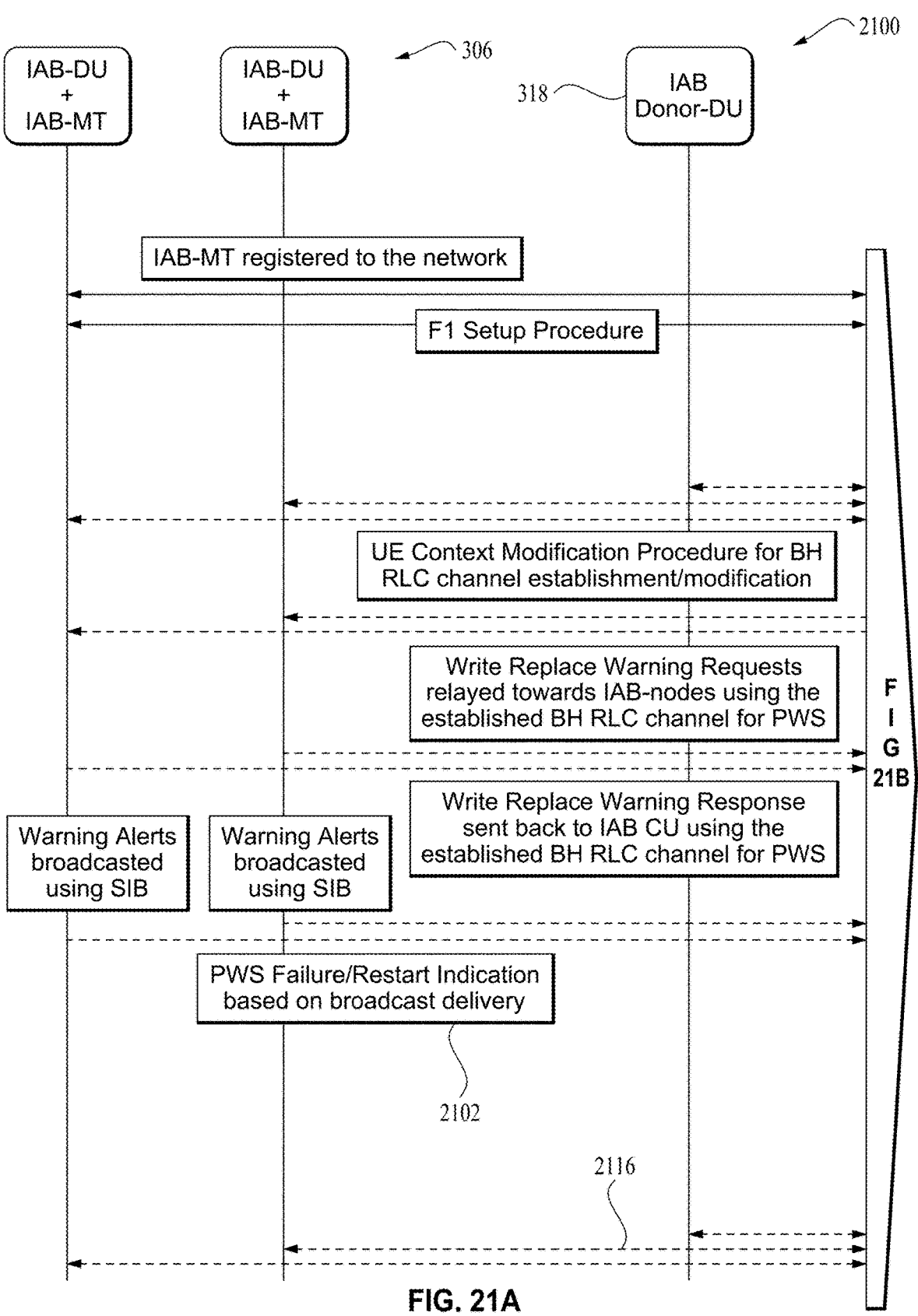
Figure 21B:
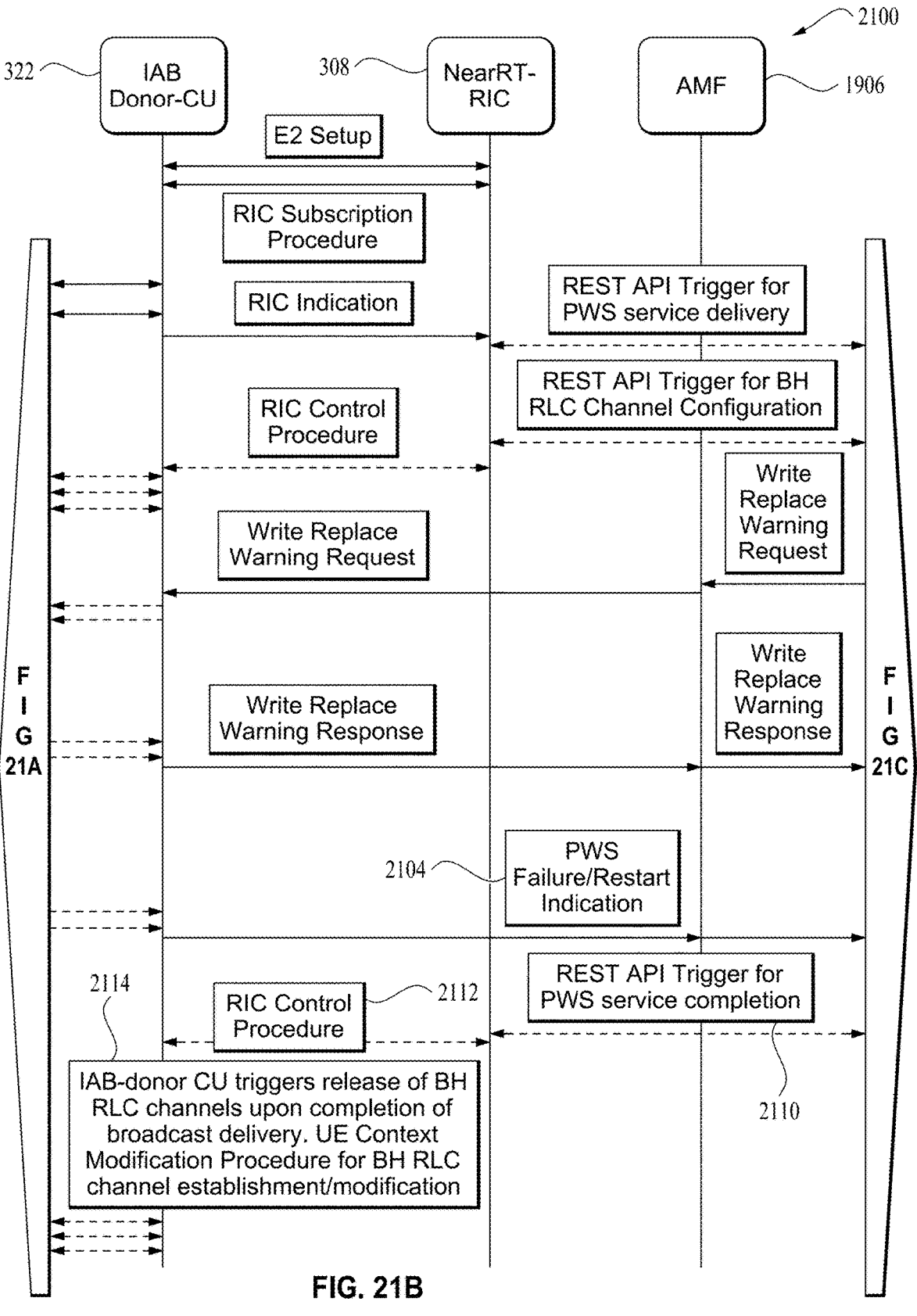
Figure 21C:
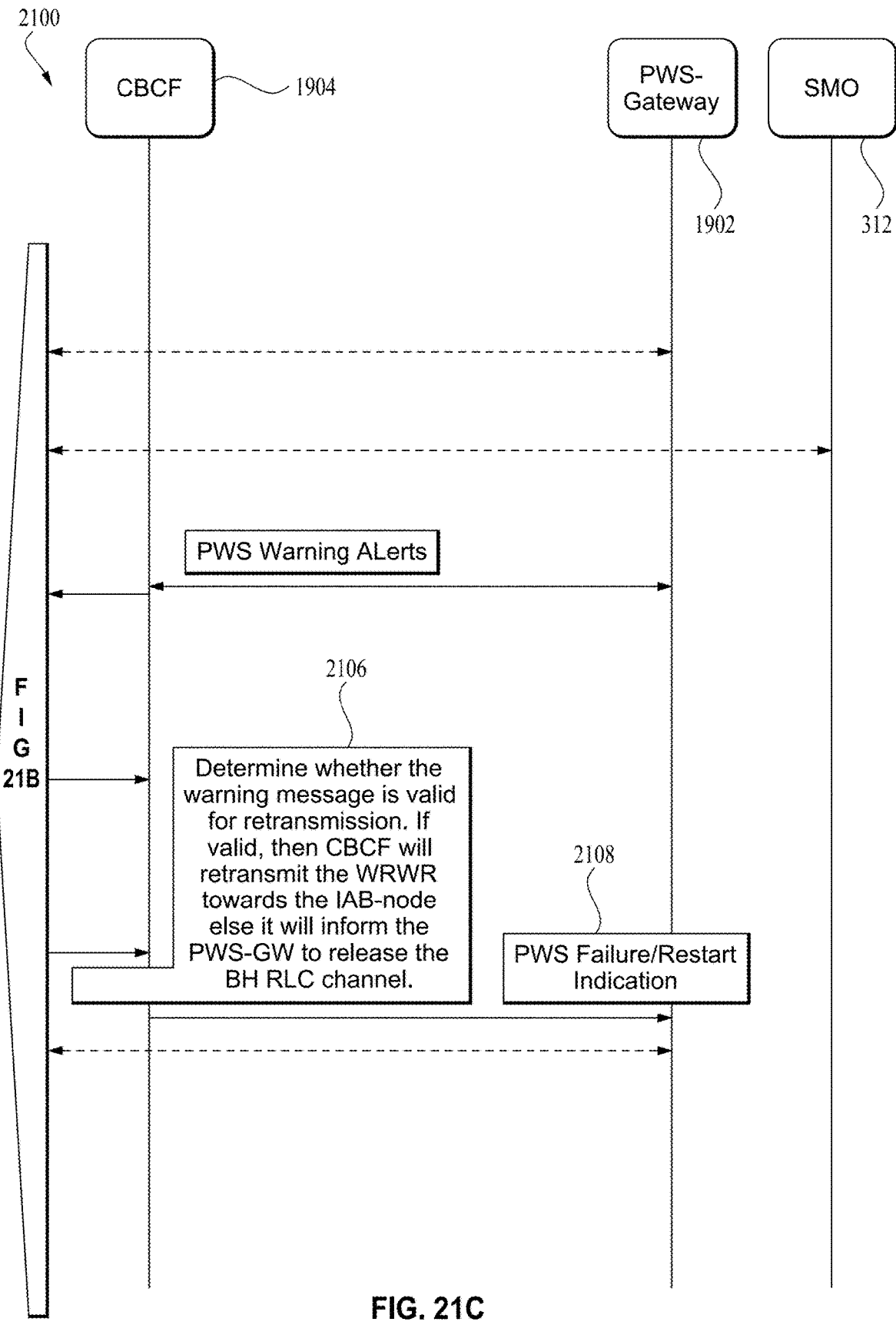

FIGS. 21A, 21B, and 21C (collectively, FIG. 21) are a message sequence diagram for a process of PWS message delivery over IAB backhaul with failure/restart indication in accordance with one embodiment.

Figure 22A:
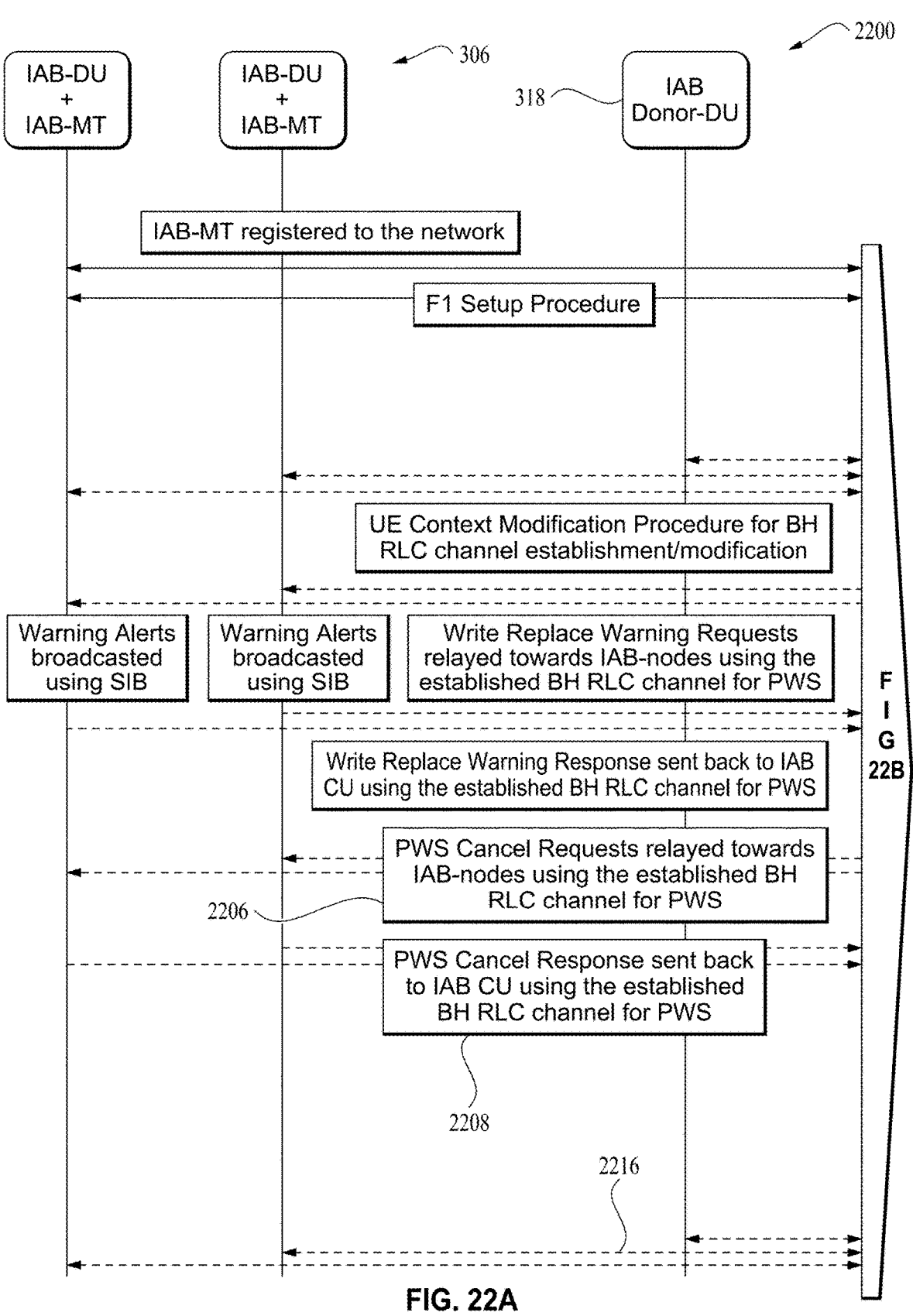
Figure 22B:
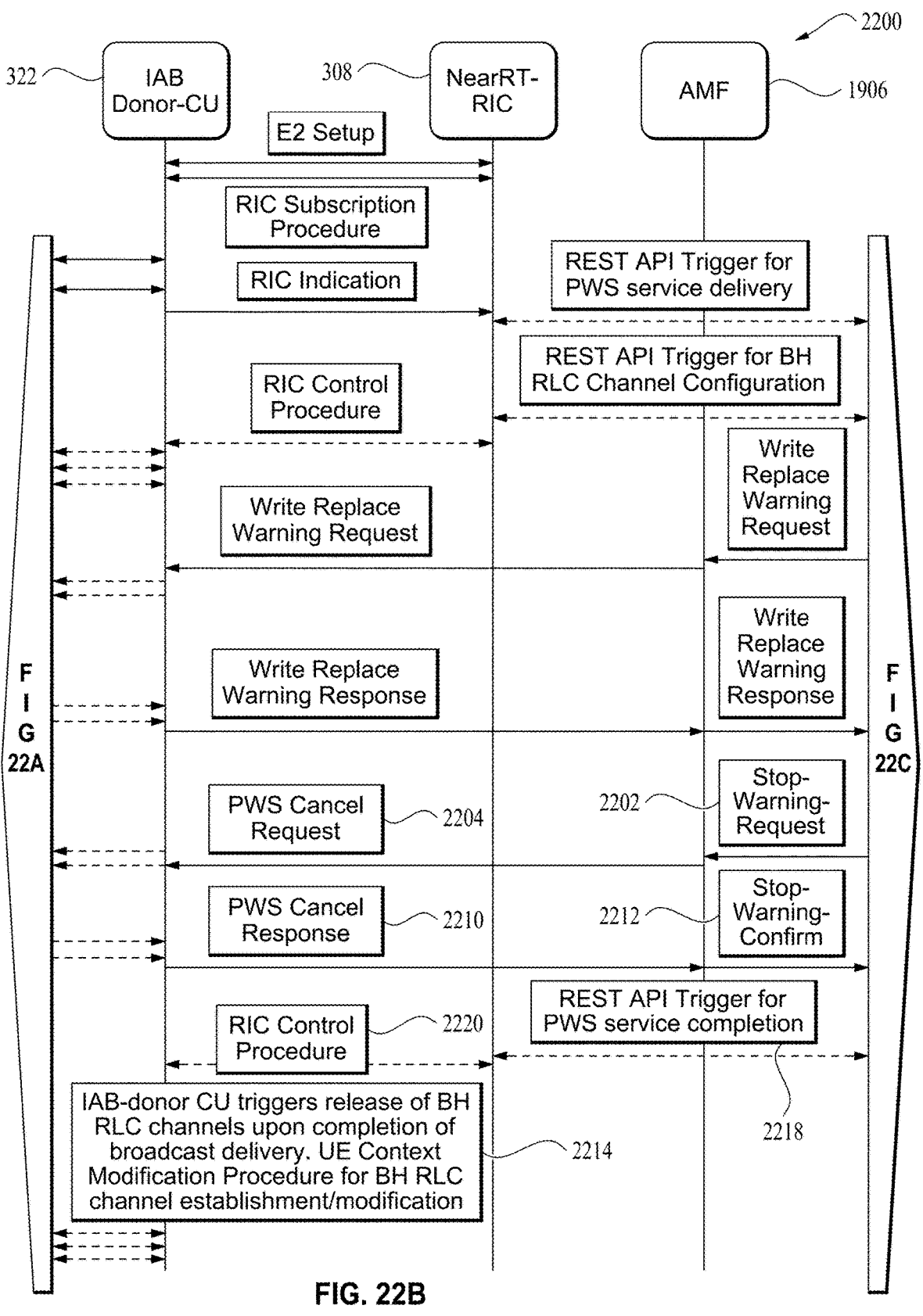
Figure 22C:
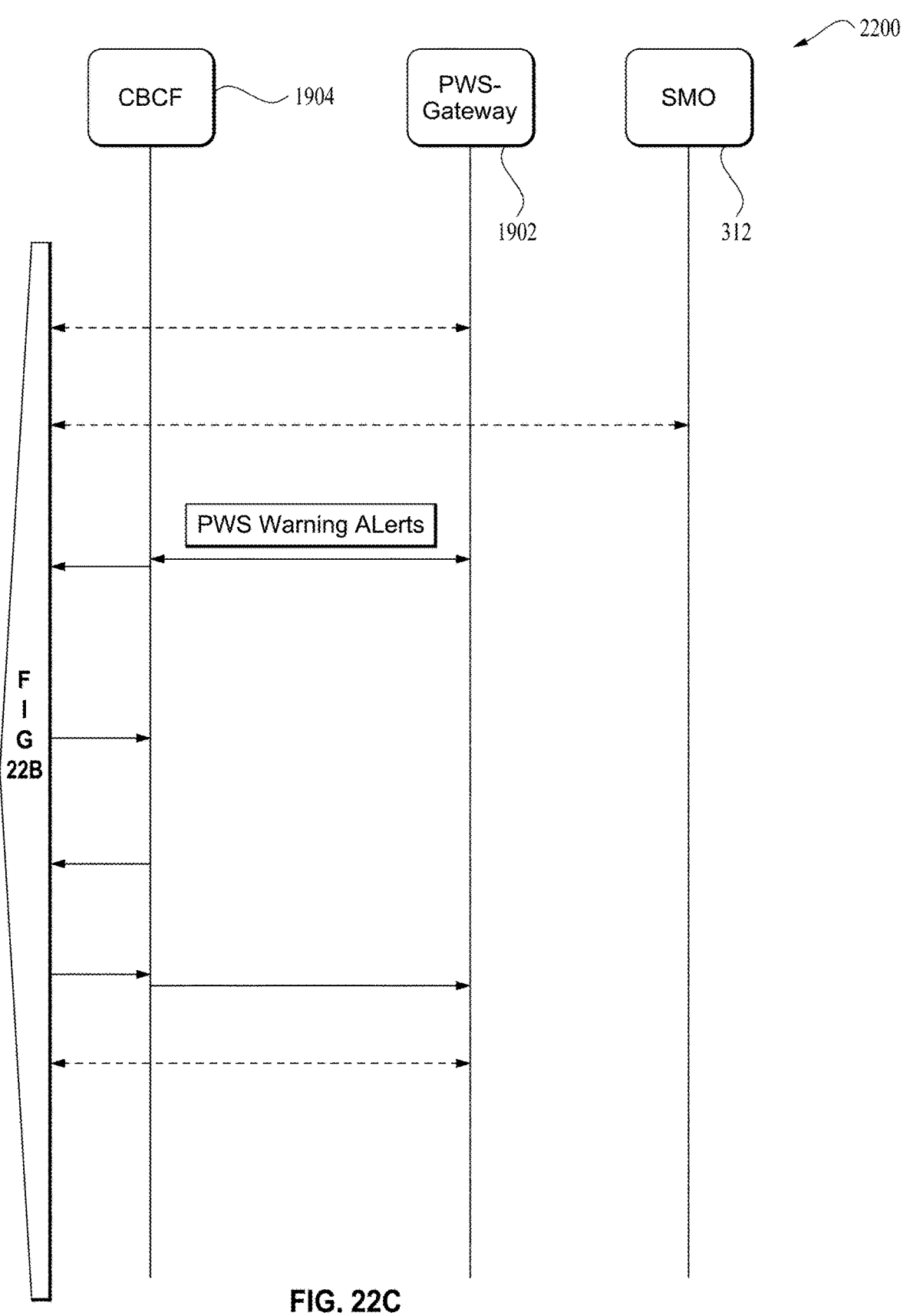

FIGS. 22A, 22B, and 22C (collectively, FIG. 22) are a message sequence diagram for a process of PWS message delivery over IAB backhaul with warning cancellation in accordance with one embodiment.

Figure 23:
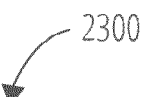

FIG. 23 is a flow diagram of a process in accordance with one embodiment.

Figure 24:
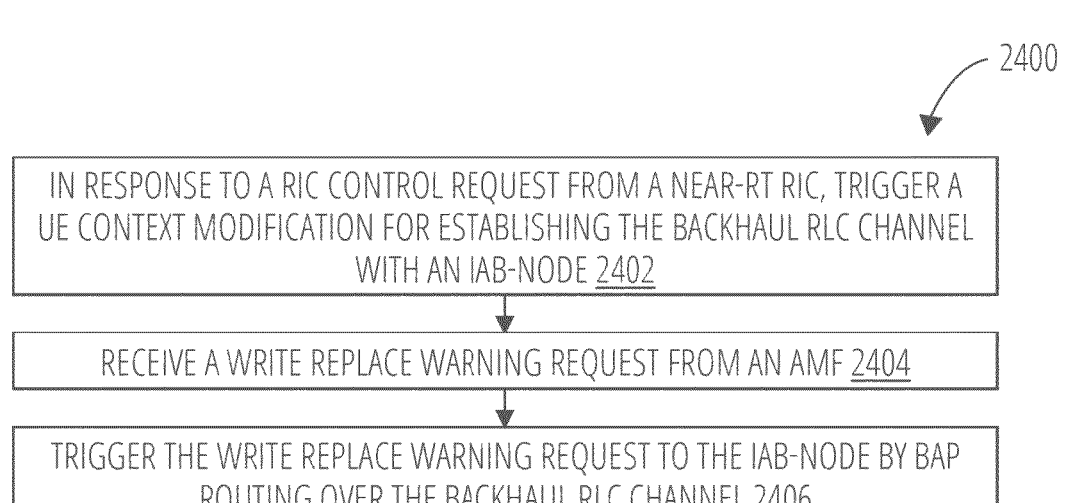

FIG. 24 is a flow diagram of a process in accordance with one embodiment.

FIG. 25 is a table of information elements of a RIC control request in accordance with one embodiment.

FIG. 26 is a table of information elements of a RIC control header in accordance with one embodiment.

FIG. 27 is a table of information elements of a RIC control message in accordance with one embodiment.

FIGS. 28A and 28B are a table of information elements of RAN parameters for backhaul RLC channel setup in accordance with one embodiment.

FIGS. 28C, 28D, and 28E are a table of information elements of RAN parameters for backhaul RLC channel modification and release in accordance with one embodiment.

FIG. 29 is a table of information elements of a RIC control request acknowledgement in accordance with one embodiment.

FIG. 30 is a table of information elements of a UE context modification in accordance with one embodiment.

FIGS. 31A, 31B, 31C, and 31D (collectively, FIG. 31) are a table of information elements of traffic mapping information in accordance with one embodiment.

FIG. 32 is a table of information elements for releasing a backhaul RLC channel in accordance with one embodiment.

Figure 33:
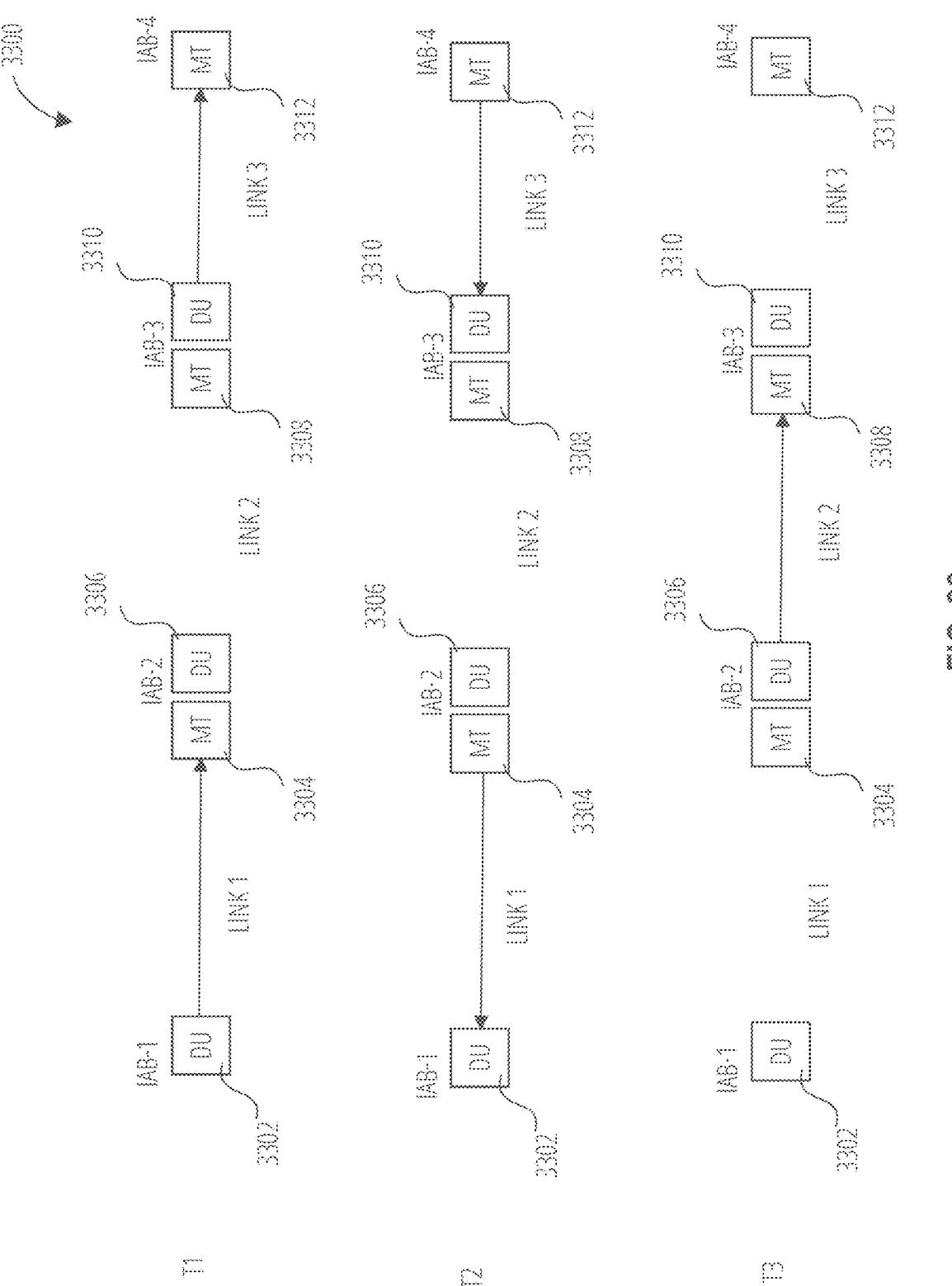

FIG. 33 is a timing diagram showing, at three times, resource allocation at Dus for hard and not available resources in accordance with one embodiment.

Figures 34A, 34B:
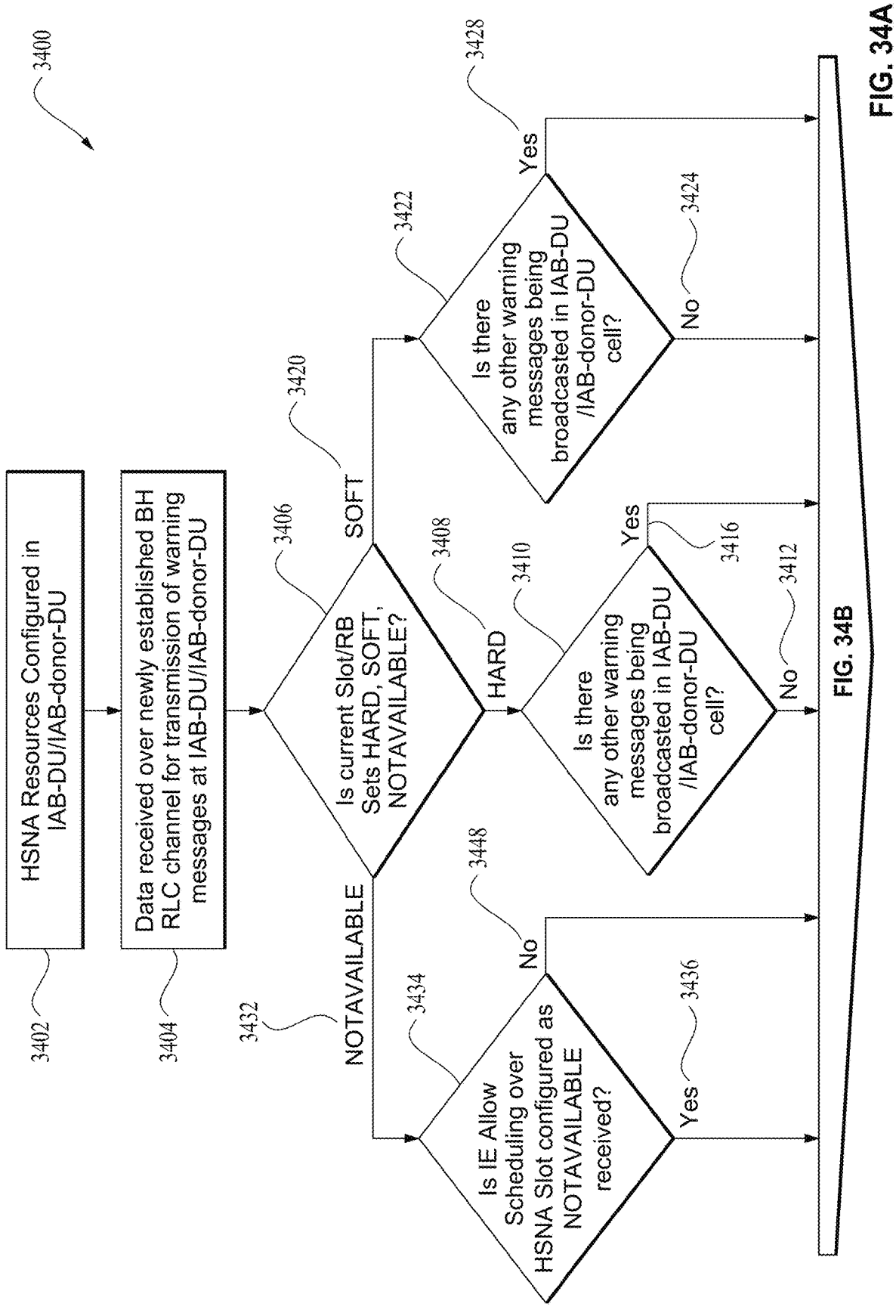

FIGS. 34A and 34B (collectively, FIG. 34) are a flow diagram showing a scheduler process at an IAB-donor-DU and an IAB-DU in accordance with one embodiment.

Figure 35:
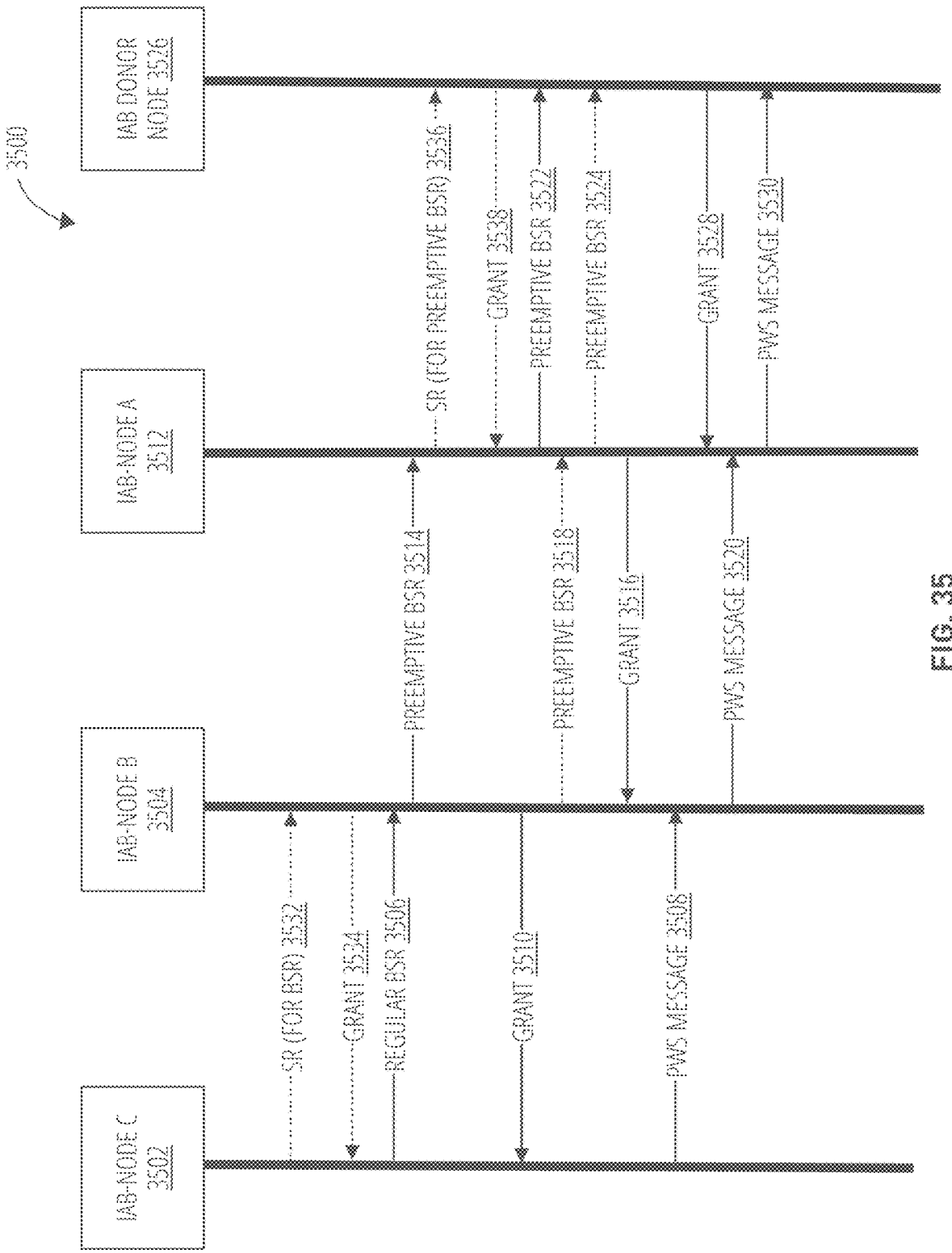

FIG. 35 is a message sequence diagram for a process of preemptive buffer status report (BSR) scheduling in accordance with one embodiment.

FIG. 36 is a flow diagram of a process in accordance with one embodiment.

Figure 37:
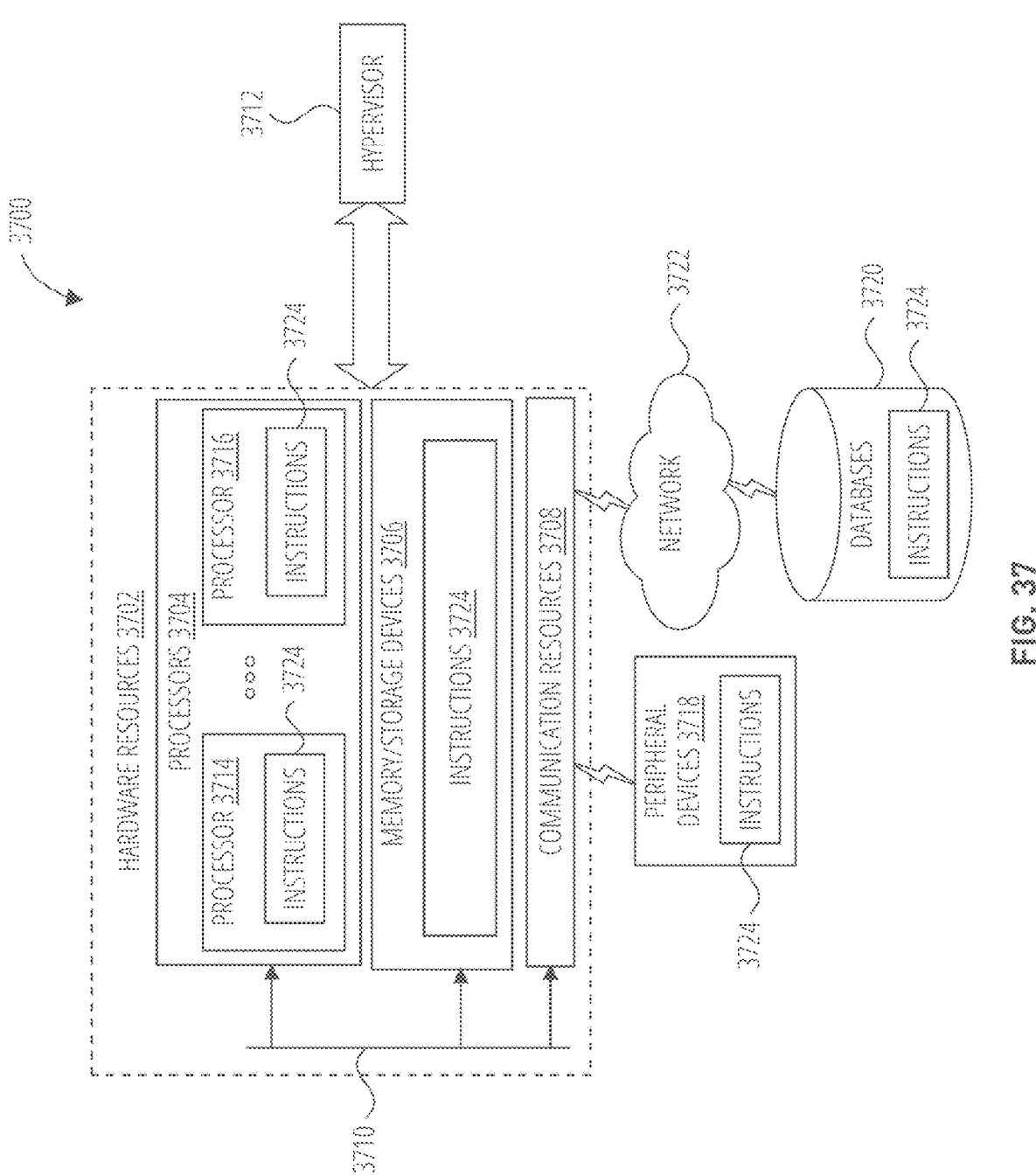

FIG. 37 is a block diagram of computing components for performing the disclosed procedures in accordance with one embodiment.

DETAILED DESCRIPTION OF EMBODIMENTS

Figure 1:
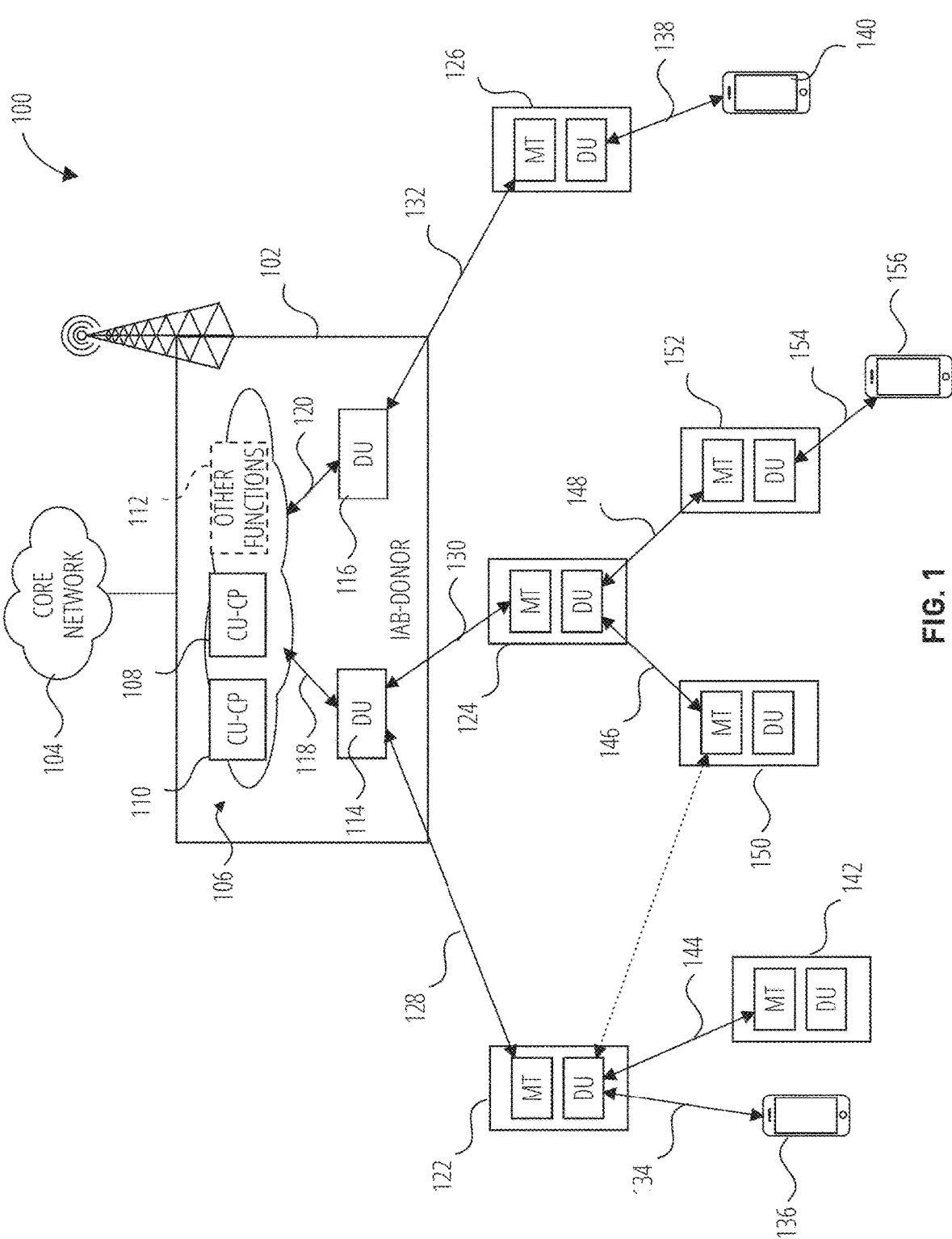
FIG. 1 is a block diagram showing an IAB topology in accordance with one embodiment.

FIG. 1 shows an IAB topology 100 including an IAB-donor 102, which is a gNB or O-RAN that acts as the terminating node of NR backhauling on a 5G core network 104 side. IAB-donor 102 includes a CU 106 shown as a CU-CP 108, a CU-UP 110, and other functions 112 that are described in greater detail below. IAB-donor 102 also includes distributed units such as a DU 114 and a DU 116. DU 114 and CU 106 share a wireline connection 118. DU 116 and CU 106 share a wireline connection 120. IAB-donor 102 performs centralized resource, topology and route management for its IAB topology 100.

The relaying node, referred to as an IAB-node, supports access and backhauling via NR. An IAB-node can access 5G core network 104 in both standalone (SA) mode or EN-DC mode. IAB backhauling can be deployed with single or multiple hops.

An IAB-node supports DU functionality to terminate the NR access interface to Ues and next-hop IAB-nodes, and to terminate the F1 protocol to the gNB-CU functionality on the IAB-donor. The DU functionality on the IAB-node is referred to as IAB-DU.

In addition to the gNB-DU functionality, an IAB-node also supports a subset of UE functionality referred to as IAB-MT, which includes, e.g., physical layer, layer-2, RRC and NAS functionality to connect to the gNB-DU of another IAB-node or the IAB-donor, to connect to the gNB-CU on the IAB-donor, and to the core network.

All IAB-nodes that are connected to IAB-donor 102 (via one or multiple backhaul hops and controlled by this IAB-donor 102 via F1AP and/or RRC) form IAB topology 100 with IAB-donor 102 as its root. In IAB topology 100, the connected node of an IAB-DU or an IAB-donor-DU is referred to as the child node and the connected node of an IAB-MT is referred to as the parent node. The direction toward the child node is referred to as downstream while the direction toward the parent node is referred to as upstream.

IAB-node performs relaying in layer 2. IAB supports dynamic topology update, i.e., the IAB-node can change the parent node, e.g., another IAB-node, or the IAB-donor, during operation, for example in response to backhaul link failure or blocking.

In the example of FIG. 1, there are three IAB-nodes that connect directly to IAB-donor 102, including IAB-node 122, IAB-node 124, and IAB-node 126. IAB-node 122 has a wireless backhaul link 128 with DU 114. IAB-node 124 has a wireless backhaul link 130 with DU 114. IAB-node 126 has a wireless backhaul link 132 with DU 116.

IAB-node 122 provides 5G access link 134 to a UE 136. Similarly, IAB-node 126 proves 5G access link 138 to a UE 140. IAB-node 122 also supports IAB-node 142 via wireless backhaul link 144.

IAB-node 124 provides wireless backhaul link 146 and wireless backhaul link 148 for, respectively, an IAB-node 150 and an IAB-node 152. IAB-node 152 provides a 5G access link 154 for a UE 156.

FIG. 2 shows an example of a protocol stacks 200 for IAB. As defined in 3GPP TS 38.300, for IAB protocol stacks 200 include a protocol stack for F1U protocol 202, a protocol stack for F1C protocol 204, and a protocol stack for IAB-MT's RRC and NAS connection 206.

As shown in protocol stack for FIU protocol 202 and protocol stack for F1C protocol 204, a new protocol, called backhaul adaptation protocol (BAP), is introduced to handle wireless backhaul. BAP performs following functions: (1) data transfer, (2) determination of BAP destination and path for packets from upper layers, (3) determination of egress BH RLC channels for packets routed to next hop, (4) routing of packets to next hop, (5) BAP header rewriting, (6) differentiating traffic to be delivered to upper layers from traffic to be delivered to egress link, (7) flow control feedback and polling signaling, and (8) handling of BH radio link failure (RLF) related indications.

Figure 3:
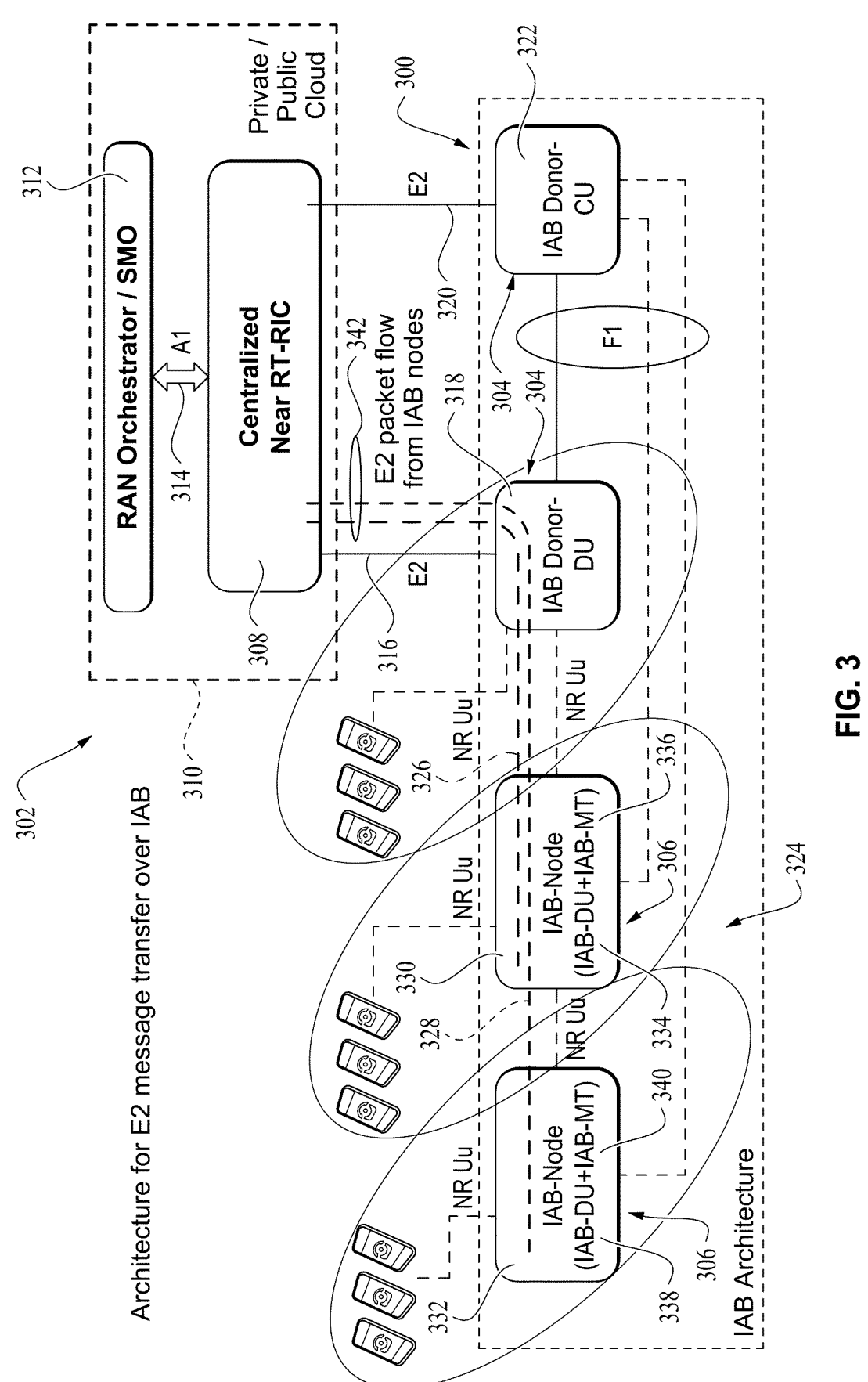
FIG. 3 is a block diagram of an IAB architecture in accordance with one embodiment.

FIG. 3 shows another example of an IAB architecture 300 for an O-RAN deployment 302. IAB architecture 300 includes IAB donor nodes 304 and IAB-nodes 306. O-RAN deployment 302 includes a near-RT RIC 308 which is in a private/public cloud 310 and communicates with a RAN orchestrator/SMO 312 via an A1 interface 314. As noted above, near-RT RIC 308 has an E2 interface 316 with an IAB-donor-DU 318 and an E2 interface 320 with an IAB-donor-CU 322.

Remote IAB-Dus 324 have no physical link possible with near-RT RIC 308. Thus, an E2 link establishment with near-RT RIC 308 over physical link such as fiber is not feasible. Accordingly, this disclosure describes an E2 link 326 or 328 between near-RT RIC 308 and remote IAB-Dus 324 using the same IAB backhaul that is used for transmission of F1-C and F1-U traffic.

In the example of FIG. 3, remote IAB-Dus 324 include an IAB-node 330 and an IAB-node 332. IAB-node 330 includes an IAB-DU 334 and an IAB-MT 336. IAB-node 332 includes an IAB-DU 338 and IAB-MT 340.

E2 links 326 and 328 can be established at the IAB-node level or at the IAB-DU level. For instance, if E2 link 328 is established at the IAB-node level, then it is established between IAB-node 332 (IAB-DU+IAB-MT) and near-RT RIC 308. Near-RT RIC 308 is able to perform defined operations over established E2 link 328 at both IAB-DU 338 and IAB-MT 340. Similarly, if E2 link 328 is established at the IAB-DU level, then it is established between IAB-DU 338 and near-RT RIC 308. Near-RT RIC 308 is able to perform defined operations over established E2 link 328 at IAB-DU 338.

E2 link establishment at IAB-node level or IAB-DU level depends on the type of operations to be performed over the established E2 link. For example, in case of E2SM-KPM operations (described below), which leverages an E2 node to report KPI related measurements, the operation can be performed at the IAB-node level, such that KPIs of both the IAB-DU and the IAB-MT are reported by the IAB-node. In another example for the IAB-DU level E2 link establishment, there are E2SM-RC operations (described below) for radio access control in which radio access related control is performed between the near-RT RIC and the IAB-DU over an established E2 link. The IAB-MT has no role in this example, so the E2 link can be established at the IAB-DU level. The general process for performing E2SM operations is set forth in O-RAN E2 Application Protocol (E2AP) 3.01.

When near-RT RIC 308 is deployed, E2AP traffic between remote IAB-Dus 324 is routed via IAB backhaul links. Each IAB-node in the deployment (such as IAB-Dus 334 and 338, IAB-donor-DU 318, and IAB-donor-CU 322) can be connected individually towards near-RT RIC 308. By using existing architecture of IAB, near-RT RIC 308 can be deployed and E2AP PDUs 342 will be routed over IAB. This approach leverages existing IAB deployment for transport of E2AP PDU 342 over an E2 link 326 or 328 in a similar manner as to how other control signaling related messages get transported over IAB backhaul. This E2AP PDU 342 transmission helps operators save significant capital expenditure (Capex) when existing IAB architecture is reused.

Through E2 interface, near-RT RIC 308 is able to perform different E2SM-RC operations such as insert, report, control, policy, or other related operations in real time at IAB-DU. These operations are defined in the O-RAN.WG3.E2SM-RC-R003-v03.00 specification, and other functions may be available in the future. As an example, upon the arrival of an RRC measurement report in the E2 node due to the occurrence of an A3 event pertaining to a UE (which constitutes the event trigger), the E2 node (e.g., IAB-DU 334) sends a message to near-RT RIC 308 using the "Connected Mode Mobility" "INSERT" service style and the "Handover Control Request" INSERT indication along with the "target cell ID" parameter. Near-RT RIC 308 then accepts/denies the "Handover Control Request." If near-RT RIC 308 accepts, near-RT RIC 308 should set the value of the "target cell ID" parameter and send a "CONTROL" action back to IAB-donor-CU 322. Up until then, the E2 node suspends the ongoing call processing for the UE.

In the insert operation, near-RT RIC 308 enables performance of an operation in IAB-DU 338 such as for bearer admission, user admission and RRC such as radio bearer control, radio resource allocation control, connected mode mobility control, radio access control, dual connectivity (DC) control, carrier aggregation (CA) control, idle mode mobility control, and the like over E2 link 328. After the E2 setup procedure is successful, near-RT RIC 308 initiates a RIC subscription procedure consisting of an event trigger and a sequence of actions to be performed by IAB-node 332. If the requested actions are accepted by IAB-node 332, then it will send a RIC subscription response towards near-RT RIC 308. Once a defined event trigger condition is met at IAB-node 332, it triggers a RIC indication towards near-RT RIC 308 and IAB-node 332 may halt a currently ongoing procedure for which the event trigger condition was met. Near-RT RIC 308 triggers a RIC control request towards IAB-node 332 to resume a specific functionality with acceptance or rejection. If IAB-node 332 is able to perform the requested action of acceptance or rejection of specified functionality successfully, then it may or may not send a RIC control request acknowledgement depending on if near-RT RIC 308 requests an acknowledgment from IAB-node 332 in the RIC control request.

In report operations, RIC will instruct IAB-DU to report periodically or on demand different KPI measurements, copy of complete message such as RRC or interface level (F1AP, E1AP, XnAP, etc.) messages, E2 node information and cell related information, UE information, etc. The reported information will be used at RIC for control services such as call processing outcome, data analytics purposes, control UE admission or release, etc.

In control operations, RIC will be enabled to control radio bearer control, radio resource allocation control, connected mode mobility control, radio access control, DC control, CA control, idle mode mobility control, measurement report (MR) configuration control, etc., in IAB-DU over E2 interface.

In policy operations, RIC will be enabled to modify the policy in IAB-DU such as radio bearer policy, radio resource allocation policy, connected mode mobility policy, radio access policy, DC policy, CA policy, idle mode mobility policy, MR configuration policy, etc. over E2 interface.

Through E2 interface, near-RT RIC 308 is able to perform different E2SM-KPM operations such as a KPM report operation in real time at IAB-DU. These operations are defined in the O-RAN.WG3.E2SM-KPM-R003-v03.00 specification, and other functions may be available in the future. In some embodiments, the KPM report services entail reporting E2 node measurement; E2 node measurement for a single UE; condition-based, UE-level E2 node measurement; common condition-based, UE-level E2 node measurement; E2 node measurements for multiple Ues. These services may be initiated according to a periodical event.

Through E2 interface, near-RT RIC 308 is able to perform different E2SM-CCC operations such as insert, report, control, policy, or other related operations in real time at IAB-DU. These operations are defined in the O-RAN.WG3.E2SM-CCC-R003-v01.01 specification, and other functions may be available in the future. In some embodiments, the CCC report services entail reporting node level configuration information in E2 nodes or cell level configuration information in E2 nodes. In some embodiments, the CCC control services entail controlling node level configuration and control in E2 nodes or cell level configuration and control in E2 nodes.

Through E2 interface, near-RT RIC 308 is able to perform different E2SM-NI operations such as an insert, report, control, policy, or other related operations in real time at IAB-DU. These operations are defined in the ORAN-WG3.E2SM-NI-v01.00 specification, and other functions may be available in the future.

In some embodiments, the NI report services include the following operations: copy of complete message with header providing network interface type, identifier and direction with optional network interface timestamp; or copy of partial message selected by target message protocol information element (IE) identifier with header providing network interface type, identifier, direction and message type with optional network interface timestamp. These services may be initiated according to target network interface type, identifier, direction and message type along with the presence of a sequence of one or more message protocol IE identifiers with optional message protocol IE contents selection rules.

In some embodiments, the NI insert services include the following operations: forwarding of complete message with header providing network interface type, identifier and direction with optional network interface timestamp. This service may be initiated according to target network interface type, identifier and direction, message type and presence of a sequence of one or more message protocol IE identifiers with optional message protocol IE contents selection rules.

In some embodiments, the NI control services include the following operations: injection of Complete message with header providing target network interface type, identifier and direction and optional RIC control message priority.

In some embodiments, the NI policy services include the following operations: handling of message admission process according to a list of parameters to be applied to different RAN UE groups. This service may be initiated according to target network interface type, identifier and direction, message type and presence of a sequence of one or more message protocol IE identifiers with optional message protocol IE contents selection rules.

Figure 4:
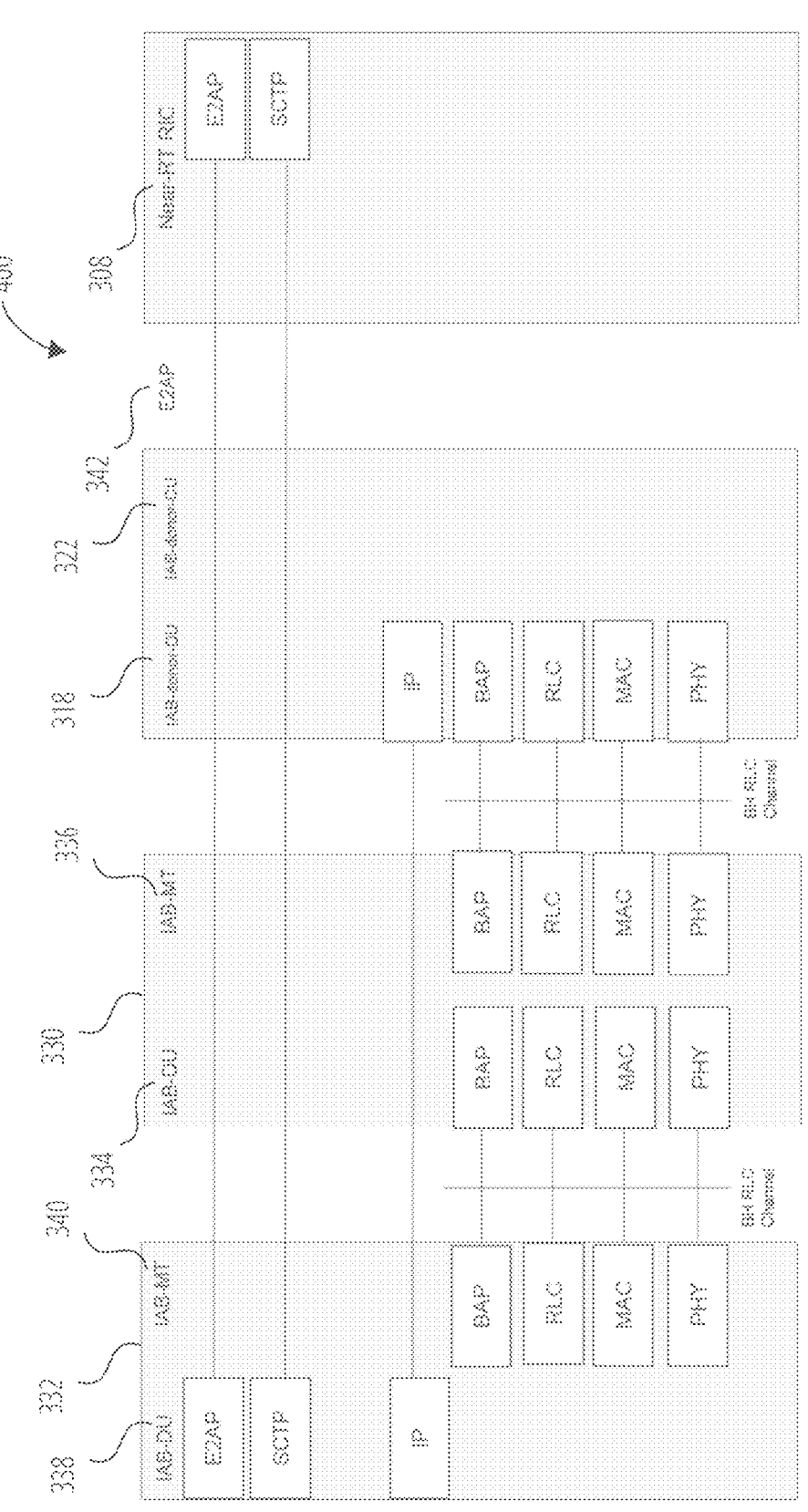
FIG. 4 is a block diagram of a protocol stack for E2AP protocol data unit (PDU) transfer over IAB in accordance with one embodiment.

FIG. 4 shows a protocol stack 400 for IAB architecture 300 (FIG. 3) when E2 traffic is transferred over IAB. As shown in protocol stack 400, the generated E2AP messages (E2AP PDU 342) use stream control transmission protocol (SCTP)/IP at the transport layer. A specific SCTP port is assigned for an E2 link between near-RT RIC 308 and IAB-node 332.

For uplink (UL) operation, E2AP PDU 342 transport from IAB-node 332 to near-RT RIC 308 uses a destination IP address that is filled as the address of near-RT RIC 308 and a source IP address that is filled as the address of IAB-node 332. The assigned IP address may be Ipv4 or IPv6. A higher priority DSCP value is used in a "type of service" field for IPv4 header and "traffic class" for IPv6 header to prioritize E2AP PDU transmission in a multi-hop IAB architecture.

Similarly for downlink (DL) operation, E2AP PDU 342 transport from near-RT RIC 308 towards IAB-node 332 uses a destination IP address of IAB-node 332 and a source IP address will be filled as the IP address of near-RT RIC 308. As explained below with reference to FIG. 5, IAB-donor-CU 322 allocates and shares with near-RT RIC 308 the IP address of IAB-node 332.

The remaining protocol stack shown in FIG. 4 includes BAP, RLC, MAC, and PHY layers, which will use existing functionality for transmission of E2AP PDU 342.

A generated E2AP PDU at IAB-node 332 will be routed over intermediate IAB-node 330 using BAP protocol. E2AP PDU will use any backhaul channel established to deliver control plane traffic.

E2AP traffic is classified as non-F1 PDU and is routed over BAP. The priority for transmission/reception of E2AP PDU follows a similar procedure and priority implemented for control plane traffic.

In the scheduler, control plane traffic such as E2AP PDU is scheduled with higher priority than user plane traffic in IAB-donor-DU 318 and IAB-DUs 334 and 338.

Once E2AP PDU 342 is received at IAB-donor-DU 318, it will send received E2AP PDU 342 towards near-RT RIC 308. E2AP PDU 342 received from near-RT RIC 308 is routed towards BAP by IAB-donor-DU 318.

For QoS traffic mapping on E2 interface, the traffic mapping over IAB for E2AP PDU will follow a similar approach as done for other control plane traffic such as UE associated F1AP or non-UE associated F1AP messages.

IAB-donor-DU 318 performs IP-to-layer 2 traffic mapping for E2AP PDU using a similar configuration to that which are assigned for control plane BH RLC channel and over BAP, routing will be done by using the unique BAP address assigned to IAB-node 332 during the IAB-MT registration procedure in the RRC reconfiguration message.

Figure 5:
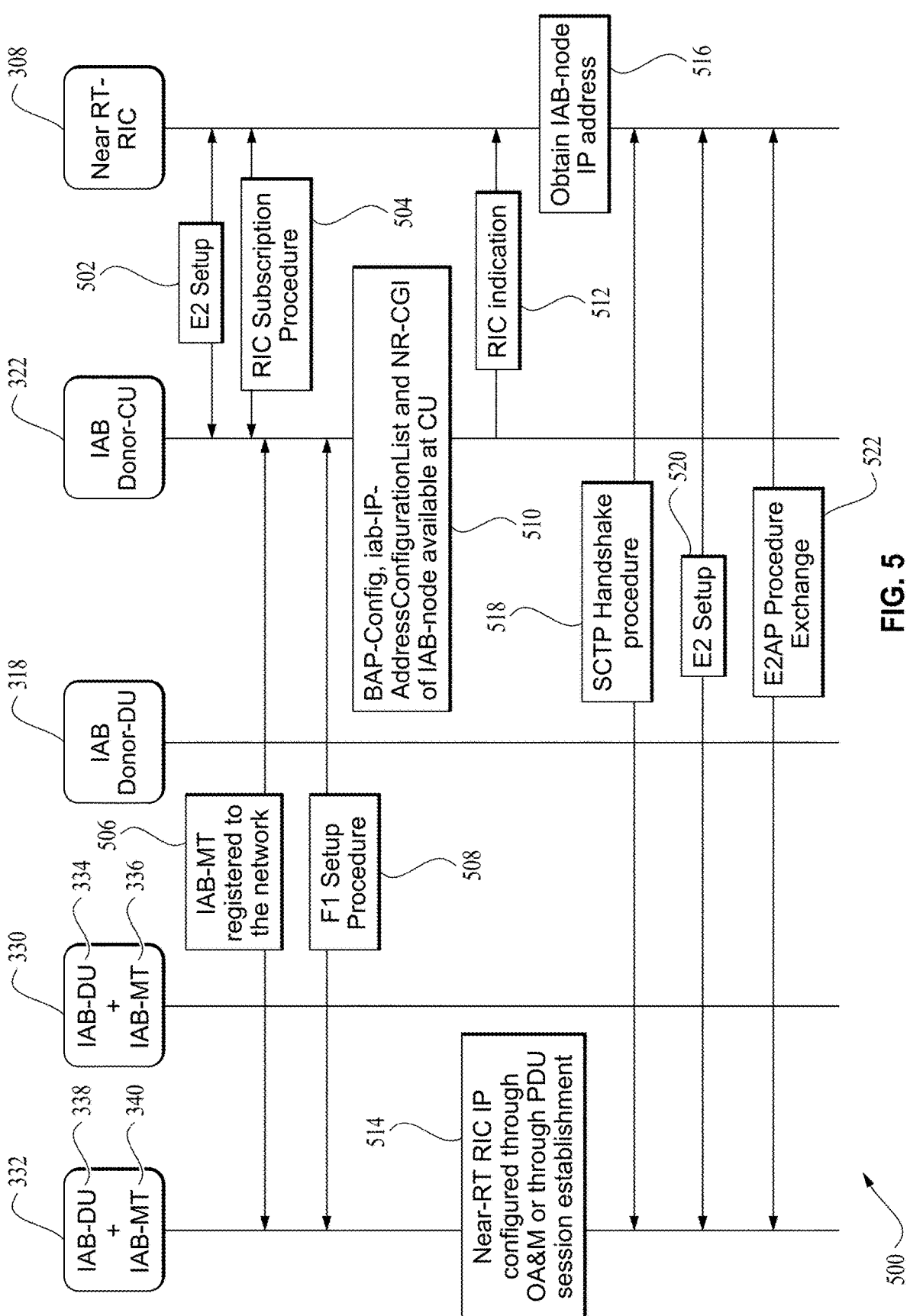
FIG. 5 is a message sequence diagram for a process of E2 message transfer over IAB in accordance with one embodiment.

FIG. 5 shows a process 500 for E2 message transfer in IAB architecture 300 (FIG. 3). In E2 setup procedure 502, the specified RAN function definition for EVENT TRIGGER and RAN function definition for REPORT are sent by the E2 node to near-RT RIC 308. This information for near-RT RIC 308 is used to determine how a given E2 node has been configured to support a given RAN-function-specific E2SM.

After E2 setup procedure 502 is successful with IAB-donor-CU 322, a RIC subscription procedure 504 is performed. Near-RT RIC 308 triggers a RIC subscription request (see, e.g., FIG. 11) towards IAB-donor-CU 322 to share details of IAB-node 332, such as NR cell global ID (CGI), IAB-node BAP address, along with IAB-node IP address, towards near-RT RIC 308. If IAB-donor-CU 322 can process the received RIC subscription request, it will respond with a RIC subscription response towards near-RT RIC 308.

Next, process 500 entails IAB-MT registered to the network 506 and F1 setup procedure 508. At this point, IAB-node information 510 of IAB-node 332 is available at IAB-donor-CU 322. IAB-node information 510 includes BAP-config, iab-IP-AddressConfigurationList and NR-CGI of IAB-node 332.

Once IAB-MT registration is successful along with F1 setup procedure towards IAB-node 332, then IAB-donor-CU 322 triggers RIC indication 512 (see, e.g., FIG. 16) towards near-RT RIC 308. IAB-node information 510 related to IAB-node 332 is transmitted in RIC indication 512 message towards near-RT RIC 308 by IAB-donor-CU 322. Thus, IAB-donor-CU 322 shares assigned BAP address along with assigned IP address towards IAB-node 332 once IAB-MT registration is successful. In general, each successful IAB-MT registration 506 and F1 setup procedure 508 with IAB-node 332 will prompt IAB-donor-CU 322 to trigger RIC indication 512.

Similarly, when IAB-MT gets released due to a normal condition such as deregistration or abnormal condition such as RLF or sync loss (see, e.g., FIG. 9), IAB-donor-CU 322 informs near-RT RIC 308 to release stored information related to IAB-node 332. When an IAB-node IP address or BAP address is modified, IAB-donor-CU 322 informs near-RT RIC 308 about the changes so that a new SCTP link could be established.

At IAB-node 332, near-RT RIC IP address is configured 514. This IP address may be configured through operations, administration, and management (OA&M) or through PDU session establishment procedure for IAB-MT. For UL E2AP PDU transmission from IAB-DU, the RIC IP address can be configured through OA&M of IAB-node 332. IAB-node 332 also can be configured with dynamic IP address configuration for RIC through PDU session established by IAB-MT for OA&M management.

Near-RT RIC 308 extracts BAP-config to derive configured BAP address towards IAB-node 332, iab-IP-Address-ConfigurationList to obtain IAB-node address 516 towards IAB-node 332 from received RRC reconfiguration message. Near-RT RIC 308 stores received BAP address, IAB-node IP address, and NR-CGI from received RIC indication 512. For DL E2AP PDU sent from near-RT RIC 308, near-RT RIC 308 will use received IAB-node IP address in RIC indication 512.

Next, SCTP procedure 518 is shown in processes 500. Once F1 setup procedure 508 of IAB-node 332 is successful with IAB-donor-CU 322 and IAB-donor-CU 322 shares allocated IP address of IAB-node 332 with near-RT RIC 308, then SCTP handshake will be initiated by near-RT RIC 308 towards IAB-node 332.

An SCTP handshake can be initiated by either near-RT RIC 308 or IAB-node 332. For instance, in one embodiment, near-RT RIC 308 generates and transmits to IAB-node 332 an SCTP INIT, receives an SCTP INIT_Ack (generated and transmitted by IAB-node 332), generates and transmits to IAB-node 332 a Cookie_Echo, and receives a Cookie_Ack (generated and transmitted by IAB-node 332). In another embodiment, IAB-node 332 generates and transmits to near-RT RIC 308 an SCTP INIT, receives an SCTP INIT_Ack (generated and transmitted by near-RT RIC 308), generates and transmits to near-RT RIC 308 a Cookie_Echo, and receives a Cookie_Ack (generated and transmitted by near-RT RIC 308).

In some deployments, IAB-MT may trigger SCTP handshake for establishing SCTP link for E2AP messages if it has received near-RT RIC 308 IP address, e.g., when near-RT RIC IP address is configured 514. For instance, IAB-node 332 triggers a timer for awaiting a near-RT RIC 308 to initiate the SCTP connection. If the timer expires before the connection is received at IAB-node 332, then IAB-node 332 itself may trigger an SCTP handshake towards IAB-node 332. The timer can be configured internally at IAB-node 332. IAB-node 332 starts the timer once the F1 link is established and IAB-MT registration procedure is successful between IAB-donor-CU 322 and IAB-node 332. For configuring timer value, IAB-node 332 takes into account the delay associated with near-RT RIC 308 processing received IAB-node information from IAB-donor-CU 322 and deriving IAB-node IP address in order to trigger SCTP handshake towards IAB-node 332.

Once SCTP handshake is established successfully, then E2 setup 520 request is initiated by IAB-node 332, which will be routed via IAB backhaul towards near-RT RIC 308. While transmitting E2AP PDU in UL the IAB-node will fill destination IP of near-RT RIC 308 and SCTP port of E2 link and similarly for downlink E2AP PDU near-RT RIC 308 fills the destination IP of IAB-node and SCTP port of E2 link.

Once E2 connection is established successfully between IAB-node 332 and near-RT RIC 308, then E2AP procedure exchange 522 including RIC subscription, RIC indication, RIC control procedure, and the like will follow. All these E2 messages between IAB-node 332 and near-RT RIC 308 are routed via IAB backhaul.

FIG. 6 shows a process 600 performed by near-RT RIC 308, for establishing an E2 link between near-RT RIC 308 and IAB-node 332. In block 602, process 600 triggers a RIC subscription procedure towards an IAB-donor-CU to share IAB-node information of the IAB-node, the IAB-node information including an IAB-node IP address. In block 604, process 600 in response to the IAB-donor-CU receives an IAB-MT registration and establishing an F1 setup from the IAB-node, receiving from the IAB-donor-CU a RIC indication including the IAB-node information so as to obtain the IAB-node IP address for the IAB-node. In block 606, process 600 performs an SCTP handshake with the IAB-node identified by the IAB-node IP address to establish an SCTP connection. In block 608, process 600 receives an E2AP setup with the IAB-node via the SCTP connection.

In some embodiments, process 600 entails the IAB-node information being first IAB-node information. Process 600 further includes detecting a failure of the E2 link. In response to the IAB-donor-CU receiving an IAB-MT, and re-registration and establishing an F1 setup from the IAB-node, process 600 entails receiving from the IAB-donor-CU a subsequent RIC indication including second IAB-node information with an updated IAB-node IP address for the IAB-node. Process 600 entails performing another SCTP handshake with the IAB-node identified by the updated IAB-node IP address to reestablish the SCTP connection. Process 600 entails receiving another E2AP setup with the IAB-node via the SCTP connection.

Process 600 may also include receiving a subsequent RIC indication in response to a release of the IAB-MT, removing an E2 context for the IAB-node, triggering an E2 removal request to the IAB-node for removing the E2 link, and triggering an SCTP shutdown to close the SCTP connection. Process 600 may also include removing an E2 link context based on SCTP link monitoring.

Process 600 may also include performing an E2SM RC operation, an E2SM KPM operation, an E2SM NI operation, or an E2SM CCC operation over the E2 link with the IAB-node.

Process 600 may also include updating a transport network layer (TNL) address, and triggering an E2 connection update message to provide updated TNL address information.

FIG. 7 shows a process 700, performed by IAB-node 332, for establishing an E2 link between near-RT RIC 308 and IAB-node 332. In block 702, process 700 triggers an IAB-MT registration and establishing an F1 setup with an IAB-donor-CU to share IAB-node information of the IAB-node, the IAB-node information including an IAB-node IP address. In block 704, process 700 performs with the near-RT RIC an SCTP handshake based on the IAB-node identified by the IAB-node IP address to establish an SCTP connection. In block 706, process 700 triggers an E2AP setup with the IAB-node via the SCTP connection. As explained previously, the SCTP handshake can be initiated by either near-RT RIC 308 or IAB-node 332.

Process 700 may also include the performing of the SCTP handshake being initiated by the near-RT RIC or by the IAB-node.

Process 700 may also include, in response to a RLF or sync loss, triggering an IAB-MT re-registration and establishing an F1 setup to cause the IAB-donor-CU to provide updated IAB-node information to the near-RT RIC, the updated IAB-node information including an updated IAB-node IP address. Process 700 entails performing another SCTP handshake based on the updated IAB-node IP address to reestablish the SCTP connection. Process 700 entails triggering another E2AP setup via the SCTP connection.

Process 700 may also include triggering a release of the IAB-MT, receiving an E2 removal request for removing the E2 link, and receiving an SCTP shutdown to close the SCTP connection.

Process 700 may also include performing an E2SM RC operation, an E2SM KPM operation, an E2SM NI operation, or an E2SM CCC operation over the E2 link.

FIG. 8 shows a process 800, performed by an IAB-donor-CU 322, for establishing an E2 link between near-RT RIC 308 and IAB-node 332. In block 802, process 800 receives a RIC subscription request towards the IAB-donor-CU to share information of the IAB-node, the information including an NR-CGI, an IAB-node BAP address, and an IAB-node IP address. In block 804, process 800 receives an IAB-MT registration and establishing an F1 setup from the IAB-node. In block 806, process 800 triggers a RIC indication including the information so as to provide the RIC with the IAB-node IP address for the IAB-node, cause the RIC to trigger an SCTP handshake with the IAB-node identified by the IAB-node IP address to establish an SCTP connection, and cause the RIC to trigger an E2AP setup with the IAB-node via the SCTP connection.

Figure 9:
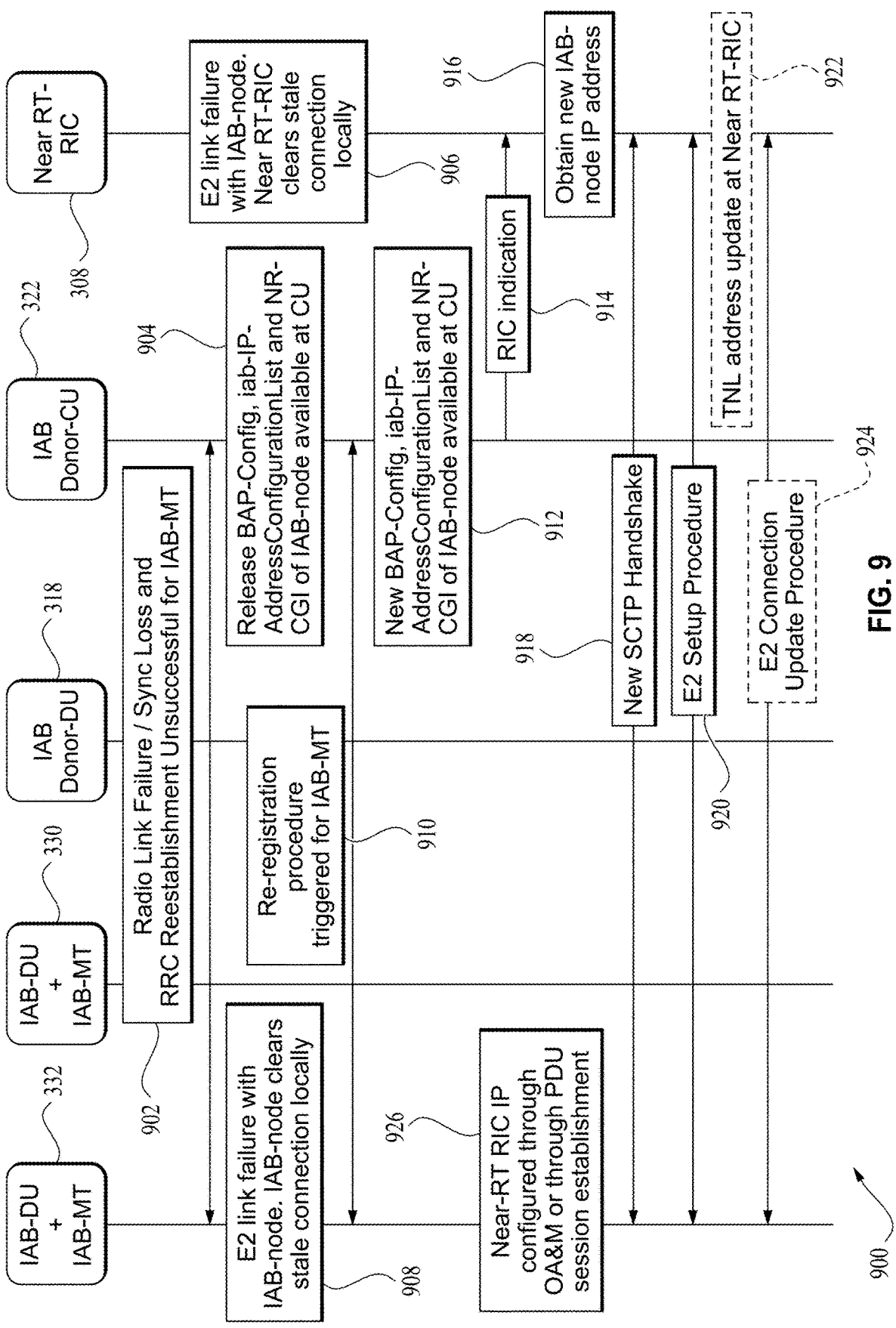
FIG. 9 is a message sequence diagram for a process of E2 message transfer over IAB in response to radio link failure or synchronization (sync) loss, in accordance with one embodiment.

FIG. 9 shows an example process 900 for updating near-RT RIC 308 in the event of an RLF/sync loss. Initially, FIG. 9 shows a radio link failure/sync loss and RRC reestablishment unsuccessful for IAB-MT 902.

Next, at IAB-donor-CU 322 there is a release 904 of BAP-config, iab-IP-AddressConfigurationList and NR-CGI of IAB-node 332. As during RLF/sync loss, the IAB-MT gets released, so IAB-donor-CU 322 releases all the IAB-node information such as BAP-address and iab-IP-Address-ConfigurationList assigned earlier.

In some embodiments, in response to an E2 link failure with IAB-node, near RT-RIC clears stale connection locally 906. Likewise, at IAB-node 332, it clears a stale connection locally 908.

IAB-donor-CU 322 may then receive a re-registration procedure 910 triggered by IAB-MT. As soon as re-registration procedure 910 is triggered by IAB-MT, updated (e.g., new) IAB-node information 912 is available at IAB-donor-CU 322. IAB-node information 912 includes BAP-address and iab-IP-AddressConfigurationList, which is generated by IAB-donor-CU 322 and shared with IAB-MT.

In response to IAB-node information 912, IAB-donor-CU 322 provides a RIC indication 914 to near-RT RIC 308. Other changes in information of IAB-node 332 (such as BAP address) may be indicated towards near-RT RIC 308 in RIC indication 914 message.

Near-RT RIC 308 uses RIC indication 914 to obtain new IAB-node IP address 916. Near-RT RIC 308 and IAB-node 332 perform a new SCTP handshake 918 to reestablish the SCTP connection. For instance, the SCTP connection my include the same port and context, but with the new IP address. In another example, the SCTP connection is a new connection with different port or context. Likewise, IAB-node 332 and near-RT RIC 308 perform an E2 setup procedure 920.

Near-RT RIC 308 performs a TNL address update 922, which is an optional process that may be triggered during operations and maintenance. A TNL update can be triggered internally by near-RT RIC 308 or due to external entity such as a dynamic host configuration protocol (DHCP) server. For instance, multihoming is an example in which an additional TNL address gets configured at near-RT RIC 308 to provide reliability through redundant E2 link or existing TNL address details of near-RT RIC 308 get updated due to dynamic allocation of TNL details through DHCP. Accordingly, process 900 shows E2 connection update procedure 924. In general, an E2 connection update procedure allows a near-RT RIC to update the E2 interface connection between the E2 node, e.g., IAB-node 332 in this case, and near-RT RIC 308. Near-RT RIC 308 initiates E2 connection update procedure 924 by sending an E2 connection update message to the IAB-node 332. Such message includes an appropriate set of up-to-date E2 interface connection data that IAB-node 332 takes into account when modifying the E2 interface connection. Upon receiving the E2 connection update, IAB-node 332 performs establishment of additional TNL association(s) or modification of the existing TNL association(s), or removal of TNL association(s) or the like, and responds with an E2 connection update acknowledgement towards near-RT RIC 308. Additional details are provided in O-RAN.WG3.E2AP-R003-v03.01.

Figure 10:
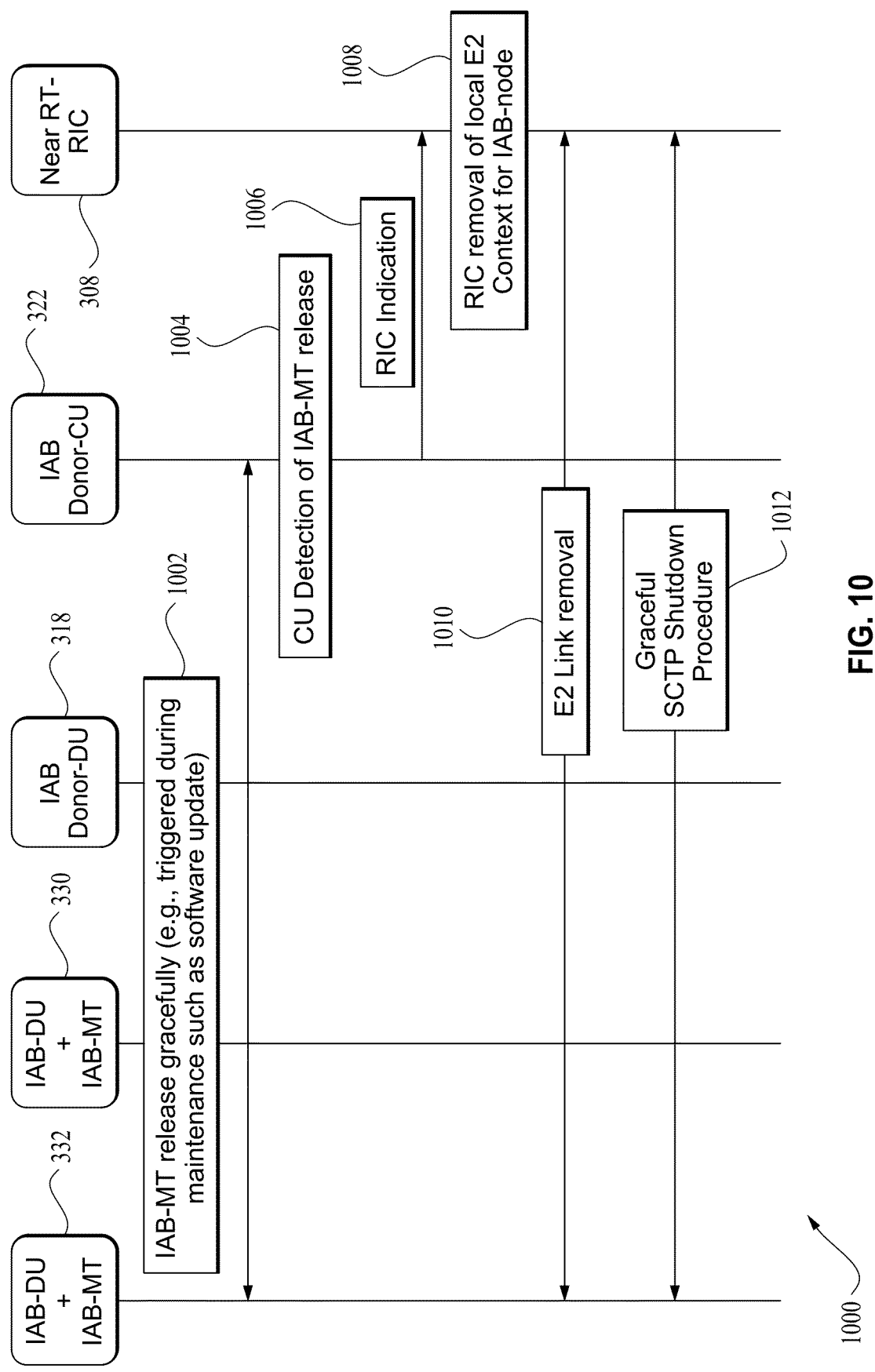
FIG. 10 is a message sequence diagram for a process of E2 message transfer over IAB for release of an IAB-node, in accordance with one embodiment.

FIG. 10 shows an example process 1000 for removing an E2 link following an IAB-MT release 1002. In response, IAB-donor-CU 322 is able to detect IAB-MT release 1004. Then, IAB-donor-CU 322 triggers RIC indication 1006 towards near-RT RIC 308 to clear information related to IAB-node 332 in the xAPP of near-RT RIC 308. FIG. 10 shows that near-RT RIC 308 removes local E2 context 1008 for IAB-node 332. Near-RT RIC 308 also performs an E2 link removal 1010 and an SCTP shutdown procedure 1012. As explained with the SCTP handshake, E2 link removal 1010 can be initiated by near-RT RIC 308 or IAB-node 332. Likewise, SCTP shutdown procedure 1012 can be initiated by either device.

In another embodiment, when IAB-node 332 gets released, near-RT RIC 308 locally removes the stale E2 and SCTP connections associated with IAB-node 332 based on an SCTP link monitoring mechanism. For instance, near-RT RIC 308 has a maximum number of SCTP heartbeats to try without any response from IAB-node 332. If the number exceeds a configured maximum threshold, near-RT RIC 308 will clear both transport level as well as E2 application-level data locally.

FIG. 11 shows information elements of a RIC subscription request 1100 for subscribing IAB-node details from IAB-donor-CU 322. RIC subscription request 1100 is sent by near-RT RIC 308 and includes RIC request ID 1102 containing RIC requestor ID and RIC instance ID, which will be generated by near-RT RIC 308. Similarly, RAN function ID 1104 indicates the RAN function ID number, which is unique within a given E2 node. There can be up to 16 RIC action ID 1106 included within RIC subscription request 1100, which will be unique within given RIC request ID 1102. RIC action type 1108 is set to "REPORT." RIC event trigger definition 1110 and RIC action definition 1112 are explained below.

FIG. 12 shows information elements of RIC event trigger definition 1110. RIC event trigger definition 1110 is used to detect a specific network interface or RRC message event in an E2 node. The detection can be based on an incoming or an outgoing message. The E2 node can also be configured to detect multiple messages simultaneously and to trigger only when all the configured message events happen or for any logical combination of message events.

The defined event trigger condition is an RRC message, i.e., RRC reconfiguration, which is sent towards IAB-node 332 during IAB-MT registration. NR RRC class 1202 is DL-DCCH message for RRC reconfiguration and RRC message ID 1204 will be set to 21 as RRC reconfiguration falls on 2181 index in TS 38.331 section 6.2.2 message definitions.

For associated UE event 1206, a new event is defined in the specification for a UE event. The value for this is encoded as three to indicate UE event name as IAB-MT registration and F1 setup successful and message event in event trigger definition format 1 is RRC message of "RRC reconfiguration" during IAB-MT registration.

FIG. 13 shows a definition of RIC action definition 1112. As noted previously, this information element is part of RIC subscription request 1100 message sent by the RIC to an E2 node. In this service model, this RIC action definition 1112 provides additional information for the nominated RIC action. RIC action definition 1112 uses RIC Style Type set to 1 and E2SM-RC action definition 1302 set to Format 1 which is used for report service.

FIG. 14 shows E2SM-RC action definition 1302. E2SM-RC action definition 1302 format 1 contains two parameter IDs to be reported as part of parameters to be reported list 1402. The first parameter ID is encoded as the value three to indicate reporting of RRC message RRC reconfiguration, which is sent towards IAB-node during IAB-MT registration. The second parameter ID is encoded as the value six to indicate NR Cell Global ID of the IAB-node. These two parameters are indicated towards RIC by IAB-donor-CU in RIC indication message, once defined event criteria, i.e., IAB-MT registration successful with successful F1 setup procedure towards IAB-node is successful.

FIG. 15 shows information elements of a RIC subscription response 1500 sent by a E2 node to accept the request from near-RT RIC 308 to create a new subscription in the E2 node. The list of RIC actions that were admitted successfully at IAB-donor-CU 322 are indicated by RIC actions admitted list 1502 in RIC subscription response 1500 towards near-RT RIC 308. In RIC subscription response 1500, RIC action ID 1504 value will be set to RIC action ID 1106 as indicated in RIC subscription request 1100 for requesting IAB-node details.

FIG. 16 shows information elements of a RIC indication 1600 when defined criteria is matched. RIC indication 1600 is sent by an E2 node to transfer report information to near-RT RIC 308. Once IAB-MT of IAB-node is registered and the F1 connection between IAB-donor-CU and IAB-DU is established successfully, then RIC indication 1600 will be triggered by IAB-donor-CU to send RRC reconfiguration message, which was sent towards IAB-MT for deriving BAP-config and iab-IP-AddressConfigurationList of IAB-node and NR-CGI of IAB-node towards RIC.

In RIC request ID 1602, RAN function ID 1604, and RIC action ID 1606 value in RIC indication 1600 message will use the same value as received in RIC subscription request 1100 (FIG. 11). RIC indication SN 1608 indicates the sequence number to uniquely identify RIC indication 1600. RIC indication type 1610 will be set to REPORT. RIC indication header 1612 and RIC indication message 1614 will use E2SM-RC indication header format 1 and E2SM-RC indication message format 1, respectively. Details for these are defined below.

FIG. 17 shows E2SM-RC indication header format 1. E2SM-RC indication header format 1 contains an event trigger condition ID. Event trigger condition ID will use same value as received in RIC subscription request at IAB-donor-CU from RIC.

FIG. 18 shows E2SM-RC indication message format 1. RIC indication message will use E2SM-RC indication message format 1 containing two RAN parameters. Each of these RAN parameters contains two IEs: RAN parameter ID and RAN parameter value.

First RAN parameter encodes RAN parameter ID value as three for reporting RRC reconfiguration message, which was sent towards IAB-node during IAB-MT registration. RAN parameter value is encoded as an octet string.

Second RAN parameter encodes RAN parameter ID value as six for reporting NR-CGI of IAB-node received in F1 setup request at IAB-donor-CU. RAN parameter value is encoded as an octet string.

IAB architectures may be configured to support transfer of various control plane traffic such as UE-associated F1AP, non-UE-associated F1AP, non-F1 control plane traffic, BAP control PDU, and the like. For each of these traffic types, a separate BH RLC channel may be established, according to some embodiments. In other embodiments, control plane traffic may be multiplexed and transferred over a common BH RLC channel.

If separate BH RLC channels are configured for each control plane traffic type, then for each traffic type, the BH RLC channel is established during or after IAB-MT registration and remains established, irrespective of control plane traffic generation. An advantage of this approach is that different control plane traffic may be treated with different QoS requirement, as specified. However, a drawback is that the BH RLC channel resources remain established and reserved, irrespective of control plane traffic generated in IAB-node.

Multiplexing control plane traffic of different types over the same BH RLC channel solves the issue of multiple BH RLC channel requirement, but all control traffic will have same QoS irrespective of priority of control plane traffic. For instance, non-UE-associated F1AP traffic may include low priority messages—such as interface management procedure, radio information transfer procedure, and the like—as well as delay critical messages such as warning message transmission procedures. All these messages would have the same priority as that of non-UE-associated F1AP messages over the backhaul link. The priority for PWS warning messages would be allocated the highest priority, as it is a critical service.

As there is no separate traffic type defined for messages under warning message transfer procedure, in either of the previous implementations (i.e., multiplexing multiple traffic types in same BH RLC channel or with separate BH RLC channel implementation for each traffic type) the issues have not been resolved.

Figure 19:
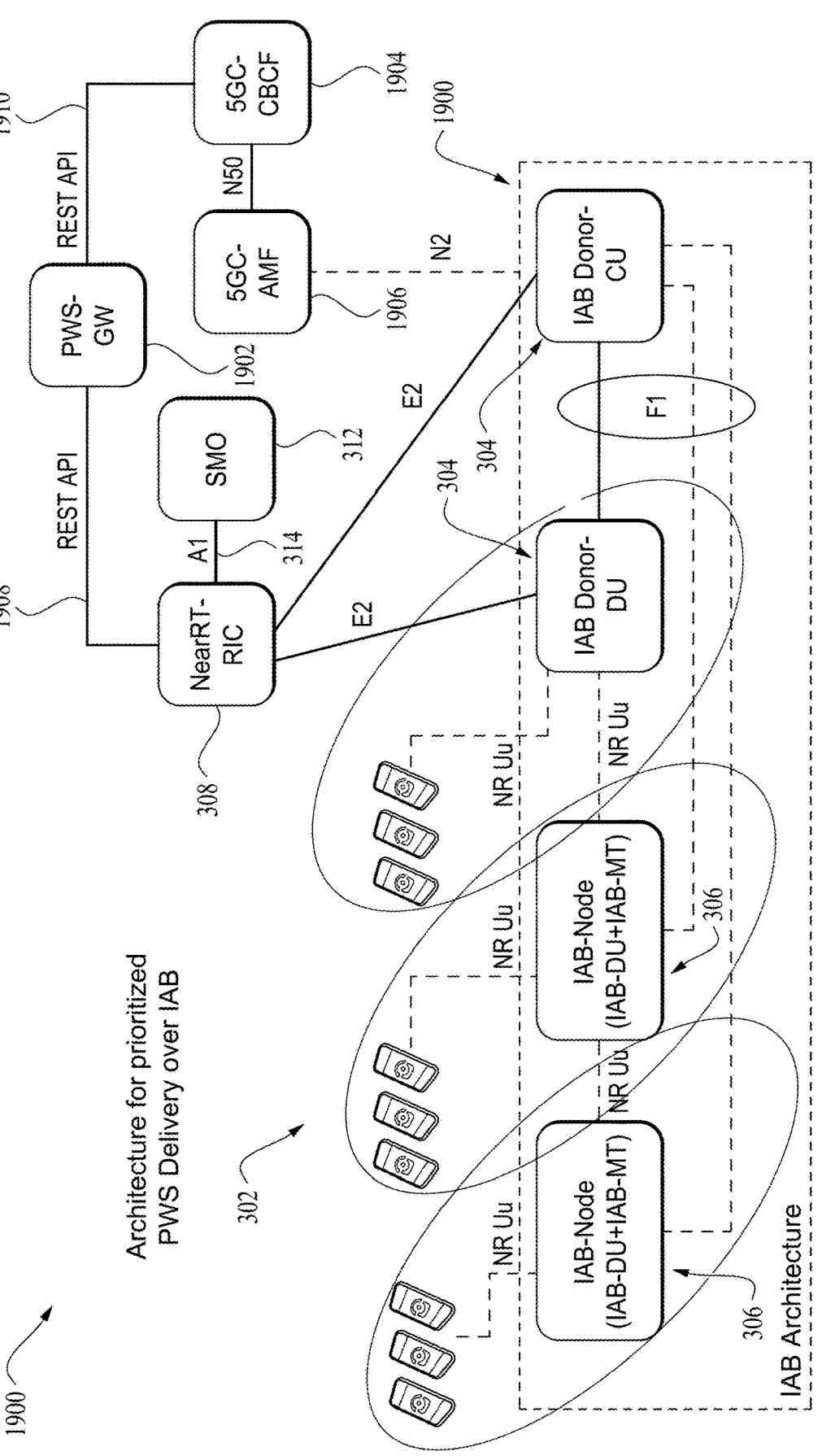
FIG. 19 is a block diagram of an IAB architecture in accordance with one embodiment.

FIG. 19 shows an IAB architecture 1900 for prioritized PWS delivery over IAB. IAB architecture 1900 is similar to IAB architecture 300 (FIG. 3), so the two diagrams use common reference numbers. IAB architecture 1900, however, also includes a PWS-gateway (PWS-GW) 1902, a 5GC cell broadcast center function (5GC-CBCF) 1904, and a 5GC access and mobility management function (AMF) 1906. PWS-GW 1902 includes a REST API 1908 with near-RT RIC 308. PWS-GW 1902 also includes a REST API 1910 with 5GC-CBCF 1904.

REST API 1908 is used to implement triggers between PWS-GW 1902 and near-RT RIC 308 such that near-RT RIC 308 is capable of E2 application enhancements for initiating, modifying, and terminating BH RLC channels, which facilitate smarter interworking between IAB donor nodes and distributed nodes. This mechanism provides significant benefits to service providers in terms of effective utilization of RAN resources within the O-RAN ecosystem. For instance, in IAB architecture 1900, a priori resource reservation is not required for signaling information exchange related to PWS warning alerts within O-RAN IAB donor nodes 304. Near-RT RIC 308 provides intelligent control for enabling, disabling, and removing the RAN resources within IAB-nodes 306, as well as towards its peer nodes (i.e., other nodes connected to IAB-nodes 306), to ensure there is a seamless delivery of public warning message exchange in IAB architecture 300.

Service providers deploying IAB features within O-RAN networks benefit from near-RT RIC 308 coordinating delivery of PWS warning alerts and cancellations to the end users, without incurring any additional delays when such signaling broadcast events are triggered from 5GC-CBCF 1904 towards near-RT RIC 308 and exchanged across the IAB-MT DU nodes within O-RAN deployment 302. Near-RT RIC 308 also enables continuous monitoring of performance measurement data driven information exchanges via E2 interface(s) during allocation, modification, and deallocation of RAN resources required to broadcast the PWS alerts. Such intelligence ensures broadcasts are tracked and delivered in an end-to-end network. In addition, if there are any failures along the transmission path within the mobility network, the data driven reporting mechanism at near-RT RIC 308 can coordinate with PWS-GW 1902 and send proactive triggers/alerts to the operator for retransmissions and ensuring reliable service delivery.

FIG. 20 shows a process 2000 for PWS message delivery over IAB backhaul with success indication. Initially, E2 setup procedure 2002, RIC subscription procedure 2004, IAB-MT registration 2006, F1 setup procedure 2008, and RIC indication 2010 are similar to the corresponding sequence shown in FIG. 5.

Once IAB-donor-CU 322 is set up, it will trigger establishment E2 setup procedure 2002 towards near-RT RIC 308. In E2 setup procedure 2002, the specified RAN function definition for EVENT TRIGGER and the RAN function definition for REPORT are sent by the E2 node to near-RT RIC 308. This information for near-RT RIC 308 is used to determine how a given E2 node has been configured to support a given RAN function specific E2SM.

RIC subscription procedure 2004 (i.e., a request) is triggered by near-RT RIC 308 to subscribe for RRC reconfiguration message once IAB-MT registration 2006 is successful along with NR-CGI details of IAB-node 332 being received in an F1 setup procedure 2008 (i.e., a request from IAB-DU 338). IAB-donor-CU 322 validates the received RIC subscription message and replies with a RIC subscription response towards near-RT RIC 308.

Once IAB-MT 340 in IAB-node 332 registers successfully, and IAB-DU 338 triggers F1 setup procedure 2008 towards IAB-donor-CU 322. When defined criteria in the RIC subscription request is met, IAB-donor-CU 322 will trigger RIC indication 2010 to send an RRC reconfiguration message to near-RT RIC 308, which was sent by IAB-donor-CU 322 towards IAB-MT 340 during registration and NR-CGI of IAB-node 332 is received as part of F1 setup procedure 2008.

Near-RT RIC 308 extracts BAP-config to derive configured BAP address towards IAB-node 332, iab-IP-Address-ConfigurationList to derive assigned IP address towards IAB-node, bh-RLC-ChannelConfig to derive list of established BH RLC channel from received RRC reconfiguration message.

Near-RT RIC 308 stores received NR-CGI of IAB-node 332, which was received as part of RIC indication 2010. This information is used for triggering establishment BH RLC channel for warning message delivery, once indication is received from PWS-GW 1902.

PWS warning alerts (request and cancellation procedures) to be broadcasted to the users in a targeted radio coverage area are identified by a polygon or grid by key attributes: latitude, longitude, zip code, county, state, language, message size, and the like. Radio coverage provided by O-RAN network with IAB features enabled in the access network is used to deliver the PWS alerting services to end users in that area. PWS-GW 1902 acts as a secure gateway/proxy in the service provider mobility network and hides the underlying network topology. REST API trigger for PWS service delivery 2012 triggered from PWS-GW 1902 to near-RT RIC 308 (using REST API 1908) is sent due to an impending PWS alerting delivery (request/cancellation) from a regulatory agency in the area. At the same time, the alerting is sent from PWS-GW 1902 to 5GC-CBCF 1904 (using REST API 1910), which is not shown in FIG. 20.

REST API trigger for PWS service delivery 2012 provides a REST API-RIC configuration with standardized HTTP/2 handshaking procedures used to establish direct communications between PWS-GW 1902 and near-RT RIC 308. Near-RT RIC 308 is identified by a global identifier (e.g., string of alphanumeric characters), along with an IP address (IPv4, IPv6, IPv4v6 dual stack). In this example, trigger 2012 is an open standards API compliant data structure and configuration. It includes a cell CU and DU configuration (NR-CGI); tracking area information (5GS TAI that the NR-CGI belongs to); RAT Type (e.g., 3GPP-5G NR); message identifier for type of alert (e.g., presidential, emergency, child, warning, or other type); serial number for warning message; PWS alert (warning/stop/success) indication; timer1 for communication between PWS-GW 1902 and near-RT RIC 308; and timer1 duration that is operator configurable in milliseconds, seconds, minutes, or hours.

Timer1 indicates to near-RT RIC 308 to reserve the process of setting up the BH RLC establishment procedure with highest priority. Upon expiry of this timer1, near-RT RIC 308 could trigger release of the BH RLC channels established for PWS delivery implicitly without any REST API triggers from PWS-GW 1902.

Upon reception of the REST API trigger for PWS service delivery 2012, near-RT RIC 308 extracts received NR-CGI to derive what are the cells the warning message needs to be broadcasted. Once the NR-CGI list is extracted, near-RT RIC 308 derives the corresponding mapped BAP address.

After REST API trigger for PWS service delivery 2012 is successfully processed and acknowledged by near-RT RIC 308, REST API trigger for BH RLC channel configuration 2014 takes place. Leveraging A1 interface 314, REST API trigger for BH RLC channel configuration 2014 entails a RIC query policy procedure, HTTP/GET, and HTTP 200 OK (Policy Object). Accordingly, in REST API trigger for BH RLC channel configuration 2014, near-RT RIC 308 requests RAN orchestrator/SMO 312 to obtain the BH RLC channel configuration (provisioned by the operator) to be used to establish the BH RLC channel towards IAB-nodes 330, 332 for PWS delivery. RAN orchestrator/SMO 312 shares the BH RLC channel configuration details such as bh-LogicalChannelIdentity, bh-RLC-ChannelID, rlc-Config for the BH RLC Channel and mac-LogicalChannelConfig for the BH RLC channel to be used for PWS delivery. Using the A1 interface, near-RT RIC 308 receives the BH RLC channel configuration information from RAN orchestrator/SMO 312 via REST API trigger for BH RLC channel configuration 2014. The communication between near-RT RIC 308 and RAN orchestrator/SMO 312 uses a standardized A1 interface defined in O-RAN.WG2.A1AP-R003-v04.00 whereas the interface between PWS-GW 1902 and near-RT RIC 308 for REST API trigger for PWS service delivery 2012 is a newly proposed interface.

Next, near-RT RIC 308 triggers RIC control procedure 2016 (i.e., a request) to establish BH RLC channel. Near-RT RIC 308 should process received API trigger from PWS-GW 1902 in milliseconds and trigger immediately RIC control request (see, e.g., FIG. 25) for establishment of BH RLC channel. As soon as near-RT RIC 308 receives indication for a delivery of PWS message from PWS-GW 1902 in the carrier network, near-RT RIC 308 triggers RIC control request to trigger establishment of BH RLC channel for delivery of warning messages.

Once RIC control request of RIC control procedure 2016 is received at IAB-donor-CU 322, it will derive the list of BAP addresses received for establishment of BH RLC channel for delivery of PWS warning messages. If UE ID value is received as a random value, then BH RLC channel establishment will be triggered towards all the connected IAB-nodes, or else BH RLC channel establishment will be triggered towards only the indicated IAB-node in UE ID.

IAB-donor-CU 322 triggers a UE context modification procedure for BH RLC channel establishment/modification 2018 towards IAB-node 332 (and other IAB-nodes such as IAB-node 330 or IAB-donor-DU 318) for establishment of the BH RLC channel. For conciseness, the following description describes the triggering from IAB-donor-CU 322 to IAB-node 332, which could also apply to other IAB-nodes.

Once BH RLC channel establishment for warning message delivery is successful, i.e., IAB-donor-CU 322 receives successful completion of UE context modification procedure, then a RIC control request acknowledgement is sent by IAB-donor-CU 322 towards near-RT RIC 308 in order to indicate that BH RLC channel was established successfully. The RIC control request should be received before a write replace warning request 2020 is received at IAB-donor-CU 322 from AMF 1906, which is in response to a write replace warning request 2022 from 5GC-CBCF 1904 and PWS warning alerts 2024 from PWS-GW 1902.

Once write replace warning request 2020 is received from 5GC-AMF 1906, IAB-donor-CU 322 uses the newly established BH RLC channel to provide write replace warning requests 2026. Specifically, IAB-donor-CU 322 triggers towards IAB-donor-DU 318, which then relays write replace warning requests 2026 towards IAB-nodes 306 that are either directly or indirectly (via intermediate IAB-nodes) connected to IAB-node 306. The transfer is made using the established BH RLC channel. Prioritized allocation of grant for transmission of warning messages in uplink is done in intermediate IAB-node or IAB-donor-DU 318 using preemptive BSR as explained later in connection with FIG. 35.

If an IAB-node is able to process received write replace warning requests 2026, then it uses the same BH RLC channel to send a write replace warning response 2028 back to IAB-donor-CU 322. IAB-donor-CU 322 sends write replace warning response 2030 towards 5GC-AMF 1906. 5GC-AMF 1906 sends write replace warning response 2032 to 5GC-CBCF 1904.

Next, IAB-node 332 broadcasts warning alerts using SIB 2034. Similarly, IAB-node 330 broadcasts warning alerts using SIB 2034. Skilled persons will appreciate, however, that one or more IAB-nodes may broadcast the warning alerts, depending on the broadcast area.

Once PWS broadcasting is successful, IAB-nodes 330, 332 trigger PWS success indication based on broadcast delivery 2036 towards IAB-donor-CU 322. Established BH RLC channel for PWS delivery may then be released according to the following examples.

The first example of the release is without RIC intervention. After PWS success indication based on broadcast delivery 2036 is received at IAB-donor-CU 322 and there are no other warning messages being broadcasted currently, IAB-donor-CU 322 may trigger release 2038 of established BH RLC channel for warning message delivery, i.e., a UE context modification procedure for BH RLC channel establishment/modification 2040. IAB-donor-CU 322 also sends PWS success indication 2042 towards 5GC-AMF 1906, which is propagated to 5GC-CBCF 1904. 5GC-CBCF 1904 sends PWS success indication 2044 to PWS-GW 1902, and PWS-GW 1902 will generate REST API trigger to indicate successful PWS service delivery 2046. Any BH RLC channel context established in near-RT RIC 308 for PWS warning message delivery will then be cleared locally. An example of PWS success indication is described in U.S. patent application Ser. No. 17/938,240, titled, "Coordinated PWS Warning Delivery in 5G Networks," filed Oct. 5, 2022, and assigned to the applicant of the present application, Radisys Corporation of Hillsboro, Oregon.

The second example of the release is with an explicit trigger originating from near-RT RIC 308. For instance, upon successful reception of the PWS warning message delivery (cancellation/success/failure indications), PWS-GW 1902 could send a REST API trigger to indicate successful PWS service delivery 2046 to near-RT RIC 308 to indicate successful status of the message delivery. Similar to REST API trigger for PWS service delivery 2012, trigger 2046 is an HTTP/2 based communication between PWS-GW 1902 and near-RT RIC 308. Near-RT RIC 308 is identified by a global identifier (e.g., string of alphanumeric characters), along with an IP address (IPv4, IPv6, IPv4v6 dual stack). An open standards API compliant data structure and configuration includes cell CU and DU configuration (NR-CGI); tracking area information (5GS TAI that the NR-CGI belongs to); RAT Type (e.g., 3GPP-5G NR); message identifier for type of alert (e.g., presidential, emergency, child, warning, or other type); serial number for warning message; and PWS alert (stop/success) indication.

Near-RT RIC 308 then triggers a RIC control procedure 2048 over E2 interface towards IAB-donor-CU 322. IAB-donor-CU 322 sends UE context modification request 2040 towards all IAB-nodes 306 to release the BH RLC channels that were established for PWS delivery.

Once BH RLC channels are released successfully, then IAB-nodes 306 respond with UE context modification response 2040. If a failure is observed at any of IAB-nodes 306 while releasing its BH RLC channel, then instead of IAB-node 306 sending a success indication towards IAB-donor-CU 322, it sends a failure indication, i.e., UE context modification failure with the appropriate cause.

Any failures during PWS warning delivery are communicated by IAB-nodes towards the 5G core functions to trigger retransmissions during the validity/expiry period of the warning messages. FIG. 21 shows a process 2100 for PWS message delivery over IAB backhaul with a PWS failure/restart indication 2102. In general, the restart indication is provided in case PWS information for some or all cells of the IAB-DU is available for reloading from the cell broadcast center (CBC). An example is if the cell went down due to abnormal error or due to O&M intervention—such as software upgrade or hardware maintenance window—while a warning message was being broadcast or was supposed to be broadcasted. Then, once the cell comes up, the IAB-DU will trigger PWS restart indication, which includes a list of cells to indicate that, for these cells, warning messages need to be rebroadcasted.

As shown in FIG. 21, PWS failure/restart indication 2102 is provided to IAB-donor-CU 322. Next, IAB-donor-CU 322 provides to 5GC-AMF 1906 a PWS failure/restart indication 2104. 5GC-AMF 1906 triggers a PWS failure/restart indication to 5GC-CBCF 1904.

In case of a restart, a PWS restart indication is used to indicate PWS information for some or all cells is available for reloading from the CBC. Once the PWS restart indication is received at 5GC-CBCF 1904, it determines 2106 if the received warning message is still valid and a new write replace warning message procedure needs to be triggered towards the indicated NR cell.

If valid and there is a PWS restart indication, then 5GC-CBCF 1904 will retransmit (reload) the write replace warning message towards IAB-nodes 306. The new write replace warning message procedure is triggered (as explained previously, similar to write replace warning messaging in upper portions of FIG. 20 and FIG. 21) towards indicated IAB-nodes 306 with NR-CGI indicated in a PWS restart indication. Since, IAB-donor-CU 322 indicates cell details in the PWS restart indication, if a write replace warning request was received from AMF 1906 with NR-CGI indicated, then IAB-donor-CU 322 considers this as retransmission. In another embodiment, IAB-donor-CU 322 need not store any context after sending PWS restart indication. If IAB-donor-CU 322 receives write replace warning request from AMF 1906, then it can consider it as a new warning message and can trigger PWS broadcasting towards cells indicated as part of the warning area list.

If the indicated warning message is no longer valid for broadcasting in 5GC-CBCF 1904, it indicates this to PWS-GW 1902 with PWS failure/restart indication 2108. As an example, there may be an impending disaster alert and the cell went on maintenance for a few hours. By the time the cell comes up, the alerts are no longer valid as the events have already occurred, and there is no need to broadcast any warning messages. In that case, 5GC-CBCF 1904 will not initiate write replace warning request. PWS-GW 1902 then uses REST API trigger 2110 towards near-RT RIC 308. Trigger 2110 indicates the release of the BH RLC channel established for PWS warning message delivery when the warning message validity is expired.

In case of a failure, a PWS failure indication is used to indicate that ongoing PWS operation for one or more cells has failed. The failure indication is provided in case any error is observed in IAB-nodes 306 for PWS message delivery. In the event of a failure, IAB-donor-CU 322 sends the message to AMF 1906, then 5GC-CBCF 1904 gets the failure indication, and then PWS-GW 1902 gets PWS failure indication 2108 to trigger 2110 near-RT RIC 308.

Finally, near-RT RIC 308 triggers RIC control procedure 2112 towards IAB-donor-CU 322 to trigger release 2114 of established BH RLC channels for warning message delivery explicitly. IAB-donor-CU 322 sends UE context modification procedure 2116 towards IAB-node(s) to release the established BH RLC channel for warning message delivery. Once BH RLC channel is released at IAB-nodes 306, IAB-DU(s) responds with a UE context modification response. Now, IAB-donor-CU 322 will send a RIC control request acknowledgement towards near-RT RIC 308 indicating the successful release of BH RLC channels.

Cancellation can occur in instances such as a time duration for which the PWS message should have been broadcasted expires or indication is received at PWS-GW 1902 from regulatory agency to cancel warning message broadcasting in a particular area or across all areas. For these use cases, the BH RLC channel will be released only after a PWS cancel message is delivered over BH RLC channel towards an IAB-node and the IAB-node responded with a PWS cancel response. FIG. 22 shows a process 2200 for PWS message delivery over IAB backhaul with warning cancellation.

Initially, 5GC-CBCF 1904 provides a stop-warning request 2202 to 5GC-AMF 1906. This triggers 5GC-AMF 1906 to provide a PWS cancel request 2204 to IAB-donor-CU 322. Additional details on PWS cancel request 2204 are provided in 3GPP TS 38.413 section 9.2.8.3.

When PWS cancel request 2204 is received by IAB-donor-CU 322 from 5GC-AMF 1906, a PWS cancel request 2206 message is BAP routed via newly established BH RLC channel towards IAB-nodes 306 by IAB-donor-CU 322. As mentioned previously, IAB-donor-CU 322 trigger IAB-donor-DU 318 to relay PWS cancel request 2206. Additional details on PWS cancel request 2206 are provided in 3GPP TS 38.473 9.2.4.3.

When IAB-nodes 306 respond with PWS cancel response 2208, it will use the same BH RLC channel through which it had received the request. IAB-donor-CU 322 then triggers toward 5GC-AMF 1906 a PWS cancel response 2210. In response, 5GC-AMF 1906 triggers toward PWS-GW 1902 a stop-warning confirm message 2212.

Once PWS cancel response 2210 is sent towards 5GC-AMF 1906 and there are no other warning messages being broadcasted currently, then IAB-donor-CU 322 will trigger release 2214 of BH RLC channel established for warning message delivery with a UE context modification 2216. As explained previously, trigger release 2214 can occur without involvement of near-RT RIC 308, or it can occur in response to a REST API 2218 and a RIC control procedure 2220.

FIG. 23 shows a process 2300, performed by a near-RT RIC, for controlling, via an E2 link between the near-RT RIC and an IAB-donor-CU, a backhaul RLC channel for warning message delivery. In block 2302, process 2300 receives, from a PWS-gateway, a first REST API trigger for PWS service delivery. In block 2304, process 2300 requests, from a SMO, a second REST API trigger for configuring the backhaul RLC channel. In block 2306, process 2300 generates a RIC control request to the IAB-donor-CU to cause it to trigger a UE context modification for control of the backhaul RLC channel with one or more IAB-nodes.

Process 2300 may also include the RIC control request being for establishing or modifying the backhaul RLC channel.

Process 2300 may also include locally clearing context for the BH RLC channel.

Process 2300 may also include releasing the backhaul RLC channel that entails receiving, from the PWS-gateway, a third REST API trigger for PWS service completion, and triggering another RIC control procedure for the IAB-donor-CU to release the backhaul RLC channel.

Process 2300 may also include generating the RIC control request to include an IE indicating whether scheduling is enabled for the backhaul RLC channel during a resource configured as not available among hard, soft, and not available (HSNA) resource configurations for the backhaul RLC channel employing a same carrier as a wireless access channel.

FIG. 24 shows a process 2400, performed by an IAB-donor-CU, for warning message delivery over a backhaul RLC channel. In block 2402, process 2400 in response to a RIC control request from a near-RT RIC, triggers a UE context modification for establishing the backhaul RLC channel with an IAB-node. In block 2404, process 2400 receives a write replace warning request from an AMF. In block 2406, process 2400 triggers the write replace warning request to the IAB-node by BAP routing over the backhaul RLC channel.

Process 2400 may also include, in response to another RIC control request from the near-RT RIC, triggering another UE context modification for modifying the backhaul RLC channel with the IAB-node.

Process 2400 may also include triggering release of the backhaul RLC channel once PWS broadcast is complete.

Process 2400 may also include receiving a PWS failure indication from the IAB-node, triggering the AMF with the PWS failure indication and clear context associated with the backhaul RLC channel.

Process 2400 may also include receiving a PWS restart indication from the IAB-node, triggering the AMF with the PWS restart indication to cause a CBCF to determine whether the warning message is valid for retransmission, and triggering retransmission over the backhaul RLC channel in response to receiving a further write replace warning request from the AMF.

Process 2400 may also include receiving a first PWS cancel request from the AMF, triggering a second PWS cancel request to the IAB-node by BAP routing over the backhaul RLC channel to stop the warning message delivery, receiving a first PWS cancel response via the backhaul RLC channel, and triggering a second PWS cancel response toward the AMF to cause a CBCF and a PWS-GW to stop the warning message delivery.

Process 2400 may also include generating the UE context modification to include an IE indicating whether scheduling is enabled for the backhaul RLC channel during a resource configured as not available among hard, soft, and not available (HSNA) resource configurations.

FIG. 25 shows an example of an RIC control request 2500 for triggering establishment, release, or modification of BH RLC channel. For instance, near-RT RIC 308 can trigger BH RLC channel establishment when it receives PWS broadcast indication in carrier network. In cases where any of the existing parameters of established BH RLC channel needs to be modified, then near-RT RIC 308 may use defined RAN parameters in RIC control message RIC control request 2500 for triggering modification. Near-RT RIC 308 can trigger RIC control request 2500 to release established BH RLC channel if BH RLC channel needs to be released through an explicit trigger.

In RIC control request 2500, RIC request ID 2502 and RAN function ID 2504 are generated by near-RT RIC 308 internally. RIC request ID 2502 contains two IEs named RIC requestor ID and RIC instance ID, and both have a range from 0 to 65,535. RAN function ID 2504 is generated by near-RT RIC 308 internally and can have a range of from 0 to 4,095.

If IAB-donor-CU 322 needs to send a RIC control request acknowledgement 2506 towards near-RT RIC 308, then RIC control request acknowledgement 2506 IE will be filled or else the IE will be excluded in RIC control request 2500.

RIC control request 2500 also includes RIC control header 2508 (i.e., ORAN.WG3.E2SM-RC 9.2.1.6 RIC control header IE) and RIC control message 2510 (i.e., ORAN.WG3.E2SM-RC 9.2.1.7 RIC control message). These are described with reference to FIG. 26 and FIG. 27, respectively.

FIG. 26 shows an example of RIC control header 2508 for triggering establishment, release, or modification of BH RLC channel. RIC control header 2508 will use RIC control header Format 1.

For UE ID 2600 IE, IAB-MT BAP address is filled by near-RT RIC 308 for BH RLC channel establishment. In case the BH RLC channel needs to be established across all the IAB-MT and their child nodes connected to IAB-donor-CU 322, then UE ID 2600 is set to any random value. For BH RLC channel modification and release, IAB-donor-CU 322 will receive UE ID 2600 IE value set to IAB-MT BAP address, which is filled by near-RT RIC 308.

RIC style type 2602 is set to one. RIC control header 2508 also includes a Style Name (not shown), which is set to Radio Bearer Control.

RIC control header 2508 includes a control action ID 2604. Control action ID 2604 is set to eight for BH RLC channel establishment, modification, or release towards IAB-donor-CU 322.

FIG. 27 shows an example of RIC control message 2510. RIC control message 2510 contains RAN Parameter ID 2702 and RAN parameter value type 2704. RAN parameters are defined for BH RLC channel establishment, modification, or release.

FIGS. 28A-28E show examples of RAN parameters 2800 for BH RLC channel establishment, modification, or release. FIGS. 28A and 28D show the setup parameters. FIG. 28C-28E show the modification and release parameters.

With reference to FIGS. 28A and 28B, a BH RLC Channel to be Setup List 2802 is an initial item in RAN parameters 2800. In the list are BH RLC Channel to be Setup Item IEs 2804. A BH RLC CH ID 2806 is an IE that uniquely identifies a BH RLC channel in the link between IAB-MT of the IAB-node and IAB-DU of the parent IAB-node or IAB-donor-DU. This IE has a size of 16 bits.

Next in list 2802 are BH QoS information 2808, which contains BH RLC CH QoS (structure) 2810 and BH RLC CH QoS (element) 2812, or E-UTRAN BH RLC CH QoS (structure) 2814 and E-UTRAN BH RLC CH QoS (element) 2816. For an EN-DC related scenario, E-UTRAN BH RLC CH QoS (structure) 2814 will be selected. For a standalone NR or NR-DC scenario, BH RLC CH QoS (structure) 2810 will be selected.

BH RLC CH QoS (element) 2812 is an IE that defines the QoS to be applied to a BH RLC channel. This includes required parameters for guaranteed bit rate (GBR), non-GBR, and delay critical GBR BH RLC channel, as defined in 3GPP TS 38.473, section 9.3.1.45. E-UTRAN BH RLC CH QoS (element) 2816 is an IE that defines the QoS to be applied to a BH RLC channel for EN-DC case, as defined in 3GPP TS 38.473 section 9.3.1.19.

List 2802 then includes Control Plane Traffic Type (structure) 2818 and Control Plane Traffic Type (element) 2820. Control Plane Traffic Type (element) 2820 is an IE that indicates the control plane traffic type carried over a BH RLC channel. This IE can have a value in range of from one to three. Control plane traffic types with different priorities are identified by the different codepoints in this IE, where one has the highest priority and three has lowest priority. For BH RLC channel establishment for PWS delivery, near-RT RIC 308 will use Control Plane Traffic Type value as one.

Next, list 2802 includes RLC Mode 2822. RLC Mode 2822 is an IE that indicates the RLC mode used for the BH RLC channel. In some embodiments, the following modes are supported RLC-AM, RLC-UM-Bidirectional, RLC-UM-Unidirectional-UL, or RLC-UM-Unidirectional-DL. For BH RLC channel establishment for PWS delivery, near-RT RIC 308 will use RLC-AM mode to have higher reliability due to backward error correction mechanism.

List 2802 then includes BAP Control PDU Channel 2824. This IE indicates if BAP control PDU will be carried over this BH RLC channel.

Finally, list 2802 includes Traffic Mapping Information 2826. This IE includes the information used by the gNB-DU to perform traffic mapping. In some embodiments, there are two types of traffic mapping defined: IP to layer 2 traffic mapping information and BAP layer BH RLC channel mapping information. Details about the mapping are defined in 3GPP TS 38.473 section 9.3.1.95.

With reference to FIGS. 28C-28E, a BH RLC Channel to be Modified List 2828 includes BH RLC Channel to be Modified Item IEs 2830 and BH RLC CH ID 2832. BH RLC CH ID 2832 is an IE that uniquely identifies a BH RLC channel in the link between IAB-MT of the IAB-node and IAB-DU of the parent IAB-node or IAB-donor-DU. This IE has a size of 16 bits.

Next, list 2828 includes BH QoS information 2834, which contains BH RLC CH QoS (structure) 2836 and BH RLC CH QoS (element) 2838, or E-UTRAN BH RLC CH QoS (structure) 2840 and E-UTRAN BH RLC CH QoS (element) 2842. For an EN-DC related scenario, E-UTRAN BH RLC CH QoS (structure) 2840 will be selected. For a standalone NR or NR-DC scenario, BH RLC CH QoS (structure) 2836 will be selected.

BH RLC CH QoS (element) 2838 is an IE that defines the QoS to be applied to a BH RLC channel. This includes required parameters for GBR, non-GBR, and delay critical GBR BH RLC channel, as defined in 3GPP TS 38.473 section 9.3.1.45. E-UTRAN BH RLC CH QoS (element) 2842 is an IE that defines the QoS to be applied to a BH RLC channel for EN-DC case, as defined in 3GPP TS 38.473 section 9.3.1.19.

List 2828 then includes Control Plane Traffic Type (structure) 2844 and Control Plane Traffic Type (element) 2846. Control Plane Traffic Type (element) 2846 is an IE that indicates the control plane traffic type carried over a BH RLC channel. This IE can have a value in a range of from one to three. Control plane traffic types with different priorities are identified by the different codepoints in this IE, where one has the highest priority and three has lowest priority. For BH RLC channel establishment for PWS delivery, near-RT RIC 308 will use Control Plane Traffic Type value as one.

Then, list 2828 includes RLC Mode 2848. This IE indicates the RLC Mode used for BH RLC channel. Following modes are supported: RLC-AM, RLC-UM-Bidirectional, RLC-UM-Unidirectional-UL, RLC-UM-Unidirectional-DL. BH RLC channel establishment for PWS delivery will use RLC-AM mode to have higher reliability due to backward error correction mechanism.

Next, list 2828 includes BAP Control PDU Channel 2850. This IE indicates if BAP control PDU will be carried over this BH RLC channel.

List 2828 then includes Traffic Mapping Information 2852. This IE includes the information used by the gNB-DU to perform traffic mapping. There are two types of traffic mapping defined: IP to layer 2 traffic mapping information and BAP layer BH RLC channel mapping information. Details about the mapping are defined in 3GPP TS 38.473 section 9.3.1.95.

FIG. 28E also shows a BH RLC Channel to be Released List 2854. In list 2854, there are a BH RLC Channel to be Released Item IEs 2856 and a BH RLC CH ID 2858.

Finally, FIG. 28E shows an IE referred to as scheduling over hard, soft, or not available (HSNA) slot configured as NOTAVAILABLE 2860, which is used so that when it is received in RIC control request 2500, IAB-donor-CU 322 indicates this information towards IAB-donor-DU 318 or IAB-DU(s) during BH RLC channel establishment in a UE context modification request. As described later with reference to FIG. 34, scheduling over HSNA slot configured as NOTAVAILABLE 2860 allows scheduling of critical messages such as PWS towards IAB-MT in NOTAVAILABLE slot in case if simultaneous transmission/reception at an IAB-node is not supported when the same carrier is deployed for both access and backhaul.

FIG. 29 shows an example of RIC control request acknowledgement 2900 after successful establishment, modification, or release of BH RLC channel. For instance, once RIC control request 2500 (FIG. 25) is successfully received and RIC control request acknowledgement 2506 IE is included in RIC control request 2500, IAB-donor-CU 322 may send RIC control request acknowledgement 2900 towards near-RT RIC 308. RIC control request acknowledgement 2900 contains RIC request ID 2902 and RAN function ID 2904, as provided by near-RT RIC 308 in RIC control request 2500.

As shown in FIG. 30, IAB-donor-CU 322 triggers UE context modification 3000 towards IAB-donor-DU 318 and IAB-DU(s) for triggering establishment of BH RLC channel for transport of PWS warning messages. In BH RLC Channel to be Setup List 3002, a value for BH RLC CH ID 3004 is assigned as per number of BH RLC CH ID established currently, per 3GPP TS 38.473.

Control plane traffic type 3006 may have a value in range of one to three, with one being the highest priority. So, value for control plane traffic type 3006 will be set to one.

RLC mode 3008 is set to RLC-AM mode to take advantage of backward error correction by retransmission.

Traffic mapping information 3010 may indicate a type of traffic mapping. For instance, traffic mapping information 3010 may indicate IP to layer 2 traffic mapping or BAP layer BH RLC channel mapping. IP to layer 2 traffic mapping is used by IAB-donor-DU 318 for traffic mapping (as the IP layer resides in IAB-donor-DU 318). BAP layer BH RLC channel mapping is used by an IAB-node for traffic mapping. When mapping traffic at IAB-donor-DU 318, IP to layer 2 traffic mapping information will be selected. At the IAB-DU, BAP layer BH RLC channel mapping information will be selected.

If allow Scheduling over HSNA Slot configured as NOTAVAILABLE 3012 is configured and set to true, then this IE will allow scheduling of critical messages such as PWS towards IAB-MT in NOTAVAILABLE slot. A not available slot is normally configured to avoid simultaneous transmission/reception at an IAB-node, i.e., when the same carrier is deployed for both access and backhaul. Additional details are described later with reference to FIG. 33 and FIG. 34.

FIG. 31 shows an example of traffic mapping information 3010 for establishment of a BH RLC channel. When defining IP to layer 2 traffic mapping for BH RLC channel being established for PWS, the DSCP value in IP header will be marked with highest priority in order to route PWS messages with minimum latency and maximum reliability. DSCP values for signaling could be operator configurable (e.g., AF11/CS3, etc.) so that they get the best possible treatment in terms of priority and low drop probability. The details about traffic mapping information are defined in TS 38.473 section 9.3.1.95.

FIG. 32 shows an example of UE context modification for release of BH RLC channel, IE BH RLC Channel to be Released List 3200. BH RLC channel modification can be triggered in the event there is a change in any parameter. For example, an earlier BAP control PDU may have been configured to be sent over the same BH RLC channel as that of a PWS message, and the BAP control PDU channel IE value is set to true. But then, due to multiple warning message segments needing to be broadcasted, a BH RLC channel modification might be triggered in order to disable control PDU delivery over the BH RLC channel established for PWS. Another example is a change in a QoS parameter. Earlier QoS parameters are defined based on a default value, as the warning message alerts having severity as low. But later, the severity was modified to critical, which would result in modification of BH RLC CH QoS so that warning messages could be delivered faster. Even other parameters such as RLC Mode, Control Plane Traffic Type, Traffic Mapping Information, Allow Scheduling over HSNA Slot configured as NOTAVAILABLE, and the like may be modified depending on different use cases and requirements.

In the UE context modification procedure, IAB-donor-CU 322 indicates the BH RLC channel so as to release that channel, which was established for delivery of warning messages towards IAB-DU in IAB-node. Once the IAB-DU successfully releases the established BH RLC channel, it will respond with a UE context modification response towards IAB-donor-CU 322.

In some other embodiments, a UE context modification (not shown) towards IAB-donor-DU 318 and IAB-DU(s) is for triggering modification of an existing BH RLC channel. The message structure for modification is similar to that described previously for establishment. Additional details of a UE context modification request are described in 3GPP TS 38.473 section 9.2.2.7.

FIG. 33 shows an example over three transmission time intervals (TTIs) of semi-static resource separation 3300 between DU and MT parts within a chain of IAB-nodes to enable in-band IAB operation, i.e., use of the same carrier frequencies for the MT and DU sides of an IAB-node (e.g., IAB-node 122, FIG. 1). In case of in-band operation, the MT part of an IAB-node typically cannot receive when its DU part is transmitting and vice versa so as to avoid interference. Due to this constraint, there is a need for time-domain separation between the IAB-node DU and MT parts.

MT time-domain resources can be set as downlink, uplink, or flexible to denote their potential transmission direction. Yet, due to potential interference, a specific MT resource setup does not guarantee its availability in the chosen transmission modes. This availability also hinges on the configuration of its paired DU resource, which can also be categorized as downlink, uplink, or flexible, reflecting their permitted transmission directions.

To coordinate the MT and DU for avoiding interference, 3GPP TS 38.213 section 14 describes that DU resources are further configured as hard, soft, or not available. A time domain resource configuration means each slot/symbol is assigned an attribute of HARD, SOFT, and NOTAVAIL-ABLE. In the frequency domain, a resource block (RB) set can be configured as HARD, SOFT and NOTAVAILABLE in a symbol. Each RB set configuration is defined in 3GPP TS 38.473 section 9.3.1.230 according to subcarrier spacing, RB set size, and number of RB sets.

A hard DU resource is available in the configured transmission direction(s) without the IAB-node having to consider the impact on the corresponding MT resources. In practice, this implies that MT resources corresponding to a hard DU resource (of the same IAB-node) are not available, as it cannot be guaranteed that the MT can properly transmit/receive on these resources.

Unlike hard resources, a soft DU resource is utilized only when it does not interfere with the MT's transmission or reception capabilities. For instance, if an MT resource is set for uplink but there is no data ready for MT transmission or if it lacks a scheduling grant, the DU can access that resource. Beyond the inferred availability of soft DU resources, the parent node can also directly signal that a specific MT resource will not be used, freeing up the associated soft DU resource. This flexibility in configuring soft DU resources fosters a dynamic interplay between DU and MT resource allocation.

In the example of semi-static resource separation 3300, at the first time, a DU 3302 and an MT 3304 form a first link, in which DU 3302 is scheduled for downlink. That resource is hard at DU 3302. Because MT 3304 is receiving, its corresponding DU 3306 has a resource allocated as not available. This also means that MT 3308 is not used at this time, such that DU 3310 may be scheduled for a hard downlink with MT 3312.

In the next transmission, links 1 and 2 are each used for uplink. DU 3306 resources are once again not available.

In the third transmission, DU 3306 is allocated for a hard downlink. DU 3302 and DU 3310 resources are allocated as not available.

In some configurations, simultaneous in-band resource allocation for IAB-DU and MT may be possible. For instance, high isolation between the DU and the MT, e.g., when the MT and the DU are located on different sides of the same wall, may warrant such a simultaneous configuration. Additional details are described in 3GPP TS 38.473 section 9.3.1.108.

Figures 34A, 34B:
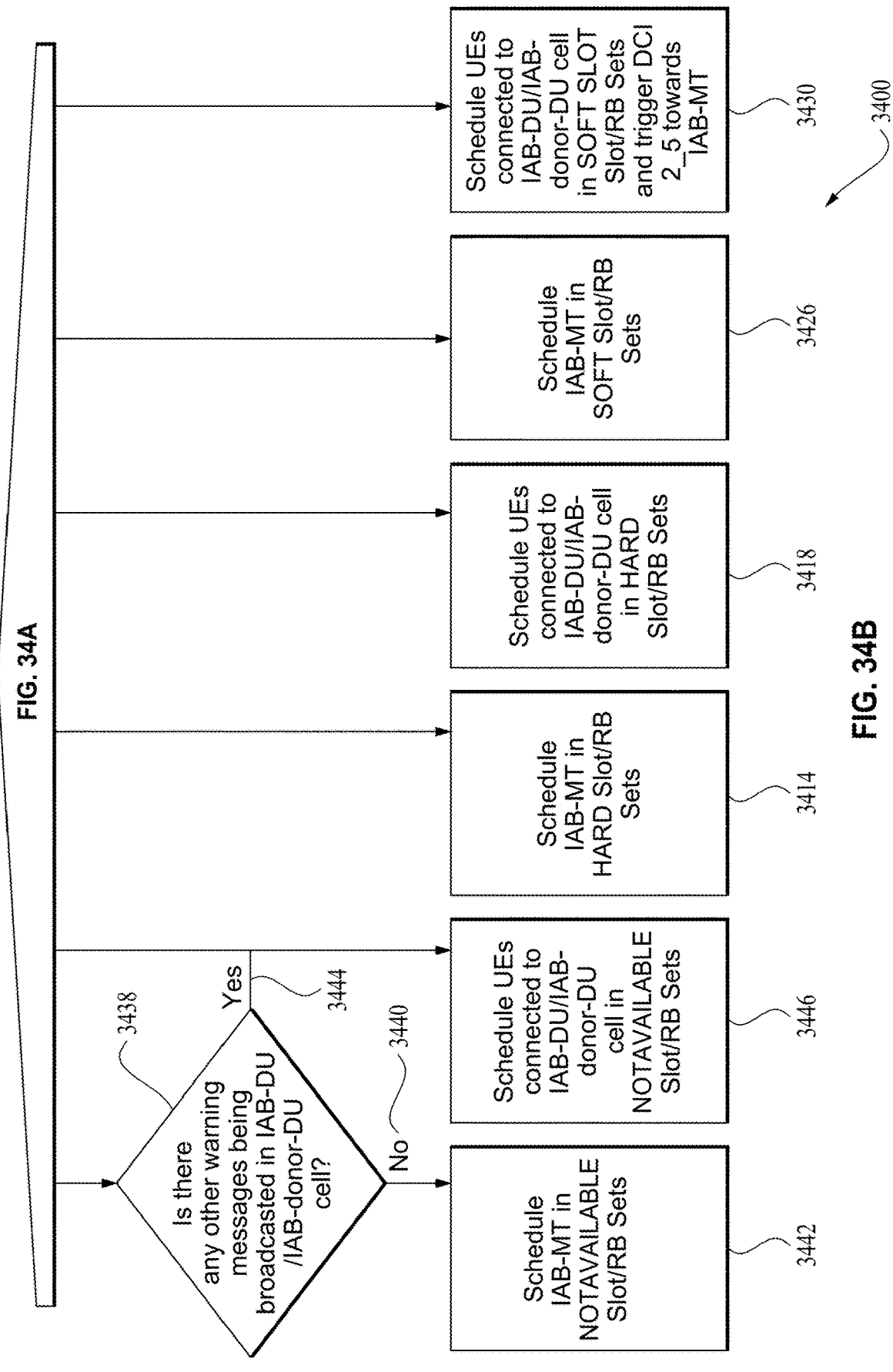

FIG. 34 shows a scheduler process 3400 at an IAB-donor-DU or an IAB-DU. Initially, process 3400 entails HSNA resource configuration 3402, which is a capability indicated by an IAB-node during F1 setup procedure.

Next, data is received 3404 over BH RLC channel for transmission of warning messages. To schedule the transmission, an IAB-donor-DU or an IAB-DU determines 3406 is a desired transmission resource (slot/RB set) and is defined as hard, soft, or not available.

If the resource configuration is defined as hard 3408, then resources may be made available towards access UE as well as towards child IAB-MT(s). In case of hard slots/RB sets, FIG. 34 shows that an IAB-DU or IAB-donor-DU determines 3410 that priority will be given to broadcast warning messages towards connected UEs (see, e.g., UE 136 connected to the DU of IAB-node 122, FIG. 1) in current IAB-DU/IAB-donor-DU cells, followed by child IAB-MT (s) (see, e.g., MT of IAB-node 142 connected to the DU of IAB-node 122, FIG. 1). If there are no warning messages to be broadcasted 3412 in current IAB-DU/IAB-donor-DU cells and there is a warning message received over established BH RLC channel for transmission of warning messages to be sent towards the child IAB-MT(s), then scheduling 3414 towards the child IAB-MT(s) takes highest precedence over other UEs. If there are warning messages to be broadcast 3416, then the IAB-DU or IAB-donor-DU schedules 3418 connected UEs in hard slots/RB sets.

If the resource configuration is defined as soft 3420, and if the criteria defined in 3GPP TS 38.213 section 14 are met, then scheduling will be triggered towards an access UE. In case of soft slots/RB sets, FIG. 34 shows that an IAB-DU or IAB-donor-DU determines 3422 that priority will be given to broadcast warning messages towards connected UEs in current IAB-DU/IAB-donor-DU cells, followed by the child IAB-MT(s). If there are no warning messages to be broadcasted 3424 in current IAB-DU/IAB-donor-DU cells and there is a warning message received over established BH RLC channel for transmission of warning messages to be sent towards the child IAB-MT(s), then scheduling 3426 towards IAB-MT(s) takes highest precedence. If there are warning messages to be broadcast 3428, then the IAB-DU or IAB-donor-DU schedules 3430 connected UEs in soft slots/RB sets.

Soft slots/RB sets will be made available immediately towards IAB-DU/IAB-donor-DU by triggering downlink control information (DCI) format 2_5 with an availability indicator (AI) index field value indicating the soft symbol as available towards the co-located IAB-MT. For instance, if the DU of IAB-node 122 schedules 3430 connected UEs in soft slots/RB sets, then IAB-node 122 will also receive a DCI format 2_5 from DU 114 so that the co-located IAB-MT of IAB-node 122 will not perform Tx/Rx in indicated slots/RB sets, since in-band carrier deployment will result in interference when both co-located IAB-DU and IAB-MT do simultaneous Tx, simultaneous Rx, Tx/Rx, or Rx/Tx operation. For the indicated slots/RB sets, IAB-DU of IAB-node 122 will schedule warning messages towards connected UE 136 and child IAB-MT of IAB-node 142. As the warning message is already received at IAB-node 122 from IAB-donor-DU 114, the priority should be given to distribute the received warning messages towards UEs connected to IAB-node 122 and any other child IAB-node connected to the current IAB-node.

If the resource configuration is defined as not available 3432, then IAB-DU/IAB-donor-DU determines 3434 whether allow Scheduling over HSNA Slot configured as NOTAVAILABLE 3012 (FIG. 30) IE is set to true during BH RLC channel establishment. In case this IE 3012 is not received 3404 or is false, then scheduling towards child IAB-MT(s) and connected access UEs is not allowed in not available slots/RB sets since the IAB-DU neither transmits nor receives in the symbol and NOTAVAILABLE symbols/RB sets that would need to be used by co-located IAB-MT to transmit/receive towards parent IAB-DU/IAB-donor-DU.

If IE 3012 is true 3436, then as in the previous examples, IAB-DU/IAB-donor-DU determines 3438 if IAB-DU/IAB-donor-DU does not have any warning message or high priority message to be broadcasted towards UE connected to it. If no 3440, then the PWS warning or other high priority message received over newly defined BH RLC channel for PWS broadcasting is scheduled 3442 towards the child IAB-MT(s) in not available slots/RB sets. If yes 3444, then priority will be given to scheduling 3446 warning message over the current cell towards connected UEs followed by IAB-MT in not available slots/RB sets.

For instance, if yes 3444, as the warning message has already been received at IAB-node 122 from IAB-donor-DU 114, the priority should be given to distribute the received warning messages towards UEs connected to IAB-node 122 and any other child IAB-node connected to the current IAB-node. Thus, IAB-DU will transmit warning messages towards UEs connected to IAB-node 122 and any other child IAB-node (i.e., IAB-node 142).

A co-located IAB-MT may or may not preform Tx/Rx operation in NOTAVAILABLE slot when the IAB-DU is scheduling warning messages in a NOTAVAILABLE slot. If a co-located IAB-MT and IAB-DU uses NOTAVAILABLE slot to perform Tx/Rx operation at same instance, then IAB-MT and IAB-DU would employ an interference mitigation technique of frequency domain separation, in which some bandwidth would be used by the IAB-DU and other bandwidth would be used by the IAB-MT.

In case if the resources are not available to schedule warning messages towards IAB-MT, and there are no warning messages currently broadcasted in IAB-DU or IAB-donor-DU cell, then preemption should be triggered to free up some resources for transmission of warning messages towards IAB-MT. Preemption will be triggered in case warning messages need to be broadcasted on IAB-DU/IAB-donor-DU cell along with connected child IAB-MT and resources are not available in scheduling IAB-DU/IAB-donor-DU.

Mini slot-based scheduling for allocation of resources for warning messages over IAB backhaul could be considered to reduce the latency. HSNA resource configuration will be done at symbol level rather than slot level when mini-slot based scheduling is configured. A few symbols could be used for resource allocation in IAB-DU/IAB-donor-DU cell towards connected UE, and the rest of the symbols could be used for allocation towards IAB-MT.

Similarly in the uplink, logical channel prioritization should be done in order to handle transfer of uplink warning message such as a PWS success indication, PWS failure indication, PWS restart indication, or other messages. When establishing BH RLC channel for delivery of warning messages, the IAB-donor-DU/IAB-DU will provide priority value as highest, i.e., value of one, PrioritisedBitRate set to infinity, and BucketSizeDuration will be set according to the size of warning messages that need to be scheduled. This will make the BH RLC channel established for PWS message transfer as having highest priority for uplink scheduling.

When a scheduling request (SR) or BSR is received for scheduling the IAB-MT at IAB-DU/IAB-donor-DU on a logical channel ID or a logical channel group ID of the BH RLC channel established for warning message broadcasting, then the uplink grant should be allocated with highest priority. If resources are not available, then preemption will be triggered to free up resources for allocating grant in order to transmit warning messages in the uplink if the SR or BSR is received for this BH RLC channel.

FIG. 35 shows an example of preemptive BSR process 3500. To reduce latency for transmission of PWS warning messages over IAB, preemptive BSR will be triggered by an intermediate IAB-node towards its parent node. The size of grant requested by IAB-node in preemptive BSR will be of similar size received as part of BSR from child node or the size can be same as the uplink grant allocated towards child node.

IAB-node C 3502 is triggering transmission of PWS messages. In order to do so, IAB-node C 3502 has requested from its parent node, i.e., IAB-node B 3504, for providing grant by transmitting a regular BSR 3506.

After receiving regular BSR 3506, IAB-node B 3504 determines that regular BSR 3506 is received for transmission of PWS message 3508 based on received BH logical channel ID (BH LCID) (in case of a short BSR) and BH logical channel group ID (BH LCG ID) (in case of a long BSR). The BH LCID and BH LCG ID are established as part of the UE context modification, per 3GPP TS 38.331. When the BH RLC channel gets established, the BH logical channel configuration of the BH RLC channel is shared as part of IE mac-LogicalChannelConfig-r16 in BH-RLC-ChannelConfig. Within IE mac-LogicalChannelConfig-r16, BH LCG ID details are shared for the established BH RLC channel for PWS delivery, which would be unique among all the established BH RLC channels. The BH RLC channel establishment for PWS delivery also results in allocation of a new BH LCID known as BH-LogicalChannelIdentity, shared as part of IE BH-RLC-ChannelConfig. BH-Logical-ChannelIdentity uses values in a range of BH LCIDs used for access UEs, i.e., 1-32, or an extended value defined specifically for BH-LogicalChannelIdentity in a range of 320 to 65,855, per 3GPP TS 38.331.

IAB-node B 3504 allocates grant 3510 towards IAB-node C 3502 for transmission of PWS message and simultaneously sends its parent node, i.e., IAB-node A 3512, a preemptive BSR 3514 request to preemptively allocate grant 3516. Preemptive BSR 3514 can be triggered immediately after receiving regular BSR 3506 or preemptive BSR 3518 can be triggered after grant 3510 is allocated towards child node, i.e., IAB-node C 3502. As the BSR 3506 is received for transmission of PWS message 3508, requested grant size is allocated by IAB-node B 3504. If resources are not available, then preemption should be triggered to free up resources.

The reason for triggering preemptive BSR 3514, 3518 is that as soon as PWS message 3508 is received at IAB-node B 3504, it will have grant 3516 ready to transfer PWS message 3520 towards IAB-node A 3512 with very little to no delay. This reduces the end-to-end latency for warning message delivery in a multi-hop IAB deployment.

In similar ways, preemptive BSR 3522 (or 3524) will be triggered towards IAB donor node 3526 by IAB-node A 3512 for requesting grant 3528 preemptively and transmitting PWS message 3530 with no delay.

FIG. 35 also shows an example of the SR. For a SR, there are separate SR resources (i.e., PUCCH resources) configured for the BH RLC channel established for PWS delivery. For instance, an SR resource ID, which corresponds to a BH LCID, is mapped to a PUCCH resource for transmission for SR information. As SR resources are different (in PUCCH), in case if any SR is received over the SR resources reserved for BH RLC channel for PWS delivery, then IAB-DU/IAB-donor-DU would allocate resources towards IAB-MT at a high priority. In the example of process 3500, an SR (for BSR) 3532 is generated from IAB-node C 3502, which causes IAB-node B 3504 to trigger grant 3534 for transmitting uplink information including regular BSR 3506. Likewise, when IAB-node A 3512 has preemptive BSR 3514, it sends an SR (for preemptive BSR) 3536 and receives grant 3538 for transmitting preemptive BSR 3522.

SR (for BSR) 3532 is triggered when IAB-node C 3502 does not have enough resources to transmit regular BSR 3506. Once SR (for BSR) 3532 is received at IAB-node B 3504, it will allocate grant 3534, which will be used by IAB-node C 3502 to transmit regular BSR 3506 towards IAB-node B 3504. Similarly, SR (for preemptive BSR) 3536 can also be used for transmission of preemptive BSR 3522 using allocated grant 3538. As for transmission of preemptive BSR 3514, there is no SR trigger defined between IAB-node B 3504 and IAB-node A 3512 since IAB-node B 3504 has a grant already available.

FIG. 36 shows a process 3600, performed by an IAB-node or an IAB-donor having, respectively, an IAB-DU or IAB-donor-DU, supporting a wireless backhaul RLC channel and a wireless access channel, for scheduling use of the wireless backhaul RLC channel and the wireless access channel. In block 3602, process 3600 determines whether a desired resource for allocation to PWS message data is configured with a hard, soft, or not available resource configuration. In block 3604, process 3600 determines whether there are any other PWS messages to be broadcast to prioritize use of the desired resource between a child IAB-MT and an access UE. In block 3606, process 3600 schedules the PWS message data during the desired resource based on the hard, soft, or not available resource configuration.

Process 3600 may also include determining the desired resource is configured as not available, receiving from an IAB-donor-CU a UE context modification including an IE indicating scheduling is enabled for the wireless backhaul RLC channel during any resource configured as not available among hard, soft, and not available (HSNA) resource configurations, in response to determining there are no other PWS messages, scheduling the desired resource for the child IAB-MT, and in response to determining there are other PWS messages, scheduling the desired resource for the access UE.

Process 3600 may also include determining the desired resource is configured as hard, in response to determining there are no other PWS messages, scheduling the desired resource for the child IAB-MT, and in response to determining there are other PWS messages, scheduling the desired resource for the access UE.

Process 3600 may also include determining the desired resource is configured as soft, in response to determining there are no other PWS messages, scheduling the desired resource for the child IAB-MT, in response to determining there are other PWS messages, scheduling the desired resource for the access UE, and receiving, with a co-located IAB-MT of the IAB-node, a DCI 2_5 format for configuring the co-located IAB-MT to avoid interference with the desired resource.

Process 3600 may also include receiving a BH LCID allocating the wireless backhaul RLC channel for PWS delivery, and triggering a preemptive BSR to a parent IAB-DU or parent IAB-donor-DU to cause it to differentiate, based on the BH LCID, the preemptive BSR from any other received BSRs having different LCIDs or BH LCIDs.

Process 3600 may also include allocating a BH LCID that identifies the wireless backhaul RLC channel for PWS delivery, receiving a preemptive BSR, and scheduling the desired resource, based on the preemptive BSR and BH LCID, according to a higher priority over those associated with other LCIDs or BH LCIDs.

Process 3600 may also include receiving a BH LCID allocating the wireless backhaul RLC channel for PWS delivery, triggering an SR for requesting grant of a preemptive BSR, and in response to the triggering of the SR, receiving the grant to transmit the preemptive BSR with the allocated BH LCID.

Process 3600 may also include allocating a BH LCID that identifies the wireless backhaul RLC channel for PWS delivery, allocating an SR resource associated with the allocated BH LCID, receiving a SR on the SR resource configured for the BH LCID, and allocate and provide grant for transmission of uplink information for PWS delivery.

Process 3600 may also include triggering the release of the backhaul RLC channel in response to a RIC control message from the near-RT RIC.

Process 3600 may also include a co-located IAB-MT is configured to use a bandwidth resource that is different from that of the desired resource for reception or transmission during the scheduling of the desired resource.

FIG. 37 is a block diagram illustrating components 3700, according to some example embodiments, configured to read instructions from a machine-readable or computer-readable medium (e.g., a non-transitory machine-readable storage medium) and perform any one or more of the methods discussed herein (or portions thereof), such as discussed for process 500, process 600, process 700, process 800, process 900, process 1000, process 2000, process 2100, process 2200, process 2300, process 2400, process 3400, process 3500, process 3600, or any portions of these processes.

Specifically, FIG. 37 shows a diagrammatic representation of hardware resources 3702 including one or more processors 3704 (or processor cores), one or more memory/storage devices 3706, and one or more communication resources 3708, each of which may be communicatively coupled via a bus 3710. For embodiments where node virtualization (e.g., NFV) is utilized, a hypervisor 3712 may be executed to provide an execution environment for one or more network slices/sub-slices to utilize hardware resources 3702.

Processors 3704 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio frequency integrated circuit (RFIC), another processor, or any suitable combination thereof) may include, for example, a processor 3714 and a processor 3716.

Memory/storage devices 3706 may include main memory, disk storage, or any suitable combination thereof. Memory/storage devices 3706 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 3708 may include interconnection or network interface components or other suitable devices to communicate with one or more peripheral devices 3718 or one or more databases 3720 via a network 3722. For example, communication resources 3708 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 3724 may comprise software, a program, an application, an applet, an app, or other executable code for causing at least any of processors 3704 to perform any one or more of the methods discussed herein. Instructions 3724 may reside, completely or partially, within at least one of processors 3704 (e.g., within the processor's cache memory), memory/storage devices 3706, or any suitable combination thereof. Furthermore, any portion of instructions 3724 may be transferred to hardware resources 3702 from any combination of peripheral devices 3718 or databases 3720. Accordingly, the memory of processors 3704, memory/storage devices 3706, peripheral devices 3718, and databases 3720 are examples of computer-readable and machine-readable media.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A method, performed by a near-real time radio access node (RAN) intelligent controller (RIC) (near-RT RIC), for controlling, via an E2 link between the near-RT RIC and an integrated access and backhaul (IAB) donor-central unit (CU) (IAB-donor-CU), a backhaul radio link control (RLC) channel for warning message delivery, the method comprising:

receiving, from a public warning system (PWS) gateway (PWS-gateway), a first representational state transfer (REST) application programming interface (API) trigger for PWS service delivery;

requesting, from a service management and orchestration (SMO), a second REST API trigger for configuring the backhaul RLC channel; and generating a RIC control request to the IAB-donor-CU to cause it to trigger a user equipment (UE) context modification for control of the backhaul RLC channel with one or more IAB-nodes.

2. The method of claim 1, in which the RIC control request is for establishing or modifying the backhaul RLC channel.

3. The method of claim 1, further comprising locally clearing context for the backhaul RLC channel.

4. The method of claim 1, further comprising:

receiving, from the PWS-gateway, a third REST API trigger for PWS service completion; and triggering another RIC control request for the IAB-donor-CU to release the backhaul RLC channel.

5. The method of claim 1, further comprising generating the RIC control request to include an information element (IE) indicating whether scheduling is enabled for the backhaul RLC channel during a resource configured as not available among hard, soft, and not available (HSNA) resource configurations for the backhaul RLC channel employing a same carrier as a wireless access channel.

6. A method, performed by an integrated access and backhaul (IAB) donor-central unit (CU) (IAB-donor-CU), for warning message delivery over a backhaul radio link control (RLC) channel, the method comprising:

in response to a radio access node (RAN) intelligent controller (RIC) control request from a near-real time (near-RT) RIC, triggering a user equipment (UE) context modification for establishing the backhaul RLC channel with an IAB-node;

receiving a write replace warning request from an access and mobility management function (AMF);

triggering the write replace warning request to the IAB-node by backhaul adaptation protocol (BAP) routing over the backhaul RLC channel; and triggering release of the backhaul RLC channel once public warning system (PWS) broadcast is complete.

7. The method of claim 6, further comprising, in response to another RIC control request from the near-RT RIC, triggering another UE context modification for modifying the backhaul RLC channel with the IAB-node.

8. The method of claim 6, further comprising triggering the release of the backhaul RLC channel in response to a RIC control message from the near-RT RIC.

9. The method of claim 6, further comprising:

receiving a PWS failure indication from the IAB-node;

triggering the AMF with the PWS failure indication and clearing context associated with the backhaul RLC channel.

10. The method of claim 6, further comprising:

receiving a PWS restart indication from the IAB-node;

triggering the AMF with the PWS restart indication to cause a cell broadcast center function (CBCF) to determine whether the warning message is valid for retransmission; and triggering retransmission over the backhaul RLC channel in response to receiving a further write replace warning request from the AMF.

11. The method of claim 6, further comprising:

receiving a first PWS cancel request from the AMF;

triggering a second PWS cancel request to the IAB-node by BAP routing over the backhaul RLC channel to stop the warning message delivery;

receiving a first PWS cancel response via the backhaul RLC channel; and triggering a second PWS cancel response toward the AMF to cause a cell broadcast center function (CBCF) and a PWS-gateway (PWS-GW) to stop the warning message delivery.

12. The method of claim 6, further comprising generating the UE context modification to include an information element (IE) indicating whether scheduling is enabled for the backhaul RLC channel during a resource configured as not available among hard, soft, and not available (HSNA) resource configurations.

13. A method, performed by an integrated access and backhaul (IAB) node (IAB-node) or an IAB-donor having, respectively, an IAB-distributed unit (IAB-DU) or IAB-donor-DU, supporting a wireless backhaul radio link control (RLC) channel and a wireless access channel, for scheduling use of the wireless backhaul RLC channel and the wireless access channel, the method comprising:

determining whether a desired resource for allocation to public warning system (PWS) message data is configured with a hard, soft, or not available resource configuration;

determining whether there are any other PWS messages to be broadcast to prioritize use of the desired resource between a child IAB-mobile termination (IAB-MT) and an access user equipment (UE); and scheduling the PWS message data during the desired resource based on the hard, soft, or not available resource configuration.

14. The method of claim 13, further comprising:

determining the desired resource is configured as not available;

receiving from an IAB-donor-central unit (IAB-donor-CU) a UE context modification including an information element indicating scheduling is enabled for the wireless backhaul RLC channel during any resource configured as not available among hard, soft, and not available (HSNA) resource configurations;

in response to determining there are no other PWS messages, scheduling the desired resource for the child IAB-MT; and in response to determining there are other PWS messages, scheduling the desired resource for the access UE.

15. The method of claim 14, in which a co-located IAB-MT is configured to use a bandwidth resource that is different from that of the desired resource for reception or transmission during the scheduling of the desired resource.

16. The method of claim 13, further comprising:

determining the desired resource is configured as hard;

in response to determining there are no other PWS messages, scheduling the desired resource for the child IAB-MT; and in response to determining there are other PWS messages, scheduling the desired resource for the access UE.

17. The method of claim 13, further comprising:

determining the desired resource is configured as soft;

in response to determining there are no other PWS messages, scheduling the desired resource for the child IAB-MT;

in response to determining there are other PWS messages, scheduling the desired resource for the access UE; and receiving, with a co-located IAB-MT of the IAB-node, downlink control information (DCI) 2_5 format for configuring the co-located IAB-MT to avoid interference with the desired resource.

18. The method of claim 13, further comprising:

receiving a backhaul logical channel identity (BH LCID) allocating the wireless backhaul RLC channel for PWS delivery; and triggering a preemptive buffer status report (BSR) to a parent IAB-DU or parent IAB-donor-DU to cause it to differentiate, based on the BH LCID, the preemptive BSR from any other received BSRs having different LCIDs or BH LCIDs.

19. The method of claim 13, further comprising:

allocating a backhaul logical channel identity (BH LCID) that identifies the wireless backhaul RLC channel for PWS delivery;

receiving a preemptive buffer status report (BSR); and scheduling the desired resource, based on the preemptive BSR and BH LCID, according to a higher priority over those associated with other LCIDs or BH LCIDs.

20. The method of claim 13, further comprising:

receiving a backhaul logical channel identity (BH LCID) allocating the wireless backhaul RLC channel for PWS delivery;

triggering a scheduling request (SR) for requesting grant of a preemptive buffer status report (BSR); and in response to the triggering the SR, receiving the grant to transmit the preemptive BSR with the allocated BH LCID.

21. The method of claim 13, further comprising:

allocating a backhaul logical channel identity (BH LCID) that identifies the wireless backhaul RLC channel for PWS delivery;

allocating a scheduling request (SR) resource associated with the allocated BH LCID;

receiving a SR on the SR resource configured for the BH LCID; and allocating and providing grant for transmission of uplink information for PWS delivery.

* * * * *